(12) United States Patent
Kobayashi et al.

(10) Patent No.: US 7,124,094 B1
(45) Date of Patent: Oct. 17, 2006

(54) PRINT SYSTEM, SERVICE SYSTEM, DATA SERVER, MASTER SERVER, PRINT CLIENT SYSTEM AND PRINTER

(75) Inventors: Toru Kobayashi, Tokyo (JP); Noriyuki Yanagimachi, Tokyo (JP); Masayuki Inai, Tokyo (JP); Toshihiko Nakazawa, Tokyo (JP); Hirohiko Yamazaki, Tokyo (JP)

(73) Assignee: Konica Corporation, Tokyo (JP)

( * ) Notice: Subject to any disclaimer, the term of this patent is extended or adjusted under 35 U.S.C. 154(b) by 309 days.

(21) Appl. No.: 09/696,114

(22) Filed: Oct. 25, 2000

(30) Foreign Application Priority Data

| | | |
|---|---|---|
| Oct. 27, 1999 | (JP) | ................................ 11-345201 |
| Apr. 25, 2000 | (JP) | ............................. 2000-124049 |
| Jun. 21, 2000 | (JP) | ............................. 2000-186167 |

(51) Int. Cl.
*G06Q 20/00* (2006.01)

(52) U.S. Cl. .............................. 705/26; 705/1; 705/50; 705/51

(58) Field of Classification Search .................... 705/1, 705/50, 51, 52, 54, 26
See application file for complete search history.

(56) References Cited

U.S. PATENT DOCUMENTS

| | | | |
|---|---|---|---|
| 5,220,674 A | | 6/1993 | Morgan et al. |
| 5,278,904 A | * | 1/1994 | Servi .......................... 713/183 |
| 5,383,129 A | * | 1/1995 | Farrell ........................ 705/400 |
| 5,465,213 A | * | 11/1995 | Ross .......................... 700/117 |
| 5,532,920 A | * | 7/1996 | Hartrick et al. ............. 715/500 |
| 5,615,015 A | * | 3/1997 | Krist et al. ................. 358/296 |
| 5,734,823 A | * | 3/1998 | Saigh et al. ................. 709/229 |
| 5,832,301 A | | 11/1998 | Yamaguchi |
| 5,901,067 A | * | 5/1999 | Kao et al. ..................... 700/11 |
| 5,930,810 A | * | 7/1999 | Farros et al. ................ 715/506 |
| 6,012,890 A | * | 1/2000 | Celorio Garrido ........... 412/19 |
| 6,131,162 A | * | 10/2000 | Yoshiura et al. ............. 713/176 |
| 6,134,568 A | * | 10/2000 | Tonkin ........................ 715/526 |
| 6,233,684 B1 | * | 5/2001 | Stefik et al. ................. 713/176 |
| 6,246,993 B1 | * | 6/2001 | Dreyer et al. ................... 705/9 |
| 6,320,591 B1 | * | 11/2001 | Griencewic .................. 345/582 |
| 6,480,866 B1 | * | 11/2002 | Mastie ........................ 715/525 |

FOREIGN PATENT DOCUMENTS

| | | |
|---|---|---|
| EP | 0 825 551 A2 | 2/1998 |
| EP | 0 847 002 A1 | 6/1998 |
| EP | 0 881 566 A2 | 12/1998 |
| JP | 06-103286 | 4/1994 |
| JP | 07-239828 | 9/1995 |
| JP | 11134125 A * | 5/1999 |

OTHER PUBLICATIONS

"Books on Demand: Printing Vies with E-Books at BookExpo America", Edwards, Stephen E., The Seybold Report on Publishing Systems, v28, n17, May 31, 1999.*

* cited by examiner

*Primary Examiner*—Calvin L. Hewitt, II
(74) *Attorney, Agent, or Firm*—Frishauf, Holtz, Goodman & Chick, P.C.

(57) ABSTRACT

A print system for use through a network comprises a service system connected to the network and having a storage section in which a plurality of data are stored in a plurality of data storing locations; and a printer client system connected to the network and having a printer, wherein the printer client system accesses the service system through the network so as to obtain a data storing location of request data, downloads the request data from the obtained data storing location of the storage section, and conducts printing on the basis of the request data by the printer; and wherein the printer client system notifies the printing result to the service system.

45 Claims, 19 Drawing Sheets

FIG. 1 DATA BASE AND PAYMENT CHARGING SYSTEM

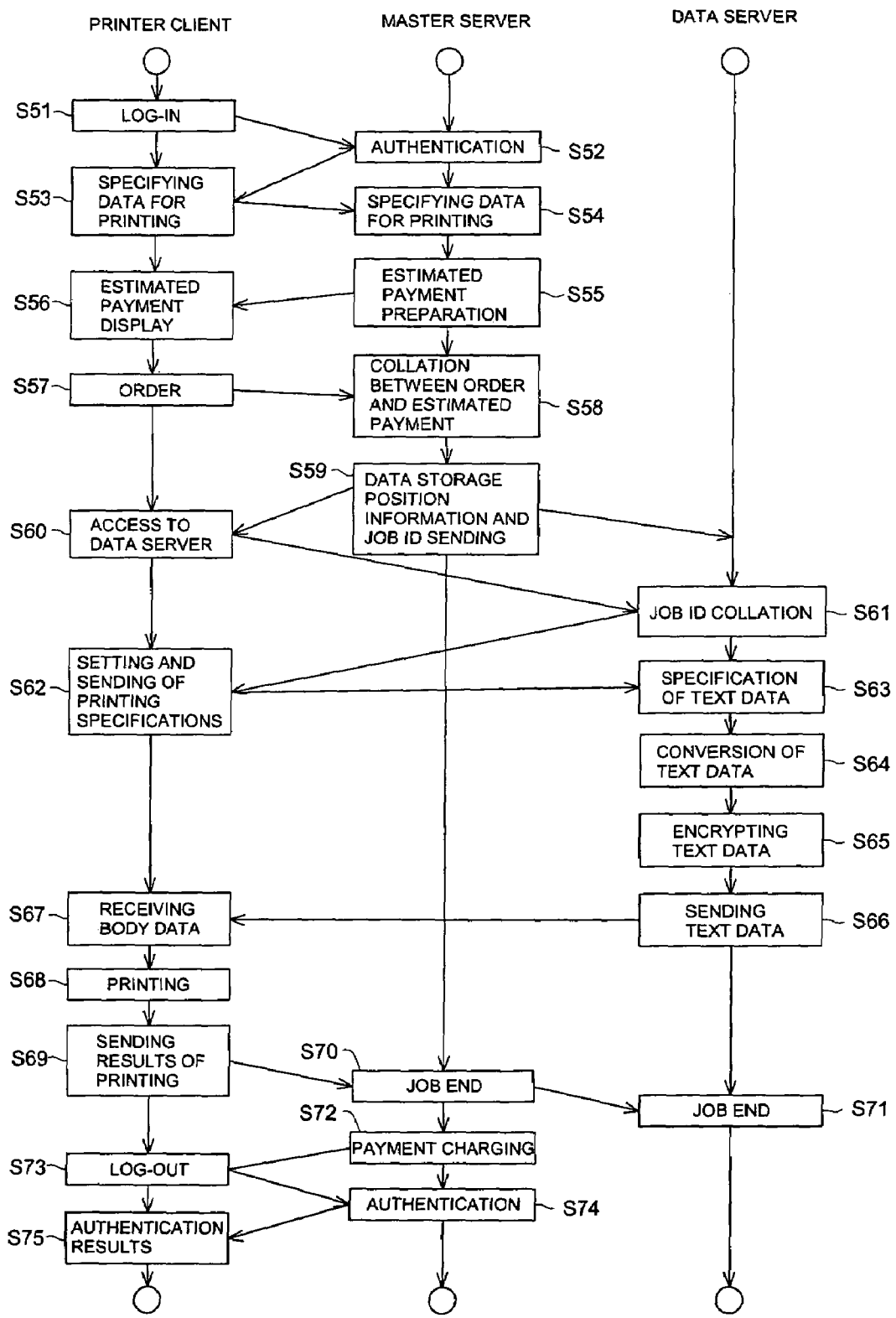

FIG. 9

REPRINTING CHARGES = FIRST CHARGE INFORMATION + SECOND CHARGE INFORMATION $\left(\begin{array}{l}\text{COPYRIGHT ROYALTY} \\ \text{CHARGE OF MAKING DATA} \\ \text{SERVICE CHARGE} \\ \quad \cdot \\ \quad \cdot \\ \quad \cdot \end{array}\right.$  $\left(\begin{array}{l}\text{CHARGE OF MATERIALS USED} \\ \text{RENTAL FEE OF MACHINE} \\ \quad \cdot \\ \quad \cdot \\ \quad \cdot \end{array}\right.$

FIG. 18 (A)

FIRST TRANSMISSION REQUEST

```
TIME AND DATE OF TRANSMISSION
TYPES OF REQUEST
TYPES OF REQUEST
SOURCE NAME
GENERATION REQUEST ID
TARGET FOR PRINTING 112 PERSONS
NAMES OF BOOKS
RETRIEVAL REQUEST
        ⋮
```

FIG. 18 (B)

SECOND TRANSMISSION REQUEST

```
TIME AND DATE OF TRANSMISSION
TYPES OF REQUEST
SOURCE NAME
GENERATION REQUEST ID
NAMES OF BOOKS
PAYMENT METHOD
PRINTING CONDITIONS
STATE OF SHEET FEEDING
PRINTING UNIT COST
        ⋮
```

FIG. 18 (C)

CHARGE PAYMENT INFORMATION

```
TIME AND DATE OF TRANSMISSION
TYPES OF REQUEST
SOURCE NAME
GENERATION REQUEST ID
NAMES OF BOOKS
CARD INFORMATION
QUOTATION CODE
        ⋮
```

FIG. 18 (D)

PRINTING RESULTS INFORMATION

```
TIME AND DATE OF TRANSMISSION
TYPES OF REQUEST
SOURCE NAME
PRINTING ERROR
PRINTING TIME
        ⋮
```

PRINT SYSTEM, SERVICE SYSTEM, DATA SERVER, MASTER SERVER, PRINT CLIENT SYSTEM AND PRINTER

BACKGROUND OF THE INVENTION

The present invention relates to a printing apparatus which conducts printing based on data expressing images and/or characters, and in particular, to a technology wherein data which a printer requests through a network are transmitted to the printer for printing. It further relates to a charge calculation method, a the payment charging method, a print system, a printer client and a service system all in the occasion to duplicate image data of a book received through a communication network on a recording material.

In recent years, images and documents are in increasing opportunities where the images and documents are made to be electronic like data expressing images and/or characters. When images and documents are made to be data expressing images and/or characters, a user can print out freely by the use of a printing apparatus.

On the other hand, books have been made to be electronic, causing handiness and a problem of unauthorized duplication. To solve this problem, there is taken a measure to prevent illegal duplication by offering encrypted data expressing images and/or characters, or a measure to conduct a the payment charging process for each duplication when data expressing images and/or characters are duplicated.

As a form of electronic publication, there is a demand for offering publications to users by downloading digital data relating to books from a server that is connected to an internet and by making them to be printed. However, fearing that free duplication is possible, those who offer digital data concerning books tend to refrain from offering digital data concerning books from which an income of royalties is expected.

Namely, books are handled as image data, and therefore, there is caused a problem that duplication can easily be carried out and royalties can not be collected completely, resulting in retarded spread of electronic publication.

Incidentally, digital data relating to books include literary works, scientific essays, dictionaries, magazines and other books, and photographs and pictures are included sometimes. Further, photographic albums, books of paintings and maps wherein writing is not main subject are also included in digital data concerning books.

In TOKKAIHEI No. 7-239828, there is described technology wherein encryption that can be decrypted is conducted by a document server only on a user authenticated by a copyright server, and a document is transmitted to a printing agent corresponding to the user so that each agent may decrypt for printing.

In the aforesaid official gazette, there is described that the technology can prevent illegal copy in an electronic publication.

In TOKKAIHEI No. 6-103286, there is described technology wherein when a user inputs, through a modem, a command which transmits a copy of a book, a royalty payment program intercepts a duplication command to discontinue duplication operations and the royalty payment program presents royalty payment information stored in a file annexed to a book text or a book to a user.

In the aforesaid official gazette, there is described that the technology makes it possible for an author and a publishing company to protect copyright in their books simply and surely, by providing a means to compel a reader to pay royalties when the reader duplicates a part or the whole of a soft copy book.

Due to the technologies stated above, free copying is prohibited and collection of royalties may be secured. However, neither of the aforesaid official gazettes takes up, as a problem, a possibility that royalties are collected even when a user cannot obtain publications published electronically, although digital data are obtained by a printer client operated by the user, and therefore, the technology solving this problem is not disclosed. If it is impossible for a user to obtain publications in spite of royalties collected, this must be taken up by the user as an ethical or legal problem.

Therefore, an object of the invention is to provide a print system wherein the payment charging process that is in compensation for publications by an electronic publication obtained by a user is made possible.

Further, there is made no mention about a possibility that printing failure and delay are caused and processing load for the printer client is increased, when transmitting and receiving of digital data are executed in utter disregard of a capacity of the printer client and of printing specifications selected by a user.

Therefore, another object of the invention is to provide a print system which prevents that printing failure and delay are caused and processing load for the printer client is increased even when a capacity of the printer client and printing specifications selected by a user are observed.

In the system disclosed in the aforesaid official gazette, the total amount of royalties is to collect the royalties established by a person having copyright or a publishing company (service-offering company), which causes a problem in the following occasions. For example, when a user downloads image data of a book for duplication on a printer installed in a convenience store or a library, through a communication network, the royalties stated above only make it difficult for the convenience store or the library to obtain a charge for using the printer.

Even if the charge for using the printer is included in the aforesaid royalties, there still is a following problem. First of all, if the charge for a user who duplicates with its own printer is the same as that for duplicating with a printer installed in a convenience store, the user must pay the aforesaid charge for using excessively. Secondly, when a user duplicates by enlarging images or reducing images, it is impossible to obtain an appropriate charge for using under the situation that a charge for using paper differs between enlargement and reduction. Thirdly, each of a convenience store and a library can not establish a uniform charge for using that is the same as others, because its land use charge is different from others and its purchasing cost of paper is different from others.

It is a matter of course that the system of this kind can be prosperous only when the aforesaid charge for using can be obtained properly and royalties can also be obtained properly.

It is therefore an object of the invention to make it possible to obtain appropriate charges on both a service offering side and a user side through a communication network.

SUMMARY OF THE INVENTION

Objects of the invention are attained by the following structures.

(Structure 1)

A print system having therein a printing apparatus equipped with a printing means and a print information output means that outputs print information showing that printing has been conducted, and the payment charging means that conducts a payment charging process based on the print information.

(Structure 2)

A print system that downloads data from a system on the service side and executes printing with a printer client based on the data, wherein, the printer client accesses the system on the service side to obtain a data position, then, data are downloaded from the system on the service side based on the obtained data position, then, printing is made based on the downloaded data, and the results of printing are notified to the system on the service side.

In the print system according to Structure 2, it has become possible for the system on the service side to judge whether to conduct the payment charging or not based on results of printing, because the results of printing are notified to the system on the service side.

(Structure 3)

A print system wherein a printer client downloads data from a system on the service side, then, printing is conducted based on the downloaded data and results of printing are notified to the system on the service side so that the system on the service side conducts the payment charging in accordance with the results of printing.

In the print system according to Structure 3, it has become for the system on the service side to execute the payment charging process representing charges for prints to a user who has succeeded in printing, because results of printing are notified to the system on the service side and the system on the service side conducts the payment charging in accordance with the results of printing.

(Structure 4)

A print system that downloads data from a system on the service side and executes printing with a printer client based on the data, wherein, the printer client selects printing on a unit of page or printing on a unit of book and requests the system on the service side to download data, and the system on the service side changes the order of pages in the data in accordance with the selection, and the printer client downloads the changed data so that printing is conducted based on the downloaded data.

In the print system described in Structure 4, it has become possible to prevent that there is a possibility of print failure and delay and that processing load for the printer client is enhanced, because the system on the service side changes the order of pages in the data in accordance with the selection.

(Structure 5)

A print system that downloads data from a system on the service side and executes printing with a printer client based on the data, wherein the printer client selects printing specifications and requests the system on the service side to download data, then, the system on the service side changes the order of pages in the data in accordance with the selection, and the printer client downloads the changed data so that printing is conducted based on the downloaded data.

In the print system described in Structure 5, it has become possible to prevent that there is a possibility of print failure and delay and that processing load for the printer client is enhanced, because the system on the service side changes the order of pages in the data in accordance with the printing specifications where the system on the service side is selected.

(Structure 6)

A print system having therein a printer client that forms images based on data, a data server in which the aforesaid data are stored and a master server that transmits data storage location information which is accessed by the printer client, all connected through a network, wherein the printer client specifies a desired target for printing and notifies it to the master server, then, the master server transmits the data storage location information to the printer client, the printer client accesses the data server based on the data storage location information received, then, the printer client downloads data from the data server, and the printer client executes printing and notifies the results of printing to both of the master server and the data server or to one of them.

Owing to the print system described in Structure 6, it has become possible to judge based on the results of printing whether or not to conduct accounting to the printer client on both or one of the master server and the data server, because the results of printing are notified to both or one of the master server and the data server.

(Structure 7)

A print system having therein a printer client that forms images based on data, a data server in which the aforesaid data are stored and a master server that transmits data storage location information which is accessed by the printer client, all connected through a network, wherein the printer client requests the master server to log-in, the master server authenticates the request for log-in of the printer client, the printer client specifies a desired target for printing and notifies it to the master server, the master server transmits quotation information concerning the specified target for printing to the printer client, the printer client displays quotation charges based on the quotation information, the printer client transmits order signals to the master server when ordering in accordance with the quotation information, the master server transmits job ID information and data storage location information to the printer client after receiving the order signals, the printer client accesses the data server based on the data storage location information obtained and transmits job ID information and printing specifications to the data server, the data server conducts data conversion processing and encryption processing based on the printing specifications on the data specified based on job ID information, the printer client downloads transmission type data which have been subjected to the data conversion processing and encryption processing from the data server, the printer client decrypts the transmission type data for executing printing, and notifies the results of printing to both or one of the master server and the data server after completion of printing, and the master server conducts the payment charging process based on the results of printing.

Owing to the print system described in Structure 7, it has become possible for the master server to judge based on the results of printing whether or not to conduct accounting to the printer client, because the printer client decrypts the transmission type data for executing printing, and notifies the results of printing to both or one of the master server and the data server after completion of printing, and the master server conducts the payment charging process based on the results of printing.

Further, it has become possible for the master server to specify the printer client representing a target for accounting, because the printer client requests the master server to log-in and the master server authenticates the request for log-in of the printer client.

Further, it has become possible to prevent a possibility of print failure and delay, an increase of processing load for the printer client, illegal copies for the target data and the so-called pretender by a third person, because the data server conducts data conversion processing and encryption processing based on the printing specifications on the data specified based on job ID information, the printer client downloads transmission type data which have been subjected to the data conversion processing and encryption processing from the data server and the printer client decrypts the transmission type data to execute printing.

Further, it has become possible to know the amount of money for accounting in advance on the printer client side, because the master server transmits quotation information concerning the specified target for printing to the printer client, the printer client displays quotation charges based on the quotation information and the printer client transmits order signals to the master server when ordering in accordance with the quotation information.

(Structure 8)

A printer client in a print system that downloads data from the system on the service side and conducts printing with the printer client based on the aforesaid data, wherein a location of the data is obtained by accessing the system on the service side, then, data are downloaded from the system on the service side based on the obtained data location, and printing is carried out based on the downloaded data so that the results of the printing are notified to the system on the service side.

Owing to the print system described in Structure 8, it has become possible to judge whether or not to conduct the payment charging to the system on the service side, because the results of printing are notified to the system on the service side.

(Structure 9)

A system on the service side in a print system that downloads data from the system on the service side and conducts printing with a printer client based on the aforesaid data, wherein the printer client that has been accessed is caused to obtain data location, then, data are downloaded to the printer client which has obtained the data location, and the results of printing submitted by the printer client that conducted printing based on the aforesaid data are received.

Owing to the system on the service side described in Structure 9, it has become possible for the system on the service side to judge whether or not to conduct the payment charging based on the results of printing, because the printer client notifies the results of printing to the system on the service side.

(Structure 10)

A printer client in a print system having therein a printer client that forms images based on data, a data server in which the aforesaid data are stored and a master server that transmits data storage location information that is accessed by the printer client, all connected through a network, wherein a desired printing target is specified and is notified to the master server, data storage location information transmitted from the master server is received, the data server is accessed based on the data storage location information received, data are downloaded from the accessed data server, and printing is carried out based on the downloaded data and the results of printing are notified to both or either one of the master server and the data server after completion of printing.

Owing to the printer client described in Structure 10, it has become possible to make the system on the service side to judge whether or not to conduct accounting, because the results of printing are notified to the system on the service side.

(Structure 11)

A data server in a print system having therein a printer client that forms images based on data, a data server in which the aforesaid data are stored and a master server that transmits data storage location information that is accessed by the printer client, all connected through a network, wherein data are downloaded to the printer client that has been accessed based on the data storage location information received from the master server, and the printer client that executed printing based on the downloaded data receives the results of printing notified after termination of printing.

Owing to the data server described in Structure 11, it has become possible, in the data server, to judge based on the results of printing whether or not to conduct the payment charging, because the printer client notifies the results of printing to the data server.

(Structure 12)

A master server in a print system having therein a printer client that forms images based on data, a data server in which the aforesaid data are stored and a master server that transmits data storage location information that is accessed by the printer client, all connected through a network, wherein when the printer client specifies a desired target for printing and notifies it, data storage location information corresponding to the target for printing is transmitted to the printer client, and the printer client that has executed printing based on the data downloaded from the data server based on the received data storage location information receives the results of printing notified after termination of printing.

Owing to the master server described in Structure 12, it has become possible, at the master server, to judge based on the results of printing whether or not to conduct the payment charging, because the printer client notifies the results of printing to the system on the service side.

(Structure 13)

A print system downloading data from a system on the service side and executing printing with a printer client based on the aforesaid data, wherein the printer client is equipped with plural printers, and a printer selected from the plural printers executes printing from the downloaded data by taking its share.

Owing to the print system described in Structure 13, it has become possible to disperse load in executing extensive printing and to execute printing with remaining printers even when printing failures are caused on some of the plural printers.

(Structure 14)

A printer in a print system to download data from a system on the service side and to execute printing on a printer client based on the aforesaid data, wherein a data location is obtained by accessing the system on the service side, data are downloaded from the system on the service side based on the obtained data location, printing is conducted based on the downloaded data, and the results of printing are notified to the system on the service side.

Owing to the printer described in Structure 14, it has become possible to make the system on the service side to judge based on the results of printing whether or not to conduct accounting, because the results of printing are notified to the system on the service side.

(Structure 15)

A printer in a print system having therein a printer client that forms images based on data, a data server in which the aforesaid data are stored and a master server that transmits data storage location information that is accessed by the printer client, all connected through a network, wherein a desired target for printing is specified and is notified to the master server, data storage location information transmitted from the master server is received, the data server is accessed based on the received data storage location information, data are downloaded from the accessed data server, and printing is carried out based on the downloaded data and results of printing are notified to both or either one of the master server and the data server after termination of printing.

Owing to the printer described in Structure 15, it has become possible to make the system on the service side to judge based on the results of printing whether or not to conduct accounting, because the results of printing are notified to the system on the service side.

(Structure 16)

A print system having therein a service system that is provided with a storage unit for storing image data of a book and offers image data, and a printer client which makes a copy of a book by obtaining image data stored in the aforesaid storage unit through a communication network and forms images on a recording material based on the image data obtained, wherein first charge information relating to the image data is stored on the service system side and second charge information relating to the aforesaid image forming is stored on the printer client side, and a charge of copies relating to copies of a book is calculated based on the first charge information and the second charge information.

(Structure 17)

A print system having therein a service system that is provided with a storage unit for storing image data of a book and offers image data, and a printer client which makes a copy of a book by obtaining image data stored in the aforesaid storage unit through a communication network and forms images on a recording material based on the image data obtained, wherein calculation of a charge of copies relating to copies of a book is conducted based on the first charge information relating to the image data established on the service system side and the second charge information relating to the image formation established on the printer client side.

(Structure 18)

A print system having therein a service system that is provided with a storage unit for storing image data of a book and offers image data, and a printer client which makes a copy of a book by obtaining image data stored in the aforesaid storage unit through a communication network and forms images on a recording material based on the image data obtained, wherein a charge of copies relating to copies of a book is calculated based on the first charge information concerning the image data which can be established on the service system side and includes data charge that converts royalties relating to copyright of a book into image data and including service charge offering the image data, and based on the second charge information relating to the image forming which can be established on the printer client side and includes charges of materials used in image forming by the printer client and charges for using machines.

(Structure 19)

A printer client that makes copies of a book by forming images on recording materials based on image data obtained from a service system through a communication network, wherein a charge of copies relating to copies of the book is calculated based on first charge information concerning the aforesaid image data and second charge information concerning the image forming.

(Structure 20)

A service system that is equipped with a storage unit storing image data of a book and provides image data to a printer client through a communication network, wherein a charge of copies relating to copies of the book is calculated based on first charge information concerning the aforesaid image data and second charge information concerning image forming conducted by the printer client.

(Structure 21)

A charge calculation method in a print system having therein a service system that is provided with a storage unit for storing image data of a book and offers image data, and a printer client which makes a copy of a book by obtaining image data stored in the aforesaid storage unit through a communication network and forms images on a recording material based on the image data obtained, wherein a charge of copies relating to copies of the book is calculated based on first charge information concerning the aforesaid image data and second charge information concerning the image forming.

(Structure 22)

An accounting method in a print system having therein a service system that is provided with a storage unit for storing image data of a book and offers image data, and a printer client which makes a copy of a book by obtaining image data stored in the aforesaid storage unit through a communication network and forms images on a recording material based on the image data obtained, wherein a charge of copies relating to copies of the book is subjected to accounting based on first charge information concerning the aforesaid image data and second charge information concerning the image forming.

(Structure 23)

A print system having therein a service system that is provided with a storage unit for storing image data of a book and offers image data, and a printer client which makes a copy of a book by obtaining image data stored in the aforesaid storage unit through a communication network and forms images on a recording material based on the image data obtained, wherein a charge of copies relating to copies of a book varies depending on conditions of the image forming.

BRIEF DESCRIPTION OF THE DRAWINGS

FIG. 8 is a flow chart explaining another operations of a print system.

FIG. 9 is a diagram showing outline of the reprinting charges.

FIGS. 18(A) to 18(D) each shows information to be transmitted to the service system from image forming apparatus 101 in a BOD mode.

DETAILED DESCRIPTION OF THE PREFERRED EMBODIMENT

There will be explained embodiments of the invention to which, however, the invention is not limited.

Figure 1:
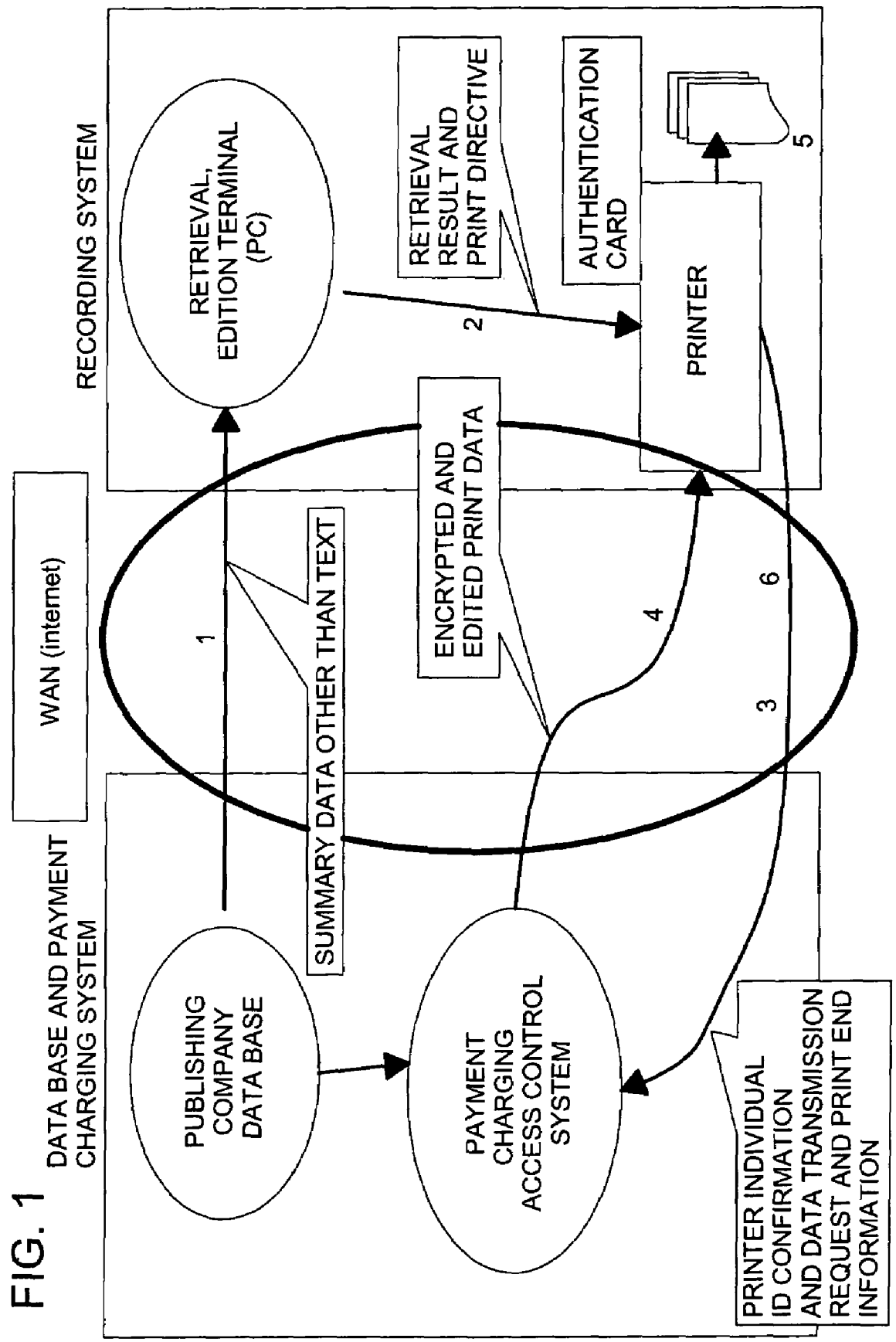
FIG. 1 is a diagram showing an embodiment of the invention.

FIG. 1 is a diagram showing an embodiment of the invention.

An explanation will be given to 1. (this figure corresponds to the figure in FIG. 1).

Conforming to the directive of a user, a recording system having therein a personal computer (PC) and a printer accesses a data base storing therein data indicating images or characters based on which the user wants to make prints, and conducts retrieval of data base.

Incidentally, in this case, the recording system may identify the user who can use the recording system, as occasion demands, by using a means such as a password and others.

The results of the retrieval from the data base are displayed on a display unit of a personal computer on the system. Information transmitted from the data base to be displayed may also be encrypted to be communicated.

In this case, contents to be displayed are not text contents of the information (the whole sentence including characters and images which can correspond to a table of contents and a summary) but are a summary and a table of contents. (When a text is displayed, the text needs to be protected so that electronic copying and recording from the state of display may not be conducted, but when an ordinary internet and PC are used, it is very difficult to protect, although the restriction at a certain level is made possible by an electronic watermarking method. Therefore, the text should not be displayed, or there must be used nothing but a system wherein a display unit and a communication means are undetachable substantially from a printer (recording apparatus.)

An explanation will be given to 2.

The results of retrieval in 1. are transmitted to the printer (recording apparatus). Incidentally, this transmission operation is not necessary when conducting the aforesaid retrieval with an individual printer (recording apparatus) without using PC.

An explanation will be given to 3.

A printer (recording apparatus) encrypts information which specifies text information together with an identification code that is owned by the printer and identifies the printer, and requests a data base for text information. Incidentally, it is also possible to encrypt, with an encryption means owned by the printer, both the information which specifies text information with the identification code and a code derived from the identification code both serving as a part of an encrypting key and the identification code.

Further, it is more preferable to request accounting information only before requesting text information and to confirm an amount of money, because it is possible to confirm when accounting information is notified, and thereby to discover a wiretap in a rare possibility and altering of data.

This identification code may also be embedded in a recording system or in a recording apparatus to be undetachable substantially (by the use of ROM or a switch, for example). In that case, it is impossible to identify a user although it is possible to authenticate the system itself. Therefore, the identification code is made to be detachable from the printer (recording apparatus) or from the recording system (by storage element of identification code (IC card) and storage of a user (a user of authentication password stores a password)), and when an element wherein an identification code is stored is used, it is preferable to entrust the element to a responsible manager, and accounting is conducted to the manager.

An IC card having the structure wherein the card itself is not copied easily is preferable as an element that stores an identification code.

When conducting recording by the use of the present recording system, a managerial responsible person inputs an identification code in a recording apparatus in advance. In this case, it is also possible to use a password or an authentication means to authenticate the subject (for example, authentication by finger prints, voices, faces and retinal images) for the purpose of authenticating whether the manager is correct or not.

An explanation will be given to 4.

A data base identifies a recording system of the target based on the identification code transmitted to the data base, then, after authenticating that the recording system is correct, the data base encrypts text information, the identification code and other accompanying information (authentication code transmission time and random numbers) and transmits encrypted information to the recording system of the requesting source. Incidentally, it is also possible to notify an amount of money relating to accounting generated when prints are made, before notifying the encrypted text information.

An explanation will be given to 5.

A printer (recording apparatus) decrypts cryptograph information transmitted to the printer based on request data transmitted and its own identification code, and records them as a hard copy based on decrypted information. Then, the results of recording (information about successful prints and failed (error) prints in terms of specified information, the number of prints and the time) on the hard copy are encrypted by an encryption means owned by the printer, in the same way as in requesting the data base for text information, to be sent to the data base. Incidentally, this recording results may also be notified directly or indirectly to the data base from the printer.

It is preferable from the viewpoint of data protection that encrypted and received text information is not preserved momentarily in the recording system. However, when a printer having high possibility for generation of inability in printing is used as a printer (recording apparatus), it is preferable that a memory wherein encrypted text information before decrypting is preserved temporarily is provided in the printer so that the information is stored in the memory, and information of the text corresponding to the error portion is read out from the memory so that print retry can be made.

An explanation will be given to 6.

A data base decrypts the results of recording transmitted from its print system, and calculates a charge in accordance with an amount (number of sheets) of prints and contents of data (the number of colors used in printing, image resolution and others) based on the results of recording, and updates and stores accounting information in the accounting access control system for an owner (a person to control identification code) of the printer that made prints.

Incidentally, for confirmation, it is possible to encrypt and transmit accounting information generated by prints in the past and accounting information generated by prints made this time both in the accounting access control system for the recording system that has made prints, in the same way as in transmitting text information to the print system.

Further, when results of recording are not notified from the recording system to the accounting access control system within a certain period of time from the moment of transmission of the text, or when the request for transmission of the text is repeated and results of recording are not notified accordingly, the accounting access control system may caution a manager of the accounting access control system of the possibility about troubles of a communication means and a recording system, a wiretap and about notification of wrong information.

Further, not only results of recording of encrypted information but also accumulated information in the past for ordinary copies and prints employing information which is not encrypted, and information of errors caused on a printer (recording apparatus) in the past and at the present time may be notified to the accounting access control system or to a maintenance control system for a printer that is not explained here, to be utilized for maintenance control of the printer (recording apparatus).

Figure 2:
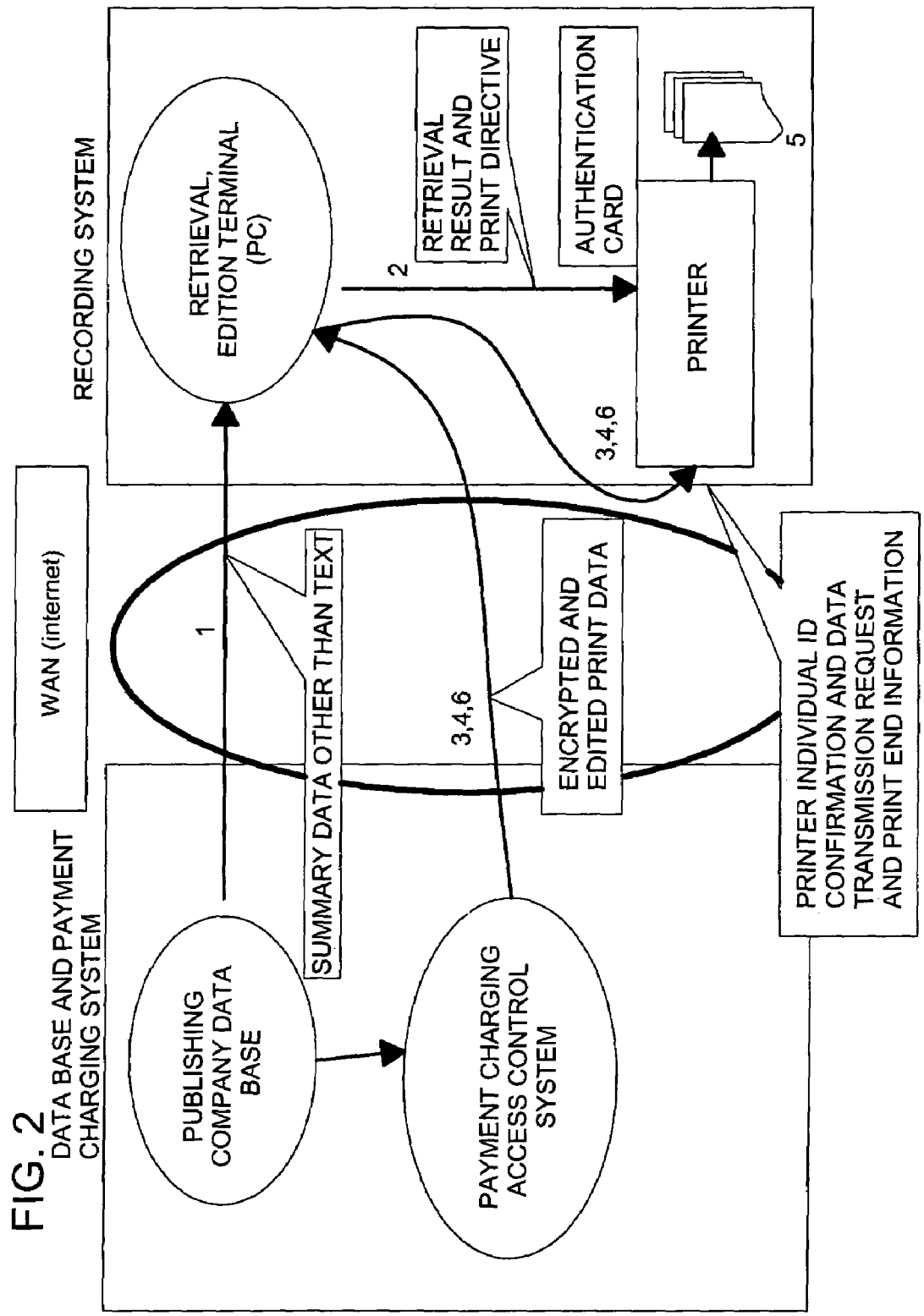
FIG. 2 is a diagram showing another embodiment of the system.

The following is supplementation for the explanation of FIG. 1 and FIG. 2.

Any of those including an electrostatic photographic system, an IJ system, a silver halide system, a sublimation system and a fusion system can be used as a printer (recording apparatus). However, it is preferable that a print based on digital data can be made.

As an element to store therein an identification code for the subject in a printer (recording apparatus), an IC card and a magnetic card may also be used.

The printer (recording apparatus) is equipped with a mode to receive encrypted information and a mode (hereinafter referred to also as a plaintext mode) to receive ordinary data (information that is not encrypted) to print. These modes can either be switched mechanically or be switched by using electronic information.

It is also possible to arrange so that a plaintext mode can be switched to a cryptograph mode by a specific code.

It is also possible to arrange so that a cryptograph mode can be switched to a plaintext mode by a specific code wherein encrypted data are decrypted. It is preferable that a plaintext mode is selected when a power source is turned on.

It is preferable that a cryptograph mode is switched to a plaintext mode when data receiving is suspended for a certain period of time or more in the cryptograph mode, and that establishment can be changed freely within the certain period of time.

When a recording error is caused, it is preferable that a printer (recording apparatus) conducts retrying on the spot and notifies the results including causes of retrying if the retrying is successful.

When the retrying is terminated normally, it is preferable to eliminate encrypted text information.

It is also possible to make an arrangement wherein when print errors are caused, a printer notifies the results momentarily to the accounting access control system without eliminating encrypted text information, then, notifies the occurrence of the errors to an operator, and conducts recording operation again after appropriate actions are taken and notifies the results again, and then, eliminates the encrypted text information after normal termination.

The recording system may also be arranged so that it can store encrypted text information equivalent to plural documents.

It is also possible to arrange so that encrypted text information is eliminated after the lapse of a prescribed period of time from receiving of the encrypted text information, independently of the results of recording.

The recording system can store plural pieces of encrypted text information. It is also possible to arrange so that encrypted text information for successful printing is eliminated after recording.

It is also possible to arrange so that the recording system can store plural pieces of encrypted text information.

It is also possible to arrange so that encrypted text information for successful results of recording only is eliminated after the lapse of the first prescribed period of time.

It is also possible to arrange so that encrypted text information for unsuccessful results of recording is eliminated after the lapse of the second prescribed period of time.

It is also possible to arrange so that the recording system can store plural pieces of encrypted text information.

It is also possible to arrange so that encrypted text information for successful results of recording is eliminated in the order wherein encrypted text information having the longest time elapsed comes first, when the recording capacity is lowered to the level of prescribed capacity.

When the recording capacity is still insufficient, it is also possible to arrange so that encrypted text information for unsuccessful results of recording is eliminated in the order wherein encrypted text information having the longest time elapsed comes first.

The system may be represented by the recording system described in the previous paragraph, a data base control system having a recording apparatus and a retrieval system, and may have a communication means for which an internet may be used. The system described in the previous paragraph makes its confirmation to be sure by mailing the accounting information separately. It is also possible to arrange so that the system described in the previous paragraph preserves encrypted information in media to deliver it. The recording system may also be arranged to notify information of results with a communication means in the course of recording.

Authentication of the subject does not request the degree of safety which is as high as that for an authentication means for recording. The one having simple authentication procedures is preferable. A user who conducts retrieval and a person who pays charges for prints are sometimes different each other, and when authenticate both of them, it is also possible to conduct authentication as another person.

FIG. 2 is a diagram showing another embodiment of the system.

Incidentally, items having symbols which are the same as those in FIG. 1 represent the same items, and explanation of them will be omitted here.

In the present embodiment, a printer does not have a communication means for communicating with data base directly.

Information of the retrieval results and print directive shown with "2" is temporarily encrypted in the printer based on an identification code and other information, and is sent back to the retrieval system. The retrieval system send the information to the data base.

Encrypted text information from the data base is sent to the printer without being decrypted through the retrieval system.

Further, print results are also notified through the retrieval system in the same way.

In this case, confirmation processing between the data base and the printer is more important than in the case of FIG. 1, because the risk of wiretap and altering of information in the retrieval system is increased.

Namely, it is preferable that control on each side up to accounting quotation, notification of print results and notification of accounting information after transmission of text information is conducted more strictly than in the occasion in FIG. 1.

Namely, each control of time interval, confirmation of retrying, confirmation of the frequency of retrying, and further, using a different key for an encryption means for each print are preferable.

When these control exceed the control limits, it is preferable to execute the processing to judge the exceeded control limits to be abnormal, and to include interruption of text transmission thereafter and operations to record from cryptographs.

The present system is explained on the basis of the relationship between server and print client.

Figure 3:
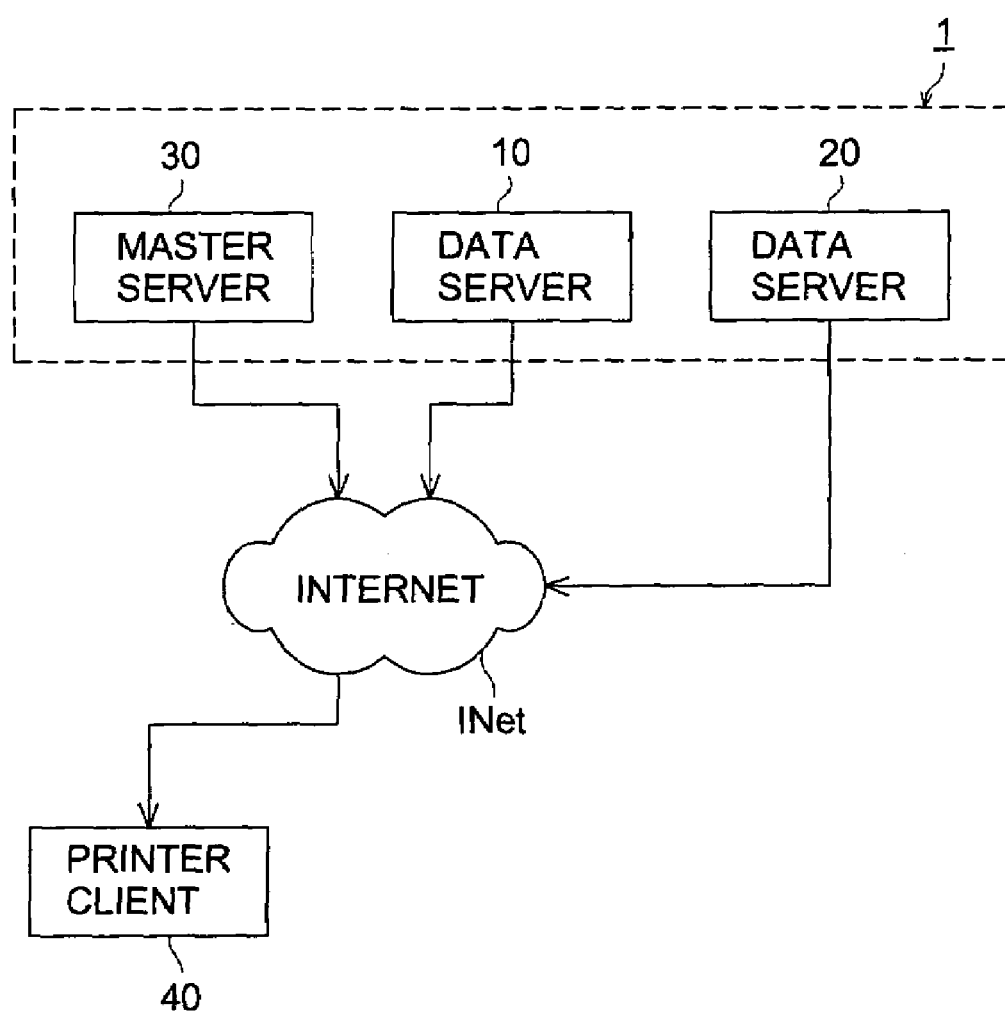
FIG. 3 is an illustration showing the basic structure of a print system.

FIG. 3 is an illustration showing the basic structure of a print system. The print system is the structure that conducts sending and receiving for each of data servers 10 and 20, master server 30 and printer client 40 through internet INet.

The internet INet is an aggregation of networks wherein LAN (local area networks) installed in research institutions, public institutions and corporations are constantly connected mutually by technologies of WAN (wide area network), and it is a network developed almost spontaneously on a scale to cover the whole world. A node which can be communicated through protocol (TPC/IP) used in the internet is capable of being communicated through mutual discrimination.

In the internet INet, an IP address is used as an identifier for discriminating each node, and it is further possible to specify directly a file stored in each node by means of URL (Uniform, Resource, Locator). Data server 10, master server 30 and printer client 40 which are provided in the print system are examples the node mentioned above.

The data server 10 is controlled by and installed in a publishing firm, wherein digital data (hereinafter referred to as text data) concerning books and others are stored in a hard disk having a large capacity, to be transmitted at request from printer client 40. Before the transmission, the text data are converted, compressed and encrypted, and thereafter transmitted together with a digital signature. Incidentally, the text data represent an example on printing in the invention.

The data server 20 is also equipped with the structure that is mostly the same as that for the data server 10, and text data (digital data concerning other books) differing from those for the data server 10 are stored in the data server 20.

The master server 30 is controlled by and installed in a management dealer who controls delivery service of text data, for example, and it offers information of data storage location which makes it possible to access each text data stored in data servers 10 and 20, at request from printer client 40.

Service side system 1 representing an example of a service side system of the invention is structured with data servers 10 and 20 and master server 30. In FIG. 3, there is shown, as an example of a service side system, an example wherein one master server 30 and two data servers 10 and 20 are connected to internet INet. However, it is also possible to structure service side system 1 by connecting more data servers and master servers.

The printer client 40 conducts download of text data from data server 10 or 20 constituting service side system 1, based on the data storage location information obtained through its request to master server 30, and conducts printing based on the text data. The download in this case does not restrict specific procedures and mutual actions of data server 10 and printer client 40, but it is used in a sense that printer client 40 obtains data stored in data server 10.

In some cases, the printer client 40 is controlled by and installed in a convenience store to be used freely by unspecific users, and in other cases, it is installed in a business location to be used by specific users such as employees of the business location.

The service side system 1 conducts calculation of accounting information for the printer client 40 who has obtained text data and made prints, and conducts the payment charging process based on the calculation results. Prior to the accounting, the service side system 1 confirms the results of printing notified by the printing at the printer client 40, then, judges success/failure of the printing, and conducts the payment charging process in accordance with the results of the printing. The present embodiment shows an example wherein the results of the printing is confirmed by data server 10, and the payment charging process is conducted by master server 30.

The data servers 10 and 20, the master server 30 and the printer client 40 are capable of conducting mutually the communication encrypted through a public key system. Namely, each of them specifies the transmitting source by decrypting digital signature relating to the data received by each of them through a public key of the transmitting source, and prevents a pretender by another node, and it further encrypts the data to send through its own secret key to prevent wrong copies by another node.

Figure 5:
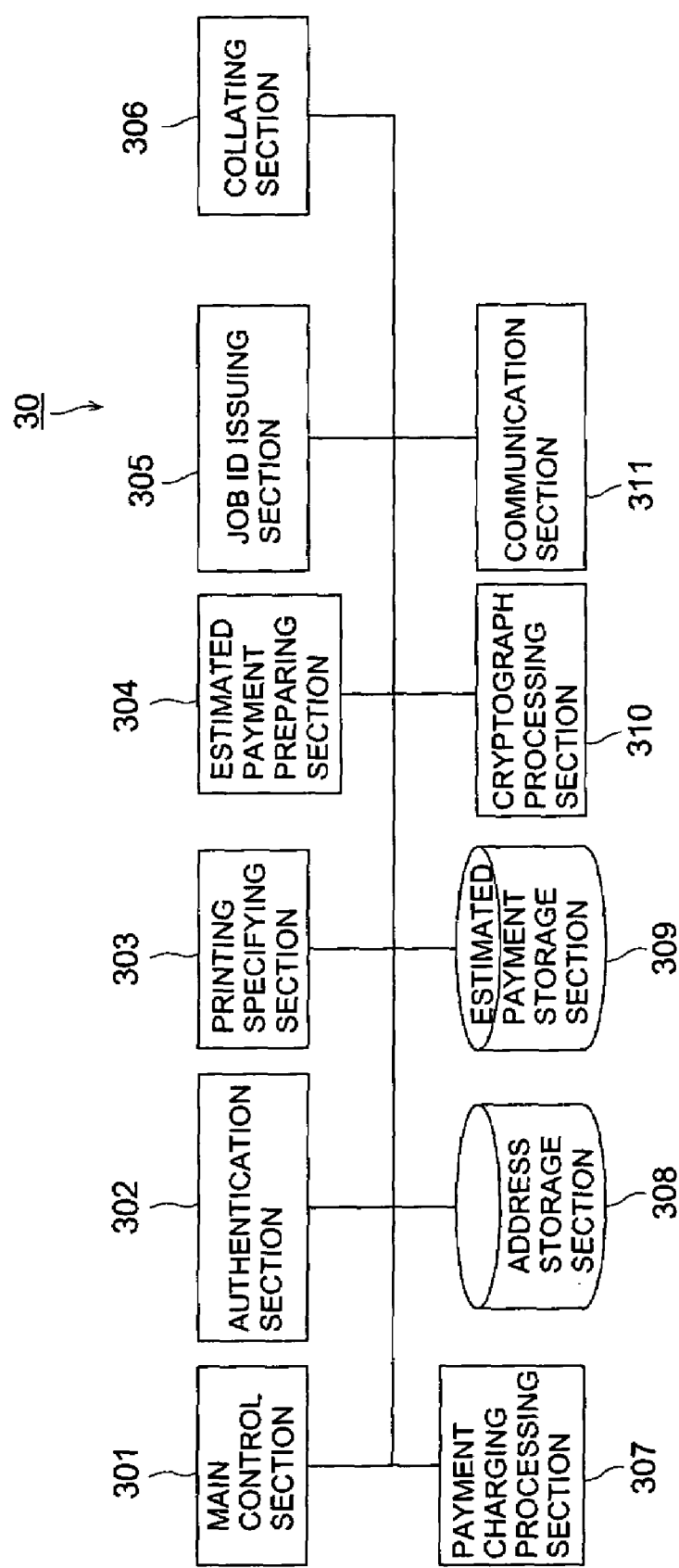
FIG. 5 is a block diagram explaining the detailed structure of master server 30.
Figure 6:
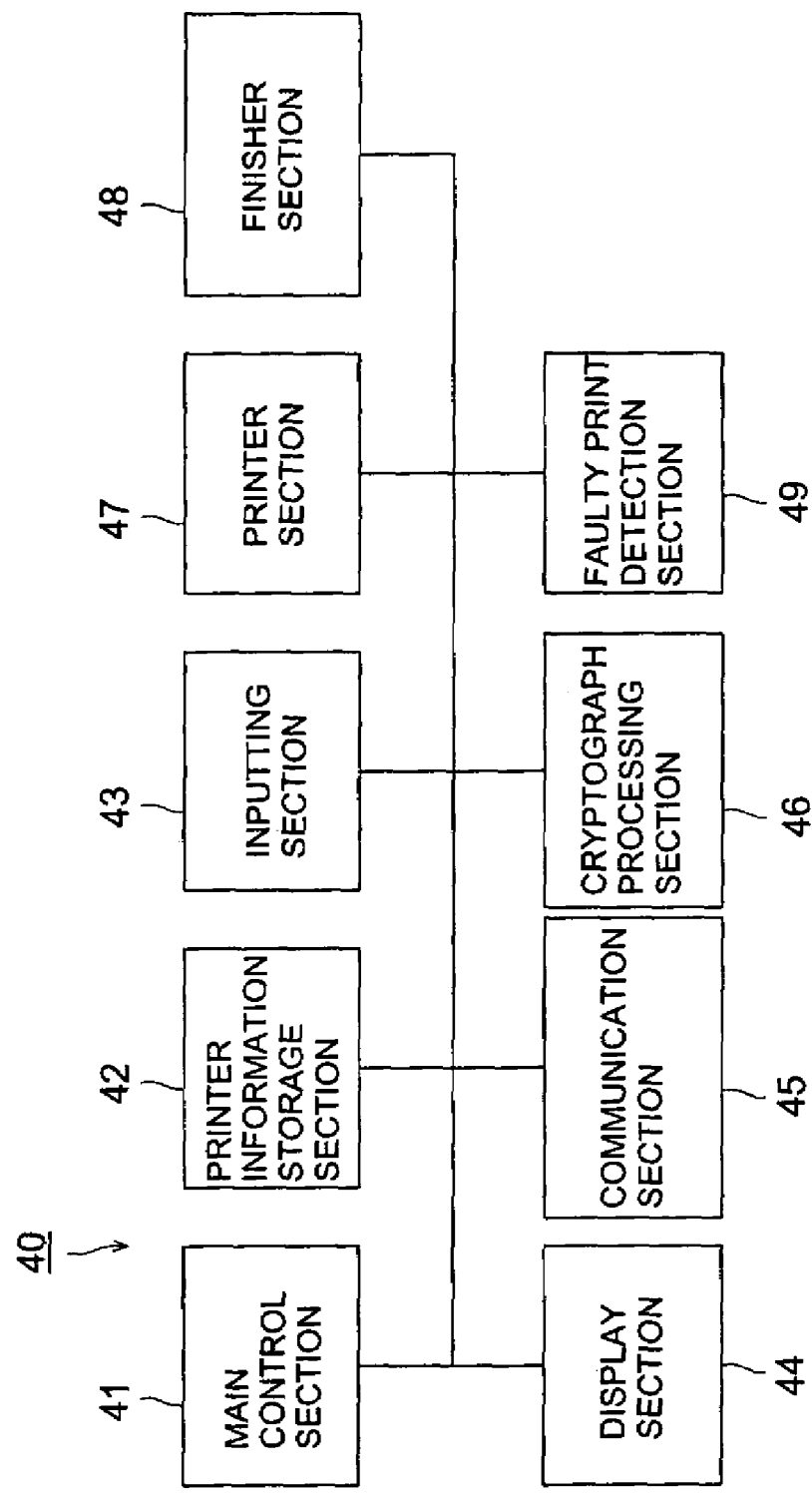
FIG. 6 is a block diagram explaining the detailed structure of printer client 40.

Next, the structure of each of data server 10, master server 30 and printer client 40 will be explained as follows, referring to drawings, 4–6. Incidentally, FIG. 4 is a block diagram explaining the detailed structure of data server 10, FIG. 5 is a block diagram explaining the detailed structure of master server 30, and FIG. 6 is a block diagram explaining the detailed structure of printer client 40.

Figure 4:
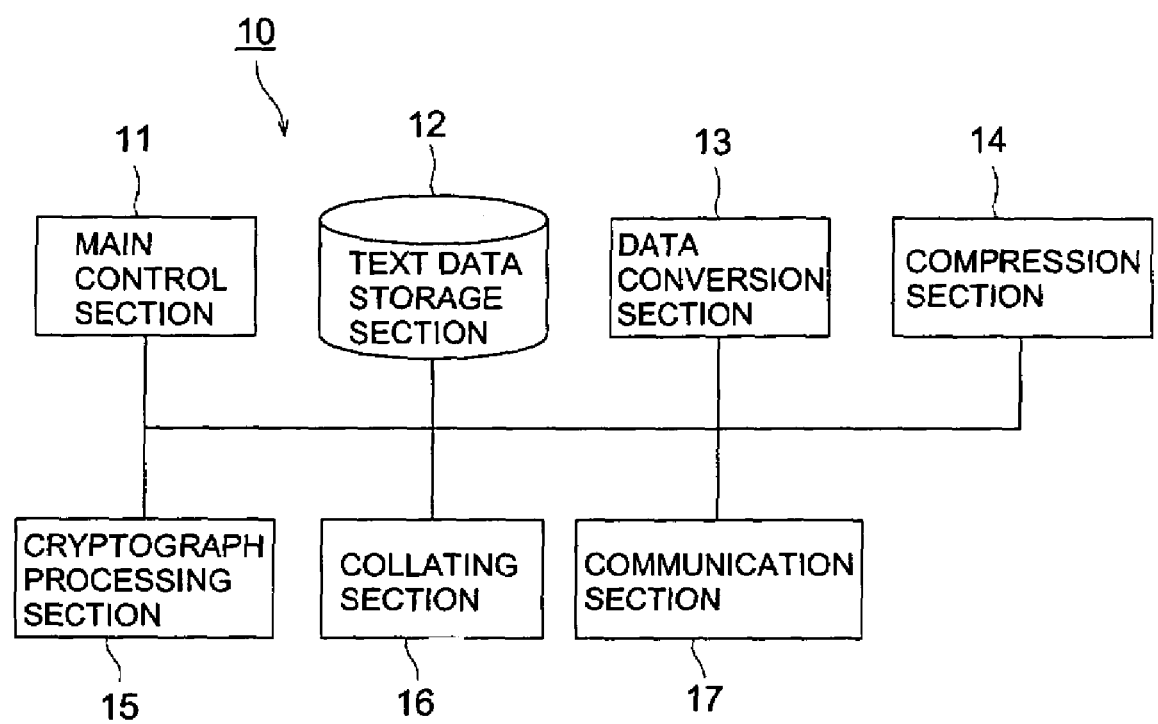
FIG. 4 is a block diagram explaining the detailed structure of data server 10.

In FIG. 4, the data server 10 has therein main control section 11, text data storage section 12, data conversion section 13, compression section 14, cryptograph processing section 15, collating section 16 and communication section 17, and each of them is connected to others in the internal bus.

The main control section 11 is composed of a central processing unit (CPU), a main storage unit and an auxiliary storage unit, and it controls each part and the whole of the data server 10.

The text data storage section 12 is equipped with a large capacity hard disk to store text data. The text data are compiled as a copy in a book style, and data capable of being outputted are made to be a file. The main control section 11 controls the large capacity disk stated above through an arbitrary file system, and it can read or write the aforesaid file relating to arbitrary text data by specifying, for example, names of a path and a file. Further, the main control section 11 can select each page from the text data composed of plural pages. AS a storage medium equipped in the text data storage section 12, arbitrary storage media such as optical disks and magnet-optic disks can be used, without being limited to the hard disks.

The data conversion section 13 converts the stored text data into data for printing capable of being printed, in accordance with printing specifications requested by printer client 40 and with hardware-like power of the printer client 40. Data conversion processing includes, for example, rearrangement in the order of pages, or rearrangement in accordance with hardware-like power of printer client 40, rearrangement in accordance with printing specifications. In particular, when printing on a unit of a book is requested, namely, when printing for all pages of text data is requested, the rearrangement mentioned above needs to be conducted. In the case of the request in a unit of pages, the rearrangement sometimes does not need to be conducted, resulting in capability for complying with printers of various structures. With regard to the printing specifications and hardware-like power of printer client 40, they will be described later when the printer client 40 is explained.

The compression section 14 compresses data for printing to the size that is suitable for communication through the compression processing method that can be extended in printer client 40. Any method can be used as a compression processing method. Data server 10 is capable of doing plural methods of compression processing, and it can communicate with various printer clients 40 for compressed data for printing.

The cryptograph processing section 15 conducts encryption and decryption by means of a public key method, as will be described later. With regard to data to be sent by data server 10, the cryptograph processing section 15 adds digital signature which the cryptograph processing section 15 encrypted with its own secret key to the data and it sends them after encrypting them through the public key of a transmitting destination. Further, the cryptograph processing section 15 decrypts the digital signature of the data received by means of the public key of the transmitting source to specify the transmitting source, and when the cryptograph processing section 15 receives the data encrypted by its public key, the cryptograph processing section 15 decrypts the data with its own secret key. Encrypting of the text data is conducted after both conversion processing from the text data into data for printing and compression processing to data for printing are conducted.

The collating section 16 collates whether the request from printer client 40 is authenticated by master server 30 or not. In the case of the collation, job ID (described later) received from printer client 40 is transmitted to master server 30 to request the collation of whether the print job relating to the job ID is a print job granted by the master server 30 or not, and the results of the collation by the master server 30 are trusted.

The communication section 17 executes, by means of the known protocol, communication between data server 10 and master server 30 and communication between data server 10 and printer client 40, through internet INet.

Without limiting to the hardware structure, the data conversion section 13, compression section 14, cryptograph processing section 15 and collating section 16 can introduce the structure which processes text data stored in text data storage section 12 by the software executed in main control section 11, and executes collation of the job ID received by the communication section 17.

Further, it is also possible to employ the structure wherein the data conversion section 13 is provided in printer client 40 as described later.

In FIG. 5, the master server 30 has therein main control section 301, authentication section 302, printing specifying section 303, quotation preparing section 304, job ID issuing section 305, collating section 306, the payment charging process section 307, address storage section 308, quotation storage section 309, cryptograph processing section 310 and communication section 311, and these sections are connected with each other by the internal bus.

The main control section 301 is composed of a central processing unit (CPU), a main storage unit and an auxiliary storage unit, and each part and the whole of the master server 30 are controlled based on a program recorded on the auxiliary storage unit.

When there is a request for log-in from printer client 40, the authentication section 302 judges correctness of either one or both of the printer client 40 and a user who operates the printer client 40. When they are correct, the printer client 40 is allowed to continue the procedures described later, but when they are not correct, the printer client 40 is prohibited to continue the procedures described later. When there is a request for log-in again from the printer client 40, judgment of correctness is formed newly, and the printer client 40 is allowed to execute procedures explained later, when they are correct.

The printing specifying section 303 specifies text data stored in text data storage section 12 of data server 10 based on a request of printer client 40, and determines the data storage location corresponding to the text data. Since the printer client 40 specifies text data with requested book code in the present embodiment, the relevant data storage location information is determined based on the corresponding table stored in address storage section 308.

Based on the number of prints relating to printing specifications established by printer client 40 and on the specified text data, the quotation preparing section 304 calculates an amount of money (hereinafter referred to as an estimated amount) to be charged to a user who operates the printer client 40, and generates quotation data showing the estimated amount clearly. The estimated amount is displayed on a display section of the printer client 40 which has received estimated data. The quotation preparing section 304 gives specific quotation ID to each quotation data generated. Further, the quotation preparing section 304 establishes the term of validity of the quotation data prepared, and the main control section 11 estimates quotation data to be stored in storage section 309, for the period of the term of validity established by the quotation preparing section 304.

The job ID issuing section 305 issues specific job ID for each print job relating to the order request from the printer client 40 which has granted the estimated amount. The print job means a series of operations ranging from communication of text data relating to the specified one case of text data to the payment charging process, and communication, printing, communication of printing results and the payment charging process, all executed by each of data server 10, master server 30 and printer client 40 and between them are allocated to any of print jobs. Since the communication, printing, communication of the printing results and the payment charging process, all for the text data can be specified by the given job ID, data server 10 and master server 30 can specify the user or the printer client for various requests and processing by many printer clients and many users.

The collating section 306 collates job ID to comply with request for collation from data server 10, and returns the results of the collation to data server 10. Collation by the collating section 306 is one to check whether the job ID requested for collation and communicated from data server 10 agrees with one issued by job ID issuing section 35 or not. Since the request from printer client 40 to data server 10 to obtain text data is provided with job ID issued by job ID issuing section 35, if the results of the collation indicating the agreement are returned from master server 30, the data server 10 judges that the request of the printer client 40 is correct and complies with the request, while, if no agreement is shown in the collation, the data server 10 judges that the request of the printer client 40 is not correct, and does not comply with the request.

The payment charging process section 307 conducts the payment charging process for printer client 40 or for a user who operates the printer client 40, in accordance with printing results returned from the printer client 40.

In the address storage section 308, there is stored a cross-reference table for the requested book code transmitted from the printer client 40 and for data storage location information for text data specified by the requested book code. In the present embodiment, the data storage location information is data wherein IP address of data server 10 that stores text data and a path as well as a file name of text data stored in data server 10 are combined, and when text data are composed of plural pages, the page number that specifies an arbitrary page is included.

The quotation storage section 309 stores quotation data prepared by quotation preparing section 304 for the period of the term of validity. The main control section 301 can eliminate or change quotation data stored in the quotation storage section 309, in accordance with the request from the printer client 40 for elimination and change of quotation data within the term of validity.

The cryptograph processing section 310 executes encryption and decryption through a public key system, as described later. The cryptograph processing section 310 adds digital signature encrypted by its own secret key to the data for submission by master server 30 to send them after encrypting them by a public key of the transmitting destination. Further, the cryptograph processing section 310 decrypts the digital signature of the data received by the use of a public key of the transmitting source to specify the transmitting source, and when it receives the data encrypted by its own public key, it decrypts them by its own secret key.

The communication section 311 executes, by means of the known protocol, communication between data server 10 and master server 30 and communication between the master server 30 and printer client 40, through internet INet.

It is also possible to employ the structure wherein authentication section 302, printing specifying section 303, quotation preparing section 304, job ID issuing section 305, collating section 306, the payment charging process section 307, and cryptograph processing section 310 execute processing by utilizing data of address storage section 308, quotation storage section 309 and text data storage section 302, as a software executed by the main control section 301, without limiting to the hardware structure, and the results of the processing are transmitted to data server 10 and printer client 40 through communication section 311.

In FIG. 6, printer client 40 has therein main control section 41, printer information storage section 42, inputting section 43, display section 44, communication section 45, cryptograph processing section 46, printer section 47, finisher section 48 and faulty print detection section 49, and these sections are connected with each other by the internal bus.

The main control section 41 is composed of a central processing unit (CPU), a main storage unit and an auxiliary storage unit, and it controls each part and the whole of the printer client 40 based on a program recorded on ROM.

The printer information storage section 42 stores information relating to hardware-like power of the printer section 47 and the finisher section 48. The hardware-like power of the printer section 47 is a power peculiar to the printer section 47 such as the number of pages which the printer section 47 can receive at a time, paper handling on a recording sheet conveyance path, selectable sheet sizes, font types, data forms with which the printer can cope (bit-map, page description language), printable resolution and the number of colors. The hardware-like power of the finisher section 48 is a power peculiar to the finisher section 48 such as capability of binding with a cover and a back cover, capability of middle folding, capability of middle binding, capability of pasting bookbinding, capability of stapling and capability of punching. The data conversion section 13 provided on the data server 10 executes conversion based on the information stated above.

The hardware-like power will be explained as follows.

With regard to the number of pages, for example, when a storage capacity necessary for storage of all pages of text data exceeds a storage capacity of an image memory provided on printer section 47 (described later), it is an item that needs adjustment with data server 10 because there is a possibility of occurrence of memory overflow, when trying to receive the whole text data. The data server 10 divides text data into plural parts in accordance with image memory sizes, wherein, memory overflow can be prevented by transmitting the succeeding part when printing for one preceding part is completed, or when it is confirmed, even in the course of printing, that sufficient unoccupied capacity is secured for image memory, which is preferable. The data conversion section 13 in the present embodiment is arranged to have the structure wherein division is made in accordance with the number of pages which can be stored in printer client 40 at a time.

Further, it is also a preferable procedure wherein, when an image memory over-flows, printer client 40 notifies this so that data server 10 suspends transmission of text data momentarily, and it resumes the transmission of text data when unoccupied capacity for image memory in printer client 40 is secured.

For example, with regard to paper handling in a laser printer of an electrophotographic system, there is known a technology wherein when conducting double-sided copying, plural recording sheets are fed in a circulating path including a reversing section, within a period of time in which the first recording sheet is reversed and printing is conducted on the reverse side of the first recording sheet. In the case of a laser printer having the structure to feed five recording sheets in a circulating path, as an example, when conducting double-sided printing for the text data composed of 10 pages, printing is conducted in the order of the first page (the face of the first sheet), the third page (the face of the second sheet), the fifth page (the face of the third sheet), the seventh page (the face of the fourth sheet), the ninth page (the face of the fifth sheet), the second page (the back of the first sheet), the fourth page (the back of the second sheet), the sixth page (the back of the third sheet), the eighth page (the back of the fourth sheet) and the tenth page (the back of the fifth sheet). Therefore, if the text data are transmitted in the order of pages, there is a possibility of occurrence of overhead for rearranging the order of pages in printer client 40. Accordingly, paper handling in the printer client 40 is an item which needs adjustment of transmission procedures with data server 10. Before transmitting, the data server 10 rearranges the order of pages of text data with data conversion section 13 in accordance with the paper handling.

With regard to the selectable sheet size, for example, when the sheet size necessary for printing of text data can not be selected in printer section 47, there is a possibility that printing is totally impossible, or there is a possibility that format of printing is extremely worsened. Therefore, this is an item that needs adjustment of transmission procedures with data server 10. The data server 10 can conduct processing of reduction or enlargement on text data for transmission with data conversion section 13, in accordance with the selectable sheet size.

With regard to font types, for example, when font types necessary for printing of text data can not be selected in printer section 47, there is a possibility that printing is totally impossible, or there is a possibility that format of printing is extremely worsened, or there is a possibility that printing of letters whose font is not kept in stock is impossible. Therefore, this is an item that needs adjustment of transmission procedures with data server 10. The data server 10 can change a font of text data for transmission, with data conversion section 13, in accordance with the font which can be selected or is specified in printer client 40. Font types to be used for printing of text data can be specified by printer client 40, and it is further possible to specify a bit-map and to specify whether or not to add font data to text data, in addition to specifying of any font.

With regard to a data format with which the printer can cope, for example, even when text data are received in the data format with which printer section 47 (described later) can not cope, there is a possibility that printing is totally impossible on printer client 40, and when data of a bit-map type are transmitted to a printer client that can cope with printer description language capable of reducing a data size, communication capacity is increased. Therefore, this is an item that needs adjustment of transmission procedures with data server 10. It is possible for the data server 10 to change the data format of text data with data conversion section 13 in accordance with a data format with which the printer client 40 can cope, and thereby to transmit.

With regard to printable resolution, for example, when printer client 40 can cope with nothing but fixed resolution, if text data with resolution other than the fixed resolution are received, there is a possibility that printing is conducted under the condition of enlargement or reduction, and when it is possible to print by interpreting resolution of data received by printer client 40, there is a possibility that a user operating printer client 40 wishes to select high resolution (which makes it possible to obtain high image quality) and low resolution (which makes it possible to reduce communication capacity). Therefore, this is an item that needs adjustment of transmission procedures with data server 10. It is possible for the data server 10 to change resolution of text data with data conversion section 13 in accordance with resolution with which the printer client 40 can cope, and thereby to transmit.

For example, in the case wherein middle folding and middle binding are possible in finisher section 48, printer section 47 records 4 pages on a single sheet of recording material, then superposes it in finisher section 48 to fold it on a boundary of a page, or to bind it. When printing N-page text data, the printer section 47 prints a first page and N-th page on the surface of the first sheet, then, prints a second page and (N−1)-th page on the back of the first sheet, then, prints a third page and (N−2)-th page on the surface of the second sheet of recording material, then, prints a fourth page and (N−3)-th page on the back of the second sheet of recording material, and if the text data are transmitted in the order of pages, there is a possibility of occurrence of overhead for rearranging the page order in printer client 40. Therefore, when middle folding and middle binding are possible in the printer client 40, the foregoing is an item that needs adjustment of transmission procedures with data server 10. It is possible for the data server 10 to rearrange the page order of text data with data conversion section 13 in accordance with an order of recording of each page, and thereby to transmit.

Incidentally, the aforesaid sheet size, font types, data format, printable resolution and presence of middle binding and middle folding can be specified by printer client 40. When they are specified by the printer client 40, communication capacity necessary for adjustment can be reduced.

Inputting section 43 is equipped with operation keys for conducting various operations, and a user can establish printing specifications.

The printing specifications represent an option that can be selected by a user who operates printer client 40, and they are specifications specified by the user. For example, there are options relating to binding such as selection of monochromatic printing and color printing (selection of the number of colors in color printing), an option relating to the grade of printing such as selection of resolution, selection of double-sided printing and single-sided printing, selection of a cover and a back cover, presence of middle folding, presence of middle binding, page layout (arrangement of text data in printing of plural pages of text data on a single page of printed matter), pasting bookbinding, and selection of presence of stapling and punching, and options relating to printing range whether to output all pages of book data or to output specified pages.

Display section 44 is a display means that displays various information, and is composed of a liquid crystal panel, for example, and various information to be displayed include input results inputted by a user by the use of inputting section 43, selectable options and quotation data received from master server 30. These inputting section 43 and display section 44 may also be formed solidly by means of a touch panel, for example.

Communication section 45 executes communication between printer client 40 and data server 10 and communication between printer client 40 and master server 30, by the know protocol through internet INet.

Cryptograph processing section 46 executes encryption and decryption in public key system, as will be described later. The cryptograph processing section 46 adds digital signature encrypted by its own secret key to the data submitted by printer client 40, and submits them after encrypting with a public key of the transmitting destination. Further, the cryptograph processing section 46 decrypts the digital signature of the data which it has received to specify the transmitting source, and when it receives data encrypted by its own public key, it decrypts the data with its own secret key.

Printer section 47 executes printing on recording materials in succession based on text data decrypted by the cryptograph processing section 46. Any of an electrophotographic system, an ink jet system and a silver halide photographic system is acceptable, provided that an image is formed based on digital data.

For recording materials printed based on text data, finisher section 48 conducts well-known finishing processing such as sorting of recording materials, stapling, pasting bookbinding that sometimes includes a cover, middle folding and middle binding.

Faulty print detection section 49 detects faulty printing caused by abnormality such as a jam generated in the course of operations of printer section 47 and finisher section 48, running short of paste and stapling needles and others, and makes detection signals. For a jam detection technology employing various sensors such as an optical sensor and an actuator, a detection technology for running short of paste and stapling needles and for a detection technology for other abnormality, there are employed well-known technologies.

Printer client 40 notifies results of printing to data server 10 in accordance with the detection signals made by the faulty print detection section 49. Namely, when there is made any detection signal showing failure in printing, printer client 40 notifies the failure of printing to data server 10, while, when there is not made such detection signal, printer client 40 notifies a success of printing to data server 10.

Without being limited to the hardware structure, cryptograph processing section 46 may also be of the structure wherein there are conducted decryption of text data to be printed by printer section 47 as a software executed by main control section 301 and preparation of a digital signature to be added to data transmitted through communication section 45.

Incidentally, printer client 40 may also be equipped with a data conversion section (not shown) similar to data conversion section 13 equipped on data server 10. In this case, the data conversion processing stated above that is to be conducted on text data can be carried out on the printer side, and it is possible for data server 10 to encrypt for transmission without conducting conversion processing at all on text data stored in text data storage section 12, for example, and to encrypt for transmission after conducting only rearrangement in the order of pages as conversion processing, both in cryptograph processing section 15. With regard to processing which is not conducted in data conversion section 13 and is necessary, it is naturally subjected to conversion processing that is carried out by the data conversion section equipped on printer client 40.

Operations of a print system in the present embodiment will be explained next, by the use of flow charts shown in FIG. 7. Incidentally, decrypting and adding of a digital signature executed in each step will be described later.

A user who wishes printing of text data operates printer client 40, and gives log-in request to master server 30 constituting service side system 1 (S11). Due to the log-in, a logical communication channel between master server 30 and printer client 40 is secured.

Upon receipt of the log-in request, master server 30 checks correctness of the log-in request, and if it is correct, the master server 30 authenticates printer client 40 (S12), thus, the following procedures to be conducted by printer client 40 become feasible. The log-in request from a user registered in master server 30 as a utilizer of a print system or from the printer client is judged to be correct. Results of authentication are notified to printer client 40.

After the authentication, the printer client 40 specifies text data to be printed, and transmits the result of the specification to master server 30 (S13). Each of text data is given peculiar ID code (hereinafter referred to as book code) for each case, and when the text data are specified at the user side, this book code is used. With regard to the book code, it may either be maintained in printer client 40, or a user may refer to printed matters, or a book code equipped in master server 30 may be procured.

For example, when the book code is procured from master server 30, the master server 30 transmits a collation list between the requested text data and the book code to printer client 40. The collation list may be either a list with which all text data stored in plural data servers can be inspected, or the results of retrieval based on retrieval conditions specified on the printer client 40 side.

Since a name of a book, a name of a writer (a name of an author), a name of a publishing company, and Japanese Decimal Classification can be specified as retrieval conditions, and a name of concerning book, a name of a writer (a name of an author) and a name of a publishing company are listed in the collation list for each of text data, it is possible for printer client 40 to specify text data to be printed based on the list procured.

Based on the results of specification received, master server 30 specifies text data from data server 10 (S14), then, prepares quotation data presenting an expense which is charged to a user from service side system 1 for the printing (S15), and transmits to printer client 40. The master server 30 maintains the transmitted quotation data. The printer client 40 indicates on display section 44, based on the quotation data received (S16).

In the quotation data, there are included a book code relating to the specified text data, a book name, an estimated amount of money, a term of validity of quotation, a name of a user operating printer client 40 and a name (a full name or a corporation name) and where to make contact of a person who charges expenses. Each of quotation data includes peculiar quotation ID code, and each item can be displayed or printed by printer client 40.

When master server 30 maintains quotation data prepared for the same user in the past and is within the term of validity, they may be transmitted to printer client 40, or it is more preferable to transmit after collecting them into quotation data of a list type.

With regard to the quotation data which have been received and are within a term of validity, printer client 40 can request master server 30 to eliminate or modify them. Upon receiving the request to eliminate quotation data, the master server 30 eliminates the specified quotation data even when it is within a term of validity, and notifies the result of elimination to printer client 40, while, when there is a request to modify quotation data, the master server 30 prepares quotation data conforming to the contents of modification, and transmits to printer client 40. Incidentally, contents of modification for the quotation include a change of text data, a change of the number of sets and a change of printing specifications, and further, an occasion to obtain again a quotation having the same contents and having the date of log-in is included.

A user operating printer client 40 confirms contents displayed based on quotation data on display section 44, and places an order if the contents are acknowledged (S17).

After the order is placed, order data are transmitted from printer client 40 to master server 30. The order data include quotation ID code and a code showing the request of the order.

After receiving the order data, the master server 30 collates a quotation ID code included in the order data with a quotation ID code of the quotation data kept therein, and further confirms whether the order is based on quotation data within a term of validity. Then, when the order is confirmed to be one placed by a correct user based on quotation within a term of validity, data storage location information and job ID are transmitted to printer client 40 (S19).

Job ID is given as a peculiar value by master server 30 to print job whose quotation amount of money is approved by a user.

Data storage location information is a value with which the printer client 40 specifies text data stored in data server 10. For example, when data server 10 controls and employs individual text data as one file in a file system that supports directory structure, it is possible to specify text data by means of IP address specifying data server 10 and of a path to the file corresponding to the text data, from many nodes existing on an internet. In the present embodiment, in this case, a code based on IP address and path is generated to be data storage location information.

After receiving data storage location information and job ID, the printer client 40 accesses data server 10 based on the data storage location information (S20), and requests printing. Since the printer client 40 obtains IP address of data server 10 to access from data storage location information, it is possible for the printer client 40 to specify and access data server 10 that keeps desired text data in custody from plural data servers connected to internet INet (see FIG. 1)

After receiving the request for printing from printer client 40, the data server 10 requests master server 30 to collate job ID (S21), and master server 30 collates job ID relating to the request for collation (S22). Collation in step S22 is one to check whether job ID in (1) and that in (2) shown below agree with each other or not.

(1) Job ID issued by master server 30, transmitted to printer client 40 and kept in the master server 30 (see Step 19).

(2) Job ID received by data server 10 from printer client 40 together with the request for printing and transmitted to master server 30 in the case of request for collation (see Step 21).

Incidentally, job ID that is once issued is locked so that it may not be eliminated or changed accidentally before a termination, and the locking is released in Step 32 or Step 33 described later.

Data server 10 receives results of collation from master server 30 and confirms them (S23). Upon receiving the results of collation showing that (1) and (2) agree with each other, the data server 10 trusts that printer client 40 accessed in step 20 has passed through step 11–step 20, and an order in step 17 has been placed after agreement with quoted amount of money displayed in step 15. Therefore, if the results of collation for agreement are received in step 23, this is notified to printer client 40 so that the following procedures made by the printer client 40 may be made feasible.

The printer client 40 establishes printing specifications, and transmits printing specification information Inf1 to data server 10 (S24). The printing specifications may also be determined when specifying data to be printed for master server 30 in step 13, and in this case, printing specifications identical in terms of contents to those transmitted to master server 30 are transmitted.

After receiving printing specifications from printer client 40, the data server 10 specifies text data to be kept in text data storage section 12 (S25), and executes conversion of text data in accordance with printing specifications and printer capacity (S26) and encryption of text data (S27).

After conversion and encryption of text data have been completed (text data Inf2 in a communication type are obtained), the data server 10 transmits these to printer client 40 (S28), and printer client 40 receives them (S29).

The printer client 40 decrypts the encrypted text data, then, executes printing (S30), and after the printing is completed, the printer client 40 transmits the results of printing to data server 10 as printing result information Inf3 (S31). The printing result is notification of success or failure of printing from printer client 40 to service side system 1. In the course of printing, printing is executed in printer section 47 in conformity with printing specifications, and bookbinding is conducted in finisher section 48. In these execution, when faulty sheet feeding is caused, faulty print detection section 49 makes error signals and therefore, printer client 40 transmits results of printing showing the status of printing failure, while, when faulty sheet feeding is not caused, results of printing showing the status of printing success are transmitted.

After receiving the results of printing, data server 10 terminates the print job specified by the job ID stated above, and transmits the notification of job end showing successful printing to master server 30 (S33).

After receiving the notification of job end showing successful printing from data server 10, the master server 30 conducts the payment charging process (S33) based on the job ID mentioned above for printer client 40 that is an object of the accounting, and terminates the print job.

A user operates printer client 40 to transmit the request of log-out to master server 30 (S34), and the master server 30 conducts authentication (S35) after receiving the request of log-out, thus, results of the authentication are notified to the printer client 40 (S36). The communication channel secured between the master server 30 and the printer client 40 is disconnected by the log-out.

In the present embodiment, even when the request for printing is made again by job ID relating to the print job that is once terminated successfully, this request is ignored by data server 10 and master server 30.

Since the master server 30 can judge success or failure of printing from the results of printing in the course of executing the payment charging process in step 33, it is possible to establish the condition for the payment charging process for the print job wherein printing has been failed in a way that the amount of money presented by quotation data is reduced for accounting, or the failure is made to be free of charge independently of the presented amount of money. It is preferable to show clearly the condition of the payment charging process for the failed printing to a user by indicating the condition on display section 44 of printer client 40 together with the amount of money presented by quotation data. With regard to the successful print job, on the other hand, it is possible to establish the condition of the payment charging process in a way to impose an amount of money that is exactly the same as the amount of money presented by quotation data.

When printing plural text data, it is also possible to make processing steps from step 20 to step 29 to be a loop, and thereby to conduct a sequence of processing for text data for each loop. For example, when processing three text data (corresponding to three books), there is conducted processing wherein an order is placed concerning quotation data which have specified three text data in a period up to step 19, then, a loop to receive each text data is repeated three times in a period from step 20 to step 29, and printing operations for three text data are conducted in step 30 and thereafter.

In this case, the start of the loop is not restricted to step 20, and it may also be any of step 13–step 20, and an end of the loop may be any of step 29–step 31. By selecting the step to start the loop, it is possible to select the structure wherein printer client 40 receives quotation data for each text data, the structure to receive one quotation data presenting an estimated amount of money relating to three text data, and the structure to receive job ID for each text data.

By selecting the step where the loop is terminated, it is possible to select the structure wherein printer client 40 receives text data one by one, and transmission of printing and results of printing for three text data is conducted once, the structure wherein printer client 40 prints text data one by one and transmits printing results relating to three text data, and the structure wherein printer client 40 prints text data one by one and transmits printing result one by one.

When printing text data for each page, it is also possible to make processing steps from step 24 to step 29 to be a loop, and thereby to conduct processing for one page of text data for each loop. For example, when processing 3-page text data, there is conducted processing wherein a loop for processing establishment and transmission of printing specifications for each page up to receipt of text data for each page in a period from step 24 to step 29 is repeated three times, following the processing up to step 23, and then, printing for 3-page text data is conducted in step 30 and thereafter.

In this case, the start of the loop is not restricted to step 24, and it may also be any of step 24–step 28, and an end of the loop may be any of step 29–step 31. By selecting the step to start the loop, it is possible to select the structure wherein printer client 40 conducts establishment and transmission of printing specifications for each page and the structure wherein printer client 40 conducts establishment and transmission of printing specifications for all pages in common.

By selecting the step where the loop is terminated, it is possible to select the structure wherein printer client 40 receives text data one page by one page, and transmission of printing and results of printing for 3-page text data is conducted once, the structure wherein printer client 40 prints text data one page by one page and transmits printing results relating to 3-page text data once, and the structure wherein printer client 40 prints text data one page by one page and transmits printing result one page by one page.

If the results of printing are notified to service side system 1 as stated above, it is possible to take actions for changing conditions of the payment charging process based on the results of printing. Therefore, not only protection of the copyright is realized but also the service that satisfies a user can be provided.

If the conditions for the payment charging process are changed based on the results of printing, not only, protection of the copyright is realized but also the service with accounting conditions satisfying a user can be provided.

Next, encryption executed in each step will be explained as follows.

(Encryption 1)

For example, when printer client 40 transmits printing specifications to data server 10 in step 24, a public key encrypting system is used for transmitting printing specification information Inf1. Therefore, it is encrypted as follows to be transmitted after a digital signature is added.

To be concrete, information relating to the following printing specifications included in printing specification information Inf1 is encrypted by a public key of data server 10, and then, a characteristic value of information relating to the aforesaid printing specifications is encrypted (digital signature) by a secret key of printer client 40 to be transmitted.

Information relating to printing specifications includes random data, transmission date and/or time, types of request, a name of requesting source, quotation ID, a list of printers for source of printing, a book code (stated earlier), starting page, an ending page, printing conditions (number of colors, types of character font, sheet sizes, page layout, a bookbinding method), a list of those who put signatures, and digital signatures $1, \ldots, n$.

Characteristic values relating to these printing specifications are as follows.

Random data are data of about 8 byte to 64 byte which are random, and they are produced on the printer side. These are added for the purpose to make requests having similar contents to be codes which are quite different each other when they are encrypted. They are usually in the fixed length.

Transmission date and time mean the date and time on which printing specification information Inf1 is transmitted, and they are used to control the correctness of the payment charging process by clarifying the date and time for preparing the request and to control the progress of processing time. It is further object to make the decrypting difficult by changing code contents of cryptographs of request contents together with the aforesaid random data.

Types of request mean classification of request such as text data request, quotation request (explained later) and others.

A name of requesting source is used to specify the requesting source such as a peculiar name of printer client 40 and to retrieve a public key of a target for decrypting digital signature explained later. Further, the receiving source for text data from data server 10 is specified by the name of requesting source. The name of requesting source is also used to specify a target for the payment charging process by master server 30.

Generation request ID is the so-called quotation request NO which is generated in sequence on the printer side so that the data can be discriminated easily when text data are received.

A book code is an ID code of a book for specifying a book corresponding to the requested text data, and the start page is a necessary first page, and the termination page is a necessary last page. Further, plural start pages and plural termination pages can be provided, and thereby, plural locations included in text data in one case can be specified.

The number of colors included in printing conditions can be transmitted as monochromatic information even in the case of a color book, which makes it possible to reduce cost by reduction of communication capacity. Types of character font mean information to restrict fonts to be used. Sheet sizes are information to restrict the sheet sizes to be used. Page layout is information for putting plural pages in a single sheet. A bookbinding method is information to specify data location corresponding to the bookbinding method.

A list of those who put signatures is a list of those who put digital signatures which is used to retrieve a public key of a target.

Then, digital signatures mean a code obtained by encrypting characteristic values of the printing specification information Inf1 with a secret key of the transmitting source. A transmitting destination (data server 10) decrypts this portion with a public key of a target (printer client 40), and confirms whether that value agrees with a characteristic value of the request data stated above or not. Due to this, it is possible to confirm that the transmitting source is a correct target (no other person is pretending to be printer client 40) and that contents of the request are not altered. For calculation of the characteristic value, there is used a hash value by MD5 and other methods.

As concrete contents of a digital signature, for example, there may be used a structure wherein random data (random value of 8 byte or more), date and/or time, signer's name and characteristic value of printing specification information are encrypted with a secret key of a signer (usually, printer client 40).

In some cases, a signature may also be put by another signer that is different from the requesting source. For example, this is an occasion wherein a new printer client is registered by putting a signature of the specific signer who is already trusted by service side system 1, when requesting the system for the first time.

Further, it is possible to increase the probability of a proof for validity of the signature by confirming that the date and time are later than the time of generation of the text request data stated above and are within a prescribed period of time.

It is possible to calculate royalties and charges for data (expense for digitization and expense for management of servers) based on information of book code (described earlier), a starting page, a terminating page and printing conditions (number of colors, types of character font, sheet sizes, page layout and bookbinding methods) among the aforesaid printing specification information Inf1.

Further, in an example wherein printer client 40 is composed of a printer group equipped with plural printers, it is preferable that a list of printer names for printing is included in printing specification information Inf1.

The list of printer names for printing is one specified when printing work is divided among plural printers in a printer group to be conducted, and data server 10 can prepare and transmit data (key for encrypting and where to transmit to are specified) for each printer. Due to this, it is possible to conduct a large amount of printing at high speed, while protecting text data. In this case, it is possible to circulate the request in succession in a local printer group, and to conduct digital signature on the printer side. Further, it is also possible that a group master (one printer selected from plural printers in the printer group) conducts digital signatures collectively without circulating.

Further, when transmitting data by dividing them among plural printers as stated above, digital signature of each printer can be added. Random data and the date are used for preventing generation of specific cryptograph codes, in the same way as in the case of encrypting request data.

Data server 10 decrypts, with its own secret key, the printing specification information Inf1 which is encrypted as stated above and is provided with digital signature, and confirms a target (printer client 40) by decrypting digital signature (decrypting of a characteristic value).

(Encryption 2)

For example, when data server 10 transmits text data in step 28, communication type text data Inf2 are transmitted by the use of a public key cryptograph method. This is transmitted by adding digital signature after encrypting as follows.

To be concrete, the information included in communication type text data Inf2 is encrypted by a public key of printer client 40, and then, its characteristic value is encrypted (digital signature) by a secret key of data server 10 to be transmitted.

In this case, information included in communication type text data Inf2 can include random data, transmission date and/or time, types of data (types of text data and quotation data), data ID (book code, quotation ID), a name of requesting source, generation request ID, a list of printers for printing, a starting page, a termination page, charges, a list of signers, text data body, and digital signature names 1, . . . , n.

Data server 10 conducts digital signature with a characteristic value of information included in the communication type text data Inf2. This signature can also be a signature of master server 30 provided that it is a digital signature of service side system 1.

Printer client 40 decrypts, with its own secret key, the communication type text data Inf2 which have been received by the printer client 40 to confirm the digital signature and to confirm correctness of agreement time of request ID, for printing.

(Encryption 3)

For example, when data server 10 transmits the results of printing in step 31, printing result information Inf3 is transmitted by the use of a public key cryptograph method. This is encrypted as follows to be transmitted after a digital signature is added.

To be concrete, the following information included in the printing result information Inf3 is encrypted by a public key of data server 10, and its characteristic value is encrypted by a secret key of printer client 40 (digital signature) for transmitting.

In this case, information included in printing result information Inf3 can include random data, transmission date and/or time, text data ID, text data transmission ID, a name of requesting source, generation request ID, a list of printers for printing, the number of prints to be printed in each printer, the number of normal prints in each printer, a list of signers and digital signature 1, . . . , n.

Printer client 40 can conduct digital signature with a characteristic value of information included in the printing result information Inf3 stated above.

When printing with plural printers, each printer conducts digital signature, or printing results are managed collectively by a group master and signatures can be conducted collectively.

Data server 10 decrypts, with its own secret key, the printing result information Inf3 which has been received by the data server 10, and confirms, in the same way, the time, request ID and text ID, and then, master server 30 conducts the payment charging process based on the results of printing.

Though there have been explained access and communication between printer client 40 and data server 10 constituting service side system 1 above, it is further possible, in addition to the foregoing, to give encryption and signature to communication between nodes of data server 10 and master server 30 and between nodes of master server 30 and printer client 40, in all steps.

Next, other operations of the print system in the present embodiment will be explained as follows, referring to the flow chart shown in FIG. 8. Operations explained in FIG. 6 are mostly the same as those in FIG. 7, and only difference between them includes a point that collation of job ID is conducted by the data server and a point that the result of printing are notified to master server 30 by printer client 40. Therefore, explanation of operations duplicated with those in FIG. 7 will be omitted.

Figure 7:
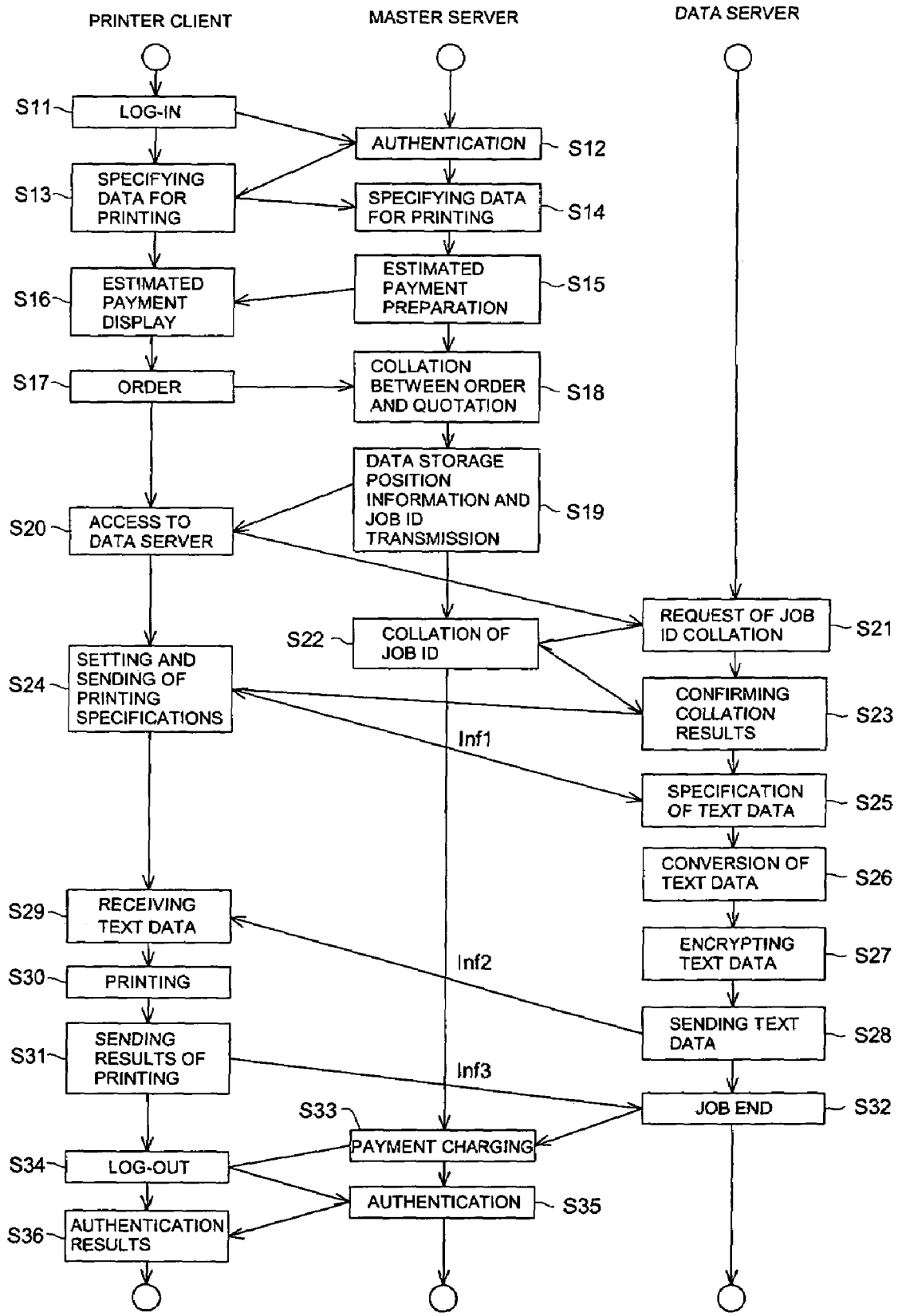
FIG. 7 is a flow chart explaining operations of a print system.

In the example shown in FIG. 8, operations in step 51–step 58 are the same as those in step 11–step 18 in FIG. 7.

Though master server 30 transmits data storage location information and job ID to printer client 40 in step 19 in FIG. 7, master server 30 transmits data storage location information and job ID to printer client 40 and transmits job ID to printer client 40 in step 59 in FIG. 8.

After receiving the data storage location information and job ID, the printer client 40 accesses data server 10 based on the data storage location information (S60), and requests printing.

After receiving the request for printing from the printer client 40, the data server 10 conducts collation of job ID (S61). The collation in step 61 is one to check whether job ID in (3) agrees with that in (4) or not.

(3) Job ID issued by master server 30 and transmitted to data server 10 (see step 59)

(4) Job ID received by data server 10 from printer client 40 together with request for printing When (1) and (2) agree with each other, data server 10 trusts that printer client 40 which accessed in step 20 has passed through steps 51–60, and an order in step 57 has been placed after agreement with quoted amount of money indicated in step 56. Therefore, when there is agreement in step 61, this is notified to printer client 40 so that the following procedures conducted by the printer client 40 can be executed.

Incidentally, job ID waits for synchronization between data server 10 and master server 30 until processing of step 70 or step 71 is terminated, so that job ID may not commit a fault before job termination.

Printer client 40 establishes printing specifications and transmits the establishment information to data server 10 (S62). Operations in steps 63–68 in FIG. 6 below are the same as those in steps 25–30 in FIG. 7.

When printing in step 68 is finished, printer client 40 transmits results of the printing to master server 30 (S69). The results of the printing are the same as operations in FIG. 7. After receiving the results of the printing, the master server 30 terminates print job specified by the job ID, and transmits to data server 10 the notification of job termination showing the success of printing (S70).

After receiving the notification of termination, the data server 10 terminates print job specified by the job ID stated above (S71).

After receiving the notification of termination showing the success of printing from data server 10, master server 30 executes the payment charging process (S72), based on the job ID stated above, to printer client 40 that is to receive the accounting, and terminates print job.

Then, log-out is conducted in the same way as in step 34 to step 36 in FIG. 7, and communication channel secured between master server 30 and printer client 40 is disconnected.

In the embodiment explained above, there has been illustrated a network structure wherein data servers 10 and 20, master server 30 and printer client 40 can distinguish and communicate each other through internet Inet, as shown in FIG. 3. However, the print system of the invention can employ any network structure without being limited to internet Inet, provided that data server 10, master server 30 and printer client 40 can communicate each other. For example, each node can be connected with a private line or with a public line. Further, the print system of the invention can employ another structure wherein data server 10 and master server 30 are on the same LAN and printer client 40 is connected to the LAN through a private line or a public line.

Further, data server 10 and master server 30 can be on the same LAN and printer client 40 can be connected to the LAN through internet Inet. In addition, it is possible to make data server 10 and master server 30 to operate on one server computer.

Though data server 10 in FIG. 4 has been explained by the example wherein main control section 11, data conversion section 13, compression section 14, cryptograph processing section 15, communication section 17, collation section 16 and text data storage section 12 are provided on one server, it is also possible to disperse these sections to plural servers so that processing of each section may be conducted by each server. For example, if there is employed the structure wherein each of plural servers is made to be provided with a hard disk representing text data storage section 12, and each hard disk is made to be mounted on a file system of one unit of server, these plural servers constitute data server 10. In addition to the server provided with text data storage section 12, if there is employed the structure wherein servers each being provided with one or plural items of data conversion section 13, compression section 14 and cryptograph processing section 15 are provided, these plural servers constitute data server 10.

Though master server 30 in FIG. 5 has been explained by the example wherein main control section 301, authentication section 302, printing specifying section 303, quotation preparing section 304, job ID issuing section 305, collating section 306, the payment charging process section 307, address storage section 308, quotation storage section 309, cryptograph processing section 310 and communication section 311 are provided on one server, it is also possible to disperse these sections to be processed by plural servers.

Further, there may also be present plural master servers 30 each being provided with main control section 301, authentication section 302, printing specifying section 303, quotation preparing section 304, job ID issuing section 305, collating section 306, the payment charging process section 307, address storage section 308, quotation storage section 309, cryptograph processing section 310 and communication section 311. When there are present plural master servers 30, it is also possible to operate printer client 40 so that arbitrary master server 30 may be selected freely.

Though printer client 40 in FIG. 6 has been explained by the example wherein main control section 41, inputting section 43, display section 44, communication section 45, printer information storage section 42, cryptograph processing section 46, faulty printing detection section 49, printer section 47 and finisher section 48 are provided, it is also possible to constitute the aforesaid various sections with a personal computer representing an example of an information processing apparatus of the invention and with a printer connected to the personal computer, and in this structure, printer client 40 is composed of a personal computer and a printer. Connection between the personal computer and the printer may be either local connection or network connection, and plural personal computers may be connected with plural printers on a network connection basis through LAN. In this structure, printer client 40 is composed of plural personal computers and plural printers.

When printer client 40 is composed of personal computers and printers, it is preferable that cryptograph processing section 46 is provided on a printer. If the hardware-like or software-like module that executes decryption is provided on the printer side, it is not necessary that the total cryptograph processing sections 64 are provided on the printer side. If aforesaid module that executes decryption is provided on the personal computer side, there is possibility that copying of text data received is made possible, but if the module is provided on the printer side, there hardly is possibility that the received text data are copied.

Though there has been explained that even text data are encrypted by a public key to be transmitted, in the example stated above, it is also possible to transmit a common secret key for a common key encrypting system from data base prior to transmission of text and thereby to encrypt with common key cryptographs.

In this case, it is preferable that a different secret key is generated for each transmission of text information from data base. When an amount of text data is large, processing speed is higher for the common key encryption system because an amount of processing caused by encryption is reduced.

Though a public key encrypting system is an assumption in the example stated above, it is possible to execute between each printer client 40 and service side system 1 (data servers 10 and 20 and master server 30) even in the case of different common secret key encryption system. As a concrete encryption system, it is possible to use DES, AES, triple DES and RSA as is well known. In this case, it is also possible to use ANSIX9.30 for signatures.

In the case of signature, SHA-1 and MD5 can be used for obtaining the characteristic value stated earlier.

For encryption and signature, ECDSA can also be used.

With regard to the encryption technology, there are available the following documents which can be used for the encryption technology in the invention.

Reference Documents (1)

Digital signature and encryption technology Dec. 24, 1997 First Edition

Authors: Woick Ford Michael Baum
Translator: Shin-ichiro Yamada
Supervision: Japan Verisign
Publisher: Yukio Miwa
Editor: Koji Suzuki
Publishing Office: Pierson Education Co. Ltd.

Reference Documents (2)

PGP cryptograph mail and electronic signature Apr. 15, 1996 First Edition

Author: Simson Garfinkel
Supervising translator: Kazuhiko Yamamoto
Translator: Unitech Co. Ltd.
Publication-compilation: Yumiko Kawamura
Compilation-Production: Spec Co. Ltd.
Publishing Office: Olyly Japan Co. Ltd.
Sales Agent: Ohm Co. Ltd.

Furthermore, another embodiment will be explained.

The print system explained with reference to FIG. 3 is applied to this embodiment. The print system is provided with storage units (data servers 10 and 20 in the embodiment) which store image data of a book, and has therein service system 1 offering image data, printer client 40 that obtains image data stored in a storage unit and forms an image on a recording material based on the obtained image data to conduct reprinting of a book, and a communication network (internet INet in the embodiment) that conducts delivery and receipt of information between service system 1 and printer client 40.

The communication network in this case is a network such as LAN, WAN and an internet, all employing a public analog line, a digital line, a private line, infrared rays and satellite communication, and what is essential is that it is a network which can deliver and receive data. The internet is most preferable, and explanation of the following embodiment will be given by using internet INet.

The internet INet is an aggregation of networks wherein LAN (local area networks) installed in research institutions, public institutions and corporations are constantly connected mutually by technologies of WAN (wide area network), and it is a network developed almost spontaneously on a scale to cover the whole world. A node which can be communicated through protocol (TPC/IP) used in the internet is capable of being communicated through mutual discrimination. In the internet INet, an IP address is used as an identifier for discriminating each node, and it is further possible to specify directly a file stored in each node by means of URL (Uniform Resource Locator). Data server 10, master server 30 and printer client 40 which are provided in the print system are examples the node mentioned above.

Service system 1 is a system on the service side that offers image data of a book to a user, and it practically is a server that has image data in storage units (data servers 10 and 20 in the embodiment) and is structured so that the image data can be downloaded by access from the user side (printer client 40). This server is connected to a communication network, and the number of the server may either be single (data servers 10 and 20 and master server 30 which will be explained later are made to operate on a single server computer), or be plural. Further, when the service system is composed of plural servers, it may be a data server wherein each of all servers is equipped with a storage unit, or it may have master server (in this case, the number of master servers may be either single or plural) 30 which controls (or grasps the state of) plural data servers.

In the service system of the present embodiment, there will be explained an example wherein functions are specialized in data servers 10 and 20 which store image data and in master server 30 that controls all services (controls and grasps data servers 10 and 20). Incidentally, in the present embodiment, each of data servers 10 and 20 and master server 30 is connected to internet INet. However, it is also possible that data servers 10 and 20 and master server 30 are on the same LAN, and the LAN is connected to internet INet, provided that data servers 10 and 20, master server 30 and printer client 40 can communicate each other.

In this case, "a book" means those which express thought and feelings creatively and belong to a category of literature, science or art, and examples of them include a novel, a play, an essay, a book of a lecture and other language, pictures, a book of a print and other art, and a book of a photograph. Further, "image data" represent those wherein a book is scanned to be data, or data of a book prepared directly, and concrete examples thereof include data having therein at least one of gradation image information in a form of digital data, character image information and layout information, and HTML (Hyper Text Markup Language), PDF (Portable Document Format) and BMP (Bitmap) can used as a form of the image data.

Next, an outline of data severs 10, 20 will be explained. The data server 10 is controlled by and installed in a publishing firm, wherein digital image data concerning books and others are stored in a hard disk having a large capacity and image data are transmitted at request from printer client 40. Before the transmission, the image data are converted, compressed and encrypted to be transmitted (at this time, may be provided with a digital signature). Incidentally, the data server 20 is also equipped with the structure that is mostly the same as that for the data server 10, and image data differing from those for the data server 10 are stored in the data server 20. Further, the data server 10 is controlled by and installed in another publishing firm different from the publishing firm of the data server 10.

The master server 30 is controlled by and installed in a management dealer who controls delivery service of image data, for example, and it offers information of data storage location which makes it possible to access each of image data stored in data servers 10 and 20, at request from printer client 40.

Service system 1 is structured with these data servers 10 and 20 and master server 30, however, it is also possible to structure service system 1 by connecting more data servers and master servers.

The printer client 40 is one that obtains image data stored in a storage unit and conducts reprinting of a book by forming images on a recording material based on the obtained image data, and it is an apparatus equipped with an image forming function to form images on a recording material and a communicating function to download image data from service system 1 through a communication network. The printer client 40 may be either an image forming apparatus equipped with both of the functions stated above, or one composed of a printer representing an image forming apparatus and a terminal equipment such as a personal computer. In this case, a function of communication is owned by a terminal equipment, connection between the personal computer and printer may be either local connection or network connection, and plural personal computers and plural printers may be connected on a network connection basis through LAN (in this structure, the printer client 40 is composed of plural personal computers and plural printers).

Printer client 40 in the present embodiment downloads image data from data server 10 or 20 constituting service system 1 based on data storage position information which it obtained by requesting master server 30, and conducts image forming on a recording material based on the image data for reprinting of a book.

The recording material in this case is a material on which characters and graphics are reprinted substantially, and it is practically a sheet-shaped recording sheet cut to a prescribed size, and a roll-shaped recording sheet before being cut. The reprinting is to reproduce substantially based on image data through an image forming method of printing, photographing, copying and others, and an electrophotographic system is preferable in terms of reprinting speed, while, an ink jet system is preferable in terms of reprinting cost. Incidentally, an image reprinted by printer client 40 is allowed to be slightly different from the book because of image processing and marking conducted in the course of image forming. Further, wording of "download" is not one restricting specific procedures and mutual operations between data server 10 and printer client 40, but it is used in a sense that the printer client 40 obtains data stored in the data server 10.

The printer client 40 is one that is installed in and controlled by a convenience store and a library and is utilized freely by unspecified users, and it may further be one that is installed in a place of business and is used only by specified users such as employees of the place of business, or one owned by an individual user.

In the print system as that mentioned above, when a user accesses master server 30 of service system 1 from printer client 40, the user acquires, from the master server 30, data storage position information for image data of the specified book. Upon acquisition of the data storage position information, the printer client 40 accesses data servers 10 and 20 of service system 1 based on the data storage position information to download the image data. Then, the printer client 40 forms images on a recording material based on the downloaded image data to conduct reprinting of the book. Incidentally, these detailed operations will be described later.

When a user conducts reprinting of a book as stated above, the user is asked for reprinting charges relating to reprinting of the book, namely, the user pays the reprinting charges. The reprinting charges in this case are naturally calculated before the user is asked for them. Further, by calculating reprinting charges also before images are formed, the user can judge whether it is possible to conduct image forming even for the reprinting charges (representing an estimated amount or estimated charges, in this case), or not. An outline of the reprinting charges will be explained as follows, referring to FIG. 9. The reprinting charges are calculated based on the first charge information established on the service system 1 side and on the second charge information established on the printer client 40 side.

The first charge information is information relating to image data of a book. This first charge information is established to correspond to each image data and is stored in service system 1. Though these pieces of information may naturally be stored in the same storage unit for image data, they may also be stored separately in separate storage units. In this case, when ID code for each book is given to each of image data and the first charge information, correspondence relationship between the image data and the first charge information can be secured.

The first charge information includes royalties relating to a copyright holder of a book, a charge for converting a book into image data and a service charge to offer image data. In practical illustration, a royalty is one obtained by a copyright holder when a book is reprinted. When a book is one for language, for example, a charge for making data includes a charge for making digital data further from a plate of the book, and a charge for reading a book through scanning and for making data, and it is a charge which is obtained by a publishing company (or, a dealer who generated image data stored in data servers 10 and 20) when a book is reprinted. Service charge is a cost needed for offering book print service to a user such as, for example, expenses for various types of equipment in a service system and expenses for their maintenance, and it is a charge which is obtained, when books are reprinted, by a service company who offers book print service.

since the first charge information is divided into a royalty, a charge for making data and a charge for service as stated above, an amount of money to be obtained by each section can be cleared and each charge can be established freely by each person who obtains each charge. Therefore, a charge can be established appropriately in accordance with contents of a book, each person does not fail to collect money and acquisition of appropriate charge is possible. Further, with regard to the book from which a large number of copies have been made in the service to offer image data, a charge for making data has been amortized, and it is possible to change establishment of each charge freely by making an amount of the amortization to be reflected on the charge. Incidentally, with regard to establishment of these charges, a person who obtains each charge can establish directly, or the person may contact a service company so that the service company may establish.

Incidentally, though the first charge information is a charge relating to image data of a book, when the image data has plural pages (plural chapters), a discount may be made for pages (chapters) which have been subjected to image forming actually by printer client 40, or it is possible to establish the first charge information on each page (each chapter) and to add pages (chapters) which have actually been subjected to image forming to make the first charge information. When reprinting plural image data, or when reprinting plural sets for one image data, it is possible to make a discount in accordance with an amount of discount (discount rate) established as a part of the first charge information in advance.

Next, the second charge information is information relating to image forming on the printer client 40 side, and a convenience store and a library where printer client 40 is installed are established and are stored in the printer client 40. This second charge information includes a charge for materials used in image forming of downloaded image data on a recording material conducted by printer client 40 and a rental fee for the machine (image forming apparatus). In further detailed description, a charge of materials used is a charge of materials consumed by printer client 40 for reprinting, and a charge for recording materials and a charge of color materials such as toner and ink (charge for development such as a developing solution, in the case of a silver halide printer) are included in the charge of materials consumed. The rental fee for the machine is a charge for using printer client 40 which includes a charge for electricity, a charge required for binding conducted by a finishing unit (finisher) such as middle folding, stapling and pasting, and a charge concerning installation of an apparatus. With regard to these charges for materials used and for rental fee of the machine, the second charge information may be established by the actual usage which is detected by printer client 40, or the second charge information (only charges of materials used, in this case) may be established by those obtained by multiplying an established unit cost per recording sheet including a charge of types (thick paper, thin paper and color paper) and sizes (A3, A4, B4, and B5) of a recording sheet by the number of sheets used for image forming. Or, the second charge information (only the rental fee of the machine, in this case) may be established by establishing in a form wherein a charge of materials used is included in a rental fee per unit operating time for printer client 40, and by measuring the operation time of the printer client (or, the time required for image forming) to multiply that operation time by the rental fee per unit operation time to get the second charge information.

Therefore, when printer client 40 is provided to be able to select at least one function among functions of a recording sheet in a first size/a recording sheet in a second size that is different from the first size, enlargement/reduction. Single-sided image forming/two-sided image forming, color image forming/monochromatic image forming and image forming of one page of a book on one page of recording sheet/image forming of plural pages of a book on one page of recording sheet, the second charge information is changed in accordance with the function (image forming condition) selected for image forming based on image data. In other words, an image forming condition setting section (an operation panel) provided on printer client 40 is constituted so that it establishes image forming conditions, and the second charge information is changed based on the image forming conditions thus established.

Since the second charge information can be established (changed) freely by printer client 40 as stated above, it is possible for a person (a convenience store and a library) where the printer client 40 is installed to obtain an appropriate income depending on a purchasing cost of materials and on a serviceability ratio of the printer client 40. In other words, it is possible to establish a favorable charge (a charge obtained by a person where the printer client 40 is installed) that is in harmony with circumstances of the person. For an individual user (a user who owns itself), it is naturally possible to establish the second charge information to be zero so that it does not have to pay excessively for reprinting charges accordingly. Incidentally, with regard to establishment of these charges, a person who obtains the charges may either conduct it directly or to contact a service company so that the service company may conduct the establishment of the charges.

Incidentally, though the second charge information represents a charge relating to image forming, the charge may also be discounted in accordance with an amount of discount established as a part of the second charge information in advance, when a large number of books are reprinted.

When printer client 40 conducts image forming on a recording sheet and thereby conducts reprinting of a book, based on image data of the book downloaded from service system 1 as stated above, the first charge information and the second charge information are summed up so that a reprinting charge concerning reprinting of a book is calculated, and this reprinting charge thus calculated is charged to a user. Calculation of the reprinting charge (and further, display of printer client 40) are also conducted naturally before image forming, and a user observes a display section where the calculated reprinting charge (quoted charge, in this case) is displayed, and can judge whether or not image forming can be conducted under the condition of the reprinting charge stated above. In this case, the second charge information is a charge relating to image forming assumed when image forming is conducted, because actual image forming is not conducted. Namely, the second charge information is calculated based on a charge for usage of materials which will be used and on a rental fee of the machine, and this second charge information and the first charge information are summed up to calculate reprinting charges.

In other words, the second charge, in its turn, the reprinting charge, varies depending on the function (image forming conditions) selected by a user, even when reprinting a book based on the same image data. In the practical illustration, when color images are formed, its reprinting charge is higher than that in the monochromatic image forming by an amount equivalent to a difference between them (a charge of coloring materials used, to be frank), while, when forming images on an enlargement basis, its reprinting charge is higher than that in the image forming under the reduction basis by an amount equivalent to a difference between them (a charge of recording materials used, to be frank, because the number of sheets of recording materials used for image forming is increased).

Incidentally, for the calculation of the reprinting charge, the first charge information obtained from service system 1 through internet INet and the second charge information established by printer client 40 may be summed up by the printer client 40, or in contrast with the foregoing, the second charge information obtained from printer client 40 through internet INet and the first charge information established by service system 1 may be summed up by the service system 1. in either case, it is preferable that the calculated reprinting charge is transmitted to other party, namely, the calculated reprinting charge is owned jointly by printer client 40 and service system 1.

Since the copyright becomes invalid after the passage of 50 years from the death of an author, when reprinting a book whose copyright is invalid, if a royalty is also charged, this is very illogical for a user. To solve this problem, it is possible to make a period of life of the copyright (expiration date) to be stored on the service system 1 side as book information concerning a book and image data, for each image data, so that the royalty may not be included in the reprinting charge, if the expiration date is overdue when printer client 40 conducts image forming, or when image data are downloaded by the printer client 40. Namely, the second charge information is added as one wherein the royalty is eliminated from the reprinting charge to calculate the reprinting charge.

Though the first charge information and the second charge information are arranged to be established directly by service system 1 and printer client 40 respectively, it is also possible to arrange so that they are established from other information equipment (personal computer and others) connected to internet INet, through the internet INet. Further, in the present embodiment, the first charge information is stored in service system 1 and the second charge information is stored in printer client 40 so that the degree of freedom for each establishment may be enhanced. However, the invention is not limited to this, and both of the first charge information and the second charge information may also be stored in service system 1 or in printer client 40.

Incidentally, as a method of accounting, there are used various methods such as payment by a debit card or a credit card, payment by a coin vendor provided on printer client 40, and cash payment to a cash register in a convenience store installed on printer client 40 or to a reception desk of a library.

Next, there will be explained an embodiment of the structure and operations of each unit (data servers 10 and 20, master server 30 and printer client 40) in the print system shown in FIG. 3.

Incidentally, in the construction of the following explanation, printer client 40 obtains data storage position information that stores specified image data from master server 30, and accesses specified image data (data servers 10 and 20) based on the data storage position information to download the image data. However, it is also possible to make data storage position information of the specified image data to be stored in CD-ROM, for example, and to access the specified image data (data servers 10 and 20) based on the data storage position information obtained from CD-ROM, to download image data. Further, in the following explanation, service system 1 confirms the results of image forming conducted by printer client 40, prior to accounting, namely, the service system 1 conducts accounting in accordance with success/failure of reprinting (results of image forming), and thereby, appropriate accounting can be conducted, which is preferable, but, it is not always necessary to confirm the results of image forming.

The data servers 10 and 20, the master server 30 and the printer client 40 are capable of conducting mutually the communication encrypted through a public key system. Namely, each of them specifies the transmitting source by decrypting digital signature relating to the data received by each of them through a public key of the transmitting source, and prevents a pretender by another node, and it further encrypts the data to send through its own secret key to prevent wrong copies by another node.

Firstly, on the basis of FIG. 3 being a block diagram explaining the detailed structure of the data server, the structure of the data server will be explained (since the data server 20 has the similar structure, the explanation for it is omitted).

Figure 10:
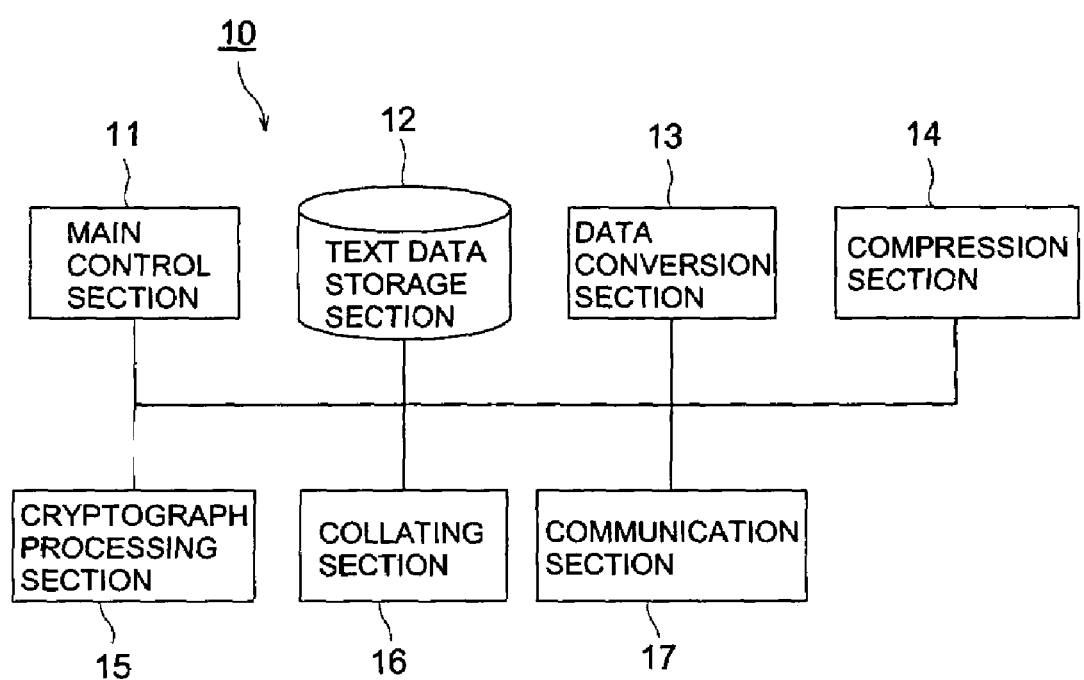
FIG. 10 is a block diagram explaining the detailed structure of data server.

In FIG. 10, the data server 10 has therein main control section 11, image data storage section 12, data conversion section 13, compression section 14, cryptograph processing section 15, collating section 16 and communication section 17, and each of them is connected to others in the internal bus.

The main control section 11 is composed of a central processing unit (CPU), a main storage unit and an auxiliary storage unit, and it controls each part and the whole of the data server 10.

The image data storage section 12 is equipped with a large capacity hard disk to store image data. The image data are compiled as a copy in a book style, and data capable of being outputted are made to be a file. The main control section 11 controls the large capacity disk stated above through an arbitrary file system, and it can read or write the aforesaid file relating to arbitrary image data by specifying, for example, names of a path and a file. Further, the main control section 11 can select each page from the image data composed of plural pages. AS a storage medium equipped in the image data storage section 12, arbitrary storage media such as optical disks and magnet-optic disks can be used, without being limited to the hard disks. Incidentally, the image data stored in the image data storage section 12 are stored together with the text data provided specifically to each image data.

The data conversion section 13 converts the stored image data into data for image formation capable of forming an image, in accordance with an image forming condition (image formation specification) requested by printer client 40 and with hardware-like power of the printer client 40. Data conversion processing includes, for example, rearrangement in the order of pages, or rearrangement in accordance with hardware-like power of printer client 40, rearrangement in accordance with the image forming condition. In particular, when image formation on a unit of a book, that is, on all pages of image data is requested, namely, when image formation for all pages of image data is requested, the rearrangement mentioned above needs to be conducted. In the case of the request in a unit of pages, the rearrangement sometimes does not need to be conducted, resulting in capability for complying with printers of various structures. With regard to the image forming condition and hardware-like power of printer client 40, they will be described later when the printer client 40 is explained.

The compression section 14 compresses data for image formation to the size that is suitable for communication through the compression processing method that can be extended in printer client 40. Any method can be used as a compression processing method. Data server 10 is capable of doing plural methods of compression processing, and it can communicate with various printer clients 40 for compressed data for image formation.

The cryptograph processing section 15 conducts encryption and decryption by means of a public key method, as will be described later. With regard to data to be sent by data server 10, the cryptograph processing section 15 adds digital signature which the cryptograph processing section 15 encrypted with its own secret key to the data and it sends them after encrypting them through the public key of a transmitting destination. Further, the cryptograph processing section 15 decrypts the digital signature of the data received by means of the public key of the transmitting source to specify the transmitting source, and when the cryptograph processing section 15 receives the data encrypted by its public key, the cryptograph processing section 15 decrypts the data with its own secret key. Encrypting of the image data is conducted after both conversion processing from the image data into data for image formation and compression processing to data for image formation are conducted.

The collating section 16 collates whether the request from printer client 40 is authenticated by master server 30 or not. In the case of the collation, job ID (described later) received from printer client 40 is transmitted to master server 30 to request the collation of whether the print job relating to the job ID is a print job granted by the master server 30 or not, and the results of the collation by the master server 30 are trusted.

The communication section 17 executes, by means of the known protocol, communication between data server 10 and master server 30 and communication between data server 10 and printer client 40, through internet INet.

Without limiting to the hardware structure, the data conversion section 13, compression section 14, cryptograph processing section 15 and collating section 16 can introduce the structure which processes image data stored in image data storage section 12 by the software executed in main control section 11, and executes collation of the job ID received by the communication section 17. Further, it is also possible to employ the structure wherein the data conversion section 13 is provided in printer client 40 as described later.

Next, on the basis of FIG. 11 being a block diagram to explain the detailed structure of master server 30, the structure of data server 10 will be explained (since data server 20 has the same structure, the explanation for it will be omitted).

Figure 11:
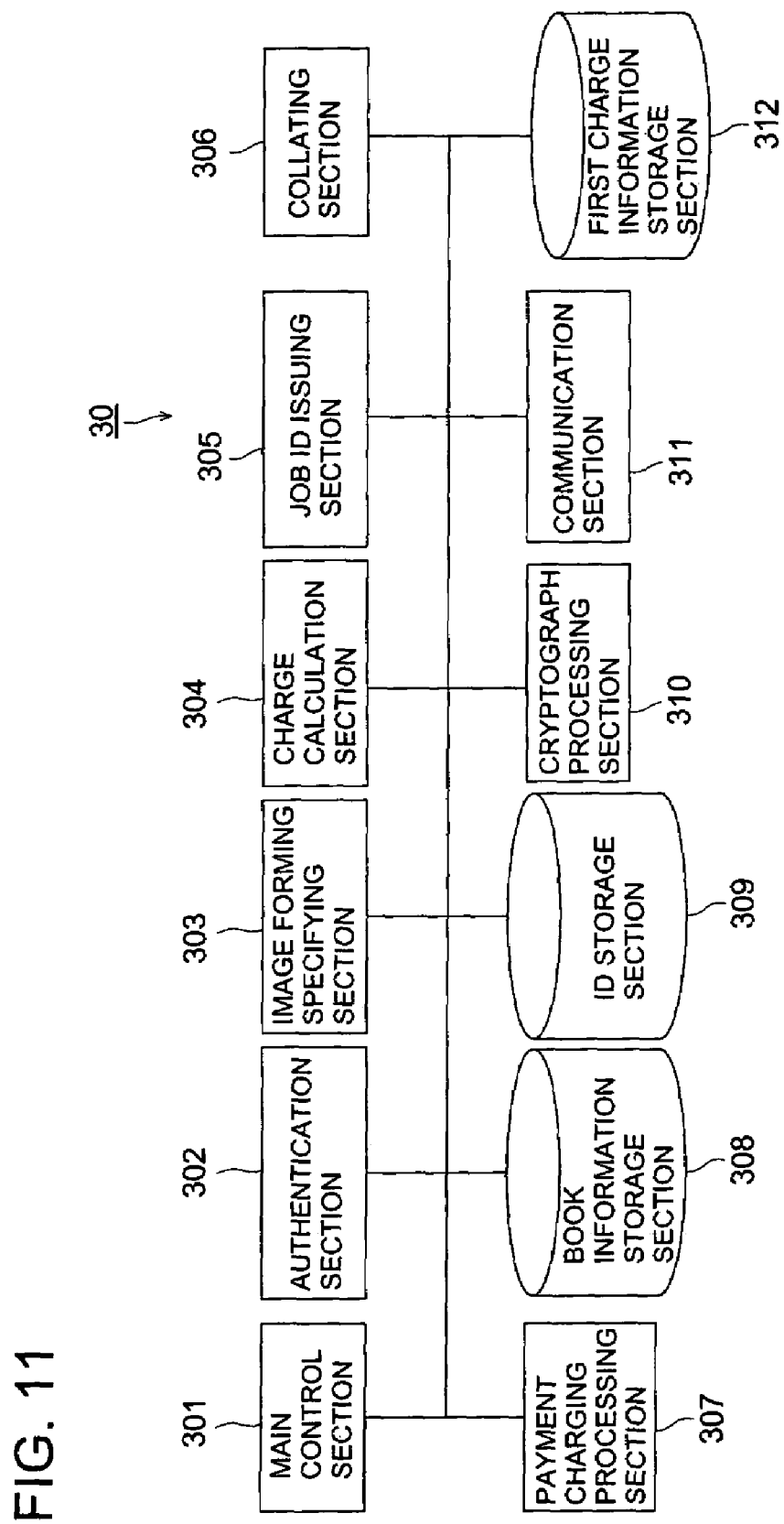
FIG. 11 is a block diagram explaining the detailed structure of master server.

In FIG. 11, the master server 30 has therein main control section 301, authentication section 302, image forming target specifying section 303, charge calculation section 304, job ID issuing section 305, collating section 306, the payment charging process section 307, book information storage section 308, ID storage section 309, cryptograph processing section 310, communication section 311 and first charge information storage section 312, and these sections are connected with each other by the internal bus.

The main control section 301 is composed of a central processing unit (CPU), a main storage unit and an auxiliary storage unit, and each part and the whole of the master server 30 are controlled based on a program recorded on the auxiliary storage unit.

When there is a request for log-in from printer client 40, the authentication section 302 judges correctness of either one or both of the printer client 40 and a user who operates the printer client 40. When they are correct, the printer client 40 is allowed to continue the procedures described later, but when they are not correct, the printer client 40 is prohibited to continue the procedures described later. When there is a request for log-in again from the printer client 40, judgment of correctness is formed newly, and the printer client 40 is allowed to execute procedures explained later, when they are correct.

Book information storage section 308 is provided with a large capacity hard disk, and stores book information concerning books (image data) handled by a book print system. This book information is stored together with a book code so that each of them may be specified for each book (image data). The stored book information includes a book name, a name of a copyright holder, information accompanying the book itself such as an expiration date of copyright, a name of a publishing company (a name of a company converted into data), a form of image data, volume of image data, the number of colors, the number of pages (which sometimes represents information accompanying a book itself), information concerning image data such as a date to start offering service, and further data storage information showing the position where image data are stored. Due to this, it is possible to specify requested book code transmitted by printer client 40 and data storage position information of image data specified by the requested book code, and data storage position information in the present embodiment represents data wherein IP address of data server 10 storing each image data and names of a path and a file of image data stored in data server 10 are combined, and when image data are composed of plural pages, a page number specifying a given page is included therein. As a storage medium equipped on the book information storage section 308, arbitrary storage media such as an optical disk and A magnet-optic disk can be used, without being limited to the hard disk.

The first charge information storage section 312 is provided with a large capacity hard disk in which the first charge information is stored. Namely, together with each image data (together with a book code), there are stored a royalty relating to a copyright holder of a book, a charge for converting a book into image data and a service charge for offering image data, as information relating to image data of the book. Incidentally, image data stored in the first charge information storage section 312 are stored together with a book code given intrinsically to each image data. As a storage medium provided on the first charge information storage section 312, arbitrary storage media such as an optical disk and a magnet-optic disk can be used, without being limited to the hard disk. Further, this first charge information storage section 312 can be made to be the storage medium that is the same as the book information storage section 308 stated above, and in this case, a storage area may be divided for storing, and further, the first charge information may be stored to accompany the book information.

The image formation target specifying section 303 specifies image data stored in image data storage section 12 of data server 10 based on a request of printer client 40, and determines the data storage location corresponding to the image data. Since the printer client 40 specifies image data with requested book code in the present embodiment, the relevant data storage location information is determined based on the corresponding table stored in address storage section 308.

The charge calculating section 304 calculates the copy charge to be charge for accounting for a user operating the print client 40 on the basis of the second charge information transmitted from the print client 40 and the first charge information of the image data stored in and specified by the first charge information storage section 312.

When order information is transmitted from the print client 40, the job ID issuing section 305 issues specific job ID for each print job relating to the order request from the printer client 40 which has granted the estimated amount. The print job means a series of operations ranging from communication of image data relating to the specified one case of image data to the payment charging process, and communication, image formation, communication of image formation results and the payment charging process, all executed by each of data server 10, master server 30 and printer client 40 and between them are allocated to any of print jobs. Since the communication, image formation, communication of the image formation results and the payment charging process, all for the image data can be specified by the given job ID, data server 10 and master server 30 can specify the user or the printer client for various requests and processing by many printer clients and many users.

The ID storage section 309 stores the job ID issued from the job ID issuing section 305 for a predetermined effective period together with the name of the user transmitted at the time of requesting an order, the book code, the first charge information, an estimated amount of charge (or the second charge information, further, an image formation condition set when the estimation is conducted).

The collating section 306 collates job ID to comply with request for collation from data server 10, and returns the results of the collation to data server 10. Collation by the collating section 306 is one to check whether the job ID requested for collation and communicated from data server 10 agrees with one issued by job ID issuing section 35 or not (whether the job ID is a job ID stored in the ID storage section 309 or not). Since the request from printer client 40 to data server 10 to obtain image data is provided with job ID issued by job ID issuing section 35, if the results of the collation indicating the agreement are returned from master server 30, the data server 10 judges that the request of the printer client 40 is correct and complies with the request, while, if no agreement is shown in the collation, the data server 10 judges that the request of the printer client 40 is not correct, and does not comply with the request.

The payment charging process section 307 conducts the payment charging process for printer client 40 or for a user who operates the printer client 40, in accordance with image formation results returned from the printer client 40. Though accounting by means of a debit card or a credit card is conducted as processing in the present embodiment, it is also possible to employ accounting (a coin vendor or payment to a reception desk) by means of cash at the location where printer client 40 is installed. In this case, information showing that a reprinting charge has been paid by a user is transmitted together with job ID from the printer client 40 (or, other information equipment connected to internet Inet), and when this information is received and confirmed by master server 30, the payment charging process is terminated. Incidentally, when the image forming has been conducted normally in this case, an amount of money for accounting is a reprinting charge calculated by charge calculation section 304 from the second charge information transmitted from printer client 40 after the image forming and the first charge information. With regard to this charge, the second charge information is transmitted without considering the actual image forming conditions in the case of quotation in the present embodiment. However, if this amount becomes accurate (if it is possible to confirm that the image forming conditions in the case of quotation are the same as those in the case of the image forming), an estimated amount stored in ID storage section 309 can be charged for accounting.

The cryptograph processing section 310 executes encryption and decryption through a public key system, as described later. The cryptograph processing section 310 adds digital signature encrypted by its own secret key to the data for submission by master server 30 to send them after encrypting them by a public key of the transmitting destination. Further, the cryptograph processing section 310 decrypts the digital signature of the data received by the use of a public key of the transmitting source to specify the transmitting source, and when it receives the data encrypted by its own public key, it decrypts them by its own secret key.

The communication section 311 executes, by means of the known protocol, communication between data server 10 and master server 30 and communication between the master server 30 and printer client 40, through internet INet.

It is also possible to employ the structure wherein authentication section 302, image formation target specifying section 303, charge calculating section 304, job ID issuing section 305, collating section 306, the payment charging process section 307, and cryptograph processing section 310 execute processing by utilizing data of book information storage section 308, ID storage section 309 and first charge storage section 312, as a software executed by the main control section 301, without limiting to the hardware structure, and the results of the processing are transmitted to data server 10 and printer client 40 through communication section 311.

Figure 12:
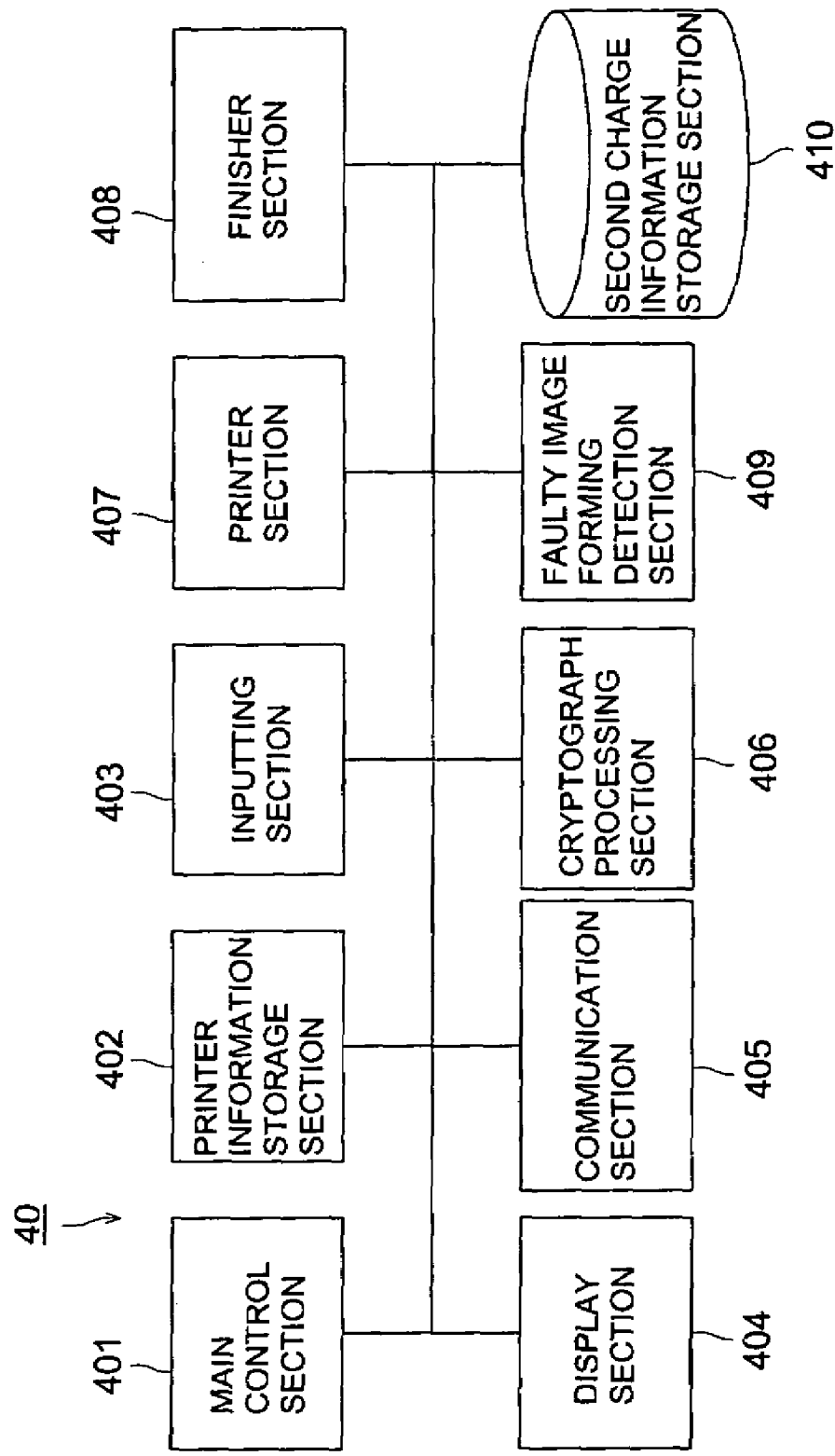
FIG. 12 is a block diagram explaining the detailed structure of printer client.

Next, structure of printer client 40 will be explained as follows, referring to FIG. 12 showing a block diagram illustrating the detailed construction of the printer client 40.

In FIG. 12, printer client 40 has therein main control section 401, printer information storage section 402, input section 403, display section 404, communication section 405, cryptograph processing section 406, printer section 407, finisher section 408 and faulty image forming detection section 409 which are mutually connected through an internal bus.

The main control section 401 is composed of a central processing unit (CPU), a main storage unit and an auxiliary storage unit, and controls each section and the whole of printer client 40 based on the program recorded on ROM. Incidentally, the main control section 401 is also provided with a calculation section which calculates a reprinting charge (an estimated amount before image forming in the example which will be described later) by summing up the first charge information transmitted from master server 30 and the second charge information based on them as will be described later.

The second charge information storage section 410 is provided with a large capacity hard disk in which the second charge information stated above is stored. Namely, as information relating to image forming, there are stored a charge of materials used and a rental fee of the machine (image forming apparatus) which are used when printer client 40 conducts image forming on a recording material from image data downloaded. As a storage medium provided on the second charge information storage section 410, arbitrary storage media such as an optical disk and a magnet-optic disk can be used, without being limited to the hard disk. Further, this second charge information storage section 410 can be made to be the storage medium that is the same as the printer information storage section 402 stated later, and in this case, a storage area may be divided for storing.

The printer information storage section 402 stores information relating to hardware-like power of the printer section 407 and the finisher section 408. The hardware-like power of the printer section 407 is a power peculiar to the printer section 407 such as the number of pages which the printer section 407 can receive at a time, paper handling on a recording sheet conveyance path, selectable sheet sizes, font types, data forms with which the printer can cope (bit-map, page description language), printable resolution and the number of colors. The hardware-like power of the finisher section 408 is a power peculiar to the finisher section 408 such as capability of binding with a cover and a back cover, capability of middle folding, capability of middle binding, capability of pasting bookbinding, capability of stapling and capability of punching. The data conversion section 13 provided on the data server 10 executes conversion based on the information stated above. Further, the printer information-storage section 402 is structured such that the image forming condition (mentioned later) set by the input section 403 is stored (at this time, stored together with the book code).

The hardware-like power will be explained as follows.

With regard to the number of pages, for example, when a storage capacity necessary for storage of all pages of image data exceeds a storage capacity of an image memory provided on printer section 407 (described later), it is an item that needs adjustment with data server 10 because there is a possibility of occurrence of memory overflow, when trying to receive the whole image data. The data server 10 divides image data into plural parts in accordance with image memory sizes, wherein, memory overflow can be prevented by transmitting the succeeding part when image formation for one preceding part is completed, or when it is confirmed, even in the course of image formation, that sufficient unoccupied capacity is secured for image memory, which is preferable. The data conversion section 13 in the present embodiment is arranged to have the structure wherein division is made in accordance with the number of pages which can be stored in printer client 40 at a time.

Further, it is also a preferable procedure wherein, when an image memory overflows, printer client 40 notifies this so that data server 10 suspends transmission of image data momentarily, and it resumes the transmission of image data when unoccupied capacity for image memory in printer client 40 is secured.

For example, with regard to paper handling in a laser printer of an electrophotographic system, there is known a technology wherein when conducting double-sided copying, plural recording sheets are fed in a circulating path including a reversing section, within a period of time in which the first recording sheet is reversed and image formation is conducted on the reverse side of the first recording sheet. In the case of a laser printer having the structure to feed five recording sheets in a circulating path, as an example, when conducting double-sided image formation for the image data composed of 10 pages, image formation is conducted in the order of the first page (the face of the first sheet), the third page (the face of the second sheet), the fifth page (the face of the third sheet), the seventh page (the face of the fourth sheet), the ninth page (the face of the fifth sheet), the second page (the back of the first sheet), the fourth page (the back of the second sheet), the sixth page (the back of the third sheet), the eighth page (the back of the fourth sheet) and the tenth page (the back of the fifth sheet). Therefore, if the image data are transmitted in the order of pages, there is a possibility of occurrence of overhead for rearranging the order of pages in printer client 40. Accordingly, paper handling in the printer client 40 is an item which needs adjustment of transmission procedures with data server 10. Before transmitting, the data server 10 rearranges the order of pages of image data with data conversion section 13 in accordance with the paper handling.

With regard to the selectable sheet size, for example, when the sheet size necessary for image formation of image data can not be selected in printer section 407, there is a possibility that image formation is totally impossible, or there is a possibility that format of image formation is extremely worsened. Therefore, this is an item that needs adjustment of transmission procedures with data server 10. The data server 10 can conduct processing of reduction or enlargement on image data for transmission with data conversion section 13, in accordance with the selectable sheet size.

With regard to font types, for example, when font types necessary for image formation of image data can not be selected in printer section 407, there is a possibility that image formation is totally impossible, or there is a possibility that format of image formation is extremely worsened, or there is a possibility that printing of letters whose font is not kept in stock is impossible. Therefore, this is an item that needs adjustment of transmission procedures with data server 10. The data server 10 can change a font of image data for transmission, with data conversion section 13, in accordance with the font which can be selected or is specified in printer client 40. Font types to be used for image formation of image data can be specified by printer client 40, and it is further possible to specify a bit-map and to specify whether or not to add font data to image data, in addition to specifying of any font.

With regard to a data format with which the printer can cope, for example, even when image data are received in the data format with which printer section 407 (described later) can not cope, there is a possibility that image formation is totally impossible on printer client 40, and when data of a bit-map type are transmitted to a printer client that can cope with printer description language capable of reducing a data size, communication capacity is increased. Therefore, this is an item that needs adjustment of transmission procedures with data server 10. It is possible for the data server 10 to change the data format of image data with data conversion section 13 in accordance with a data format with which the printer client 40 can cope, and thereby to transmit.

With regard to printable resolution, for example, when printer client 40 can cope with nothing but fixed resolution, if image data with resolution other than the fixed resolution are received, there is a possibility that image formation is conducted under the condition of enlargement or reduction, and when it is possible to print by interpreting resolution of data received by printer client 40, there is a possibility that a user operating printer client 40 wishes to select high resolution (which makes it possible to obtain high image quality) and low resolution (which makes it possible to reduce communication capacity). Therefore, this is an item that needs adjustment of transmission procedures with data server 10. It is possible for the data server 10 to change resolution of image data with data conversion section 13 in accordance with resolution with which the printer client 40 can cope, and thereby to transmit.

For example, in the case wherein middle folding and middle binding are possible in finisher section 408, printer section 407 records 4 pages on a single sheet of recording material, then superposes it in finisher section 408 to fold it on a boundary of a page, or to bind it. When forming an image for N-page image data, the printer section 407 prints a first page and N-th page on the surface of the first sheet, then, prints a second page and (N−1)-th page on the back of the first sheet, then, prints a third page and (N−2)-th page on the surface of the second sheet of recording material, then, prints a fourth page and (N−3)-th page on the back of the second sheet of recording material, and if the image data are transmitted in the order of pages, there is a possibility of occurrence of overhead for rearranging the page order in printer client 40. Therefore, when middle folding and middle binding are possible in the printer client 40, the foregoing is an item that needs adjustment of transmission procedures with data server 10. It is possible for the data server 10 to rearrange the page order of image data with data conversion section 13 in accordance with an order of recording of each page, and thereby to transmit.

Incidentally, the aforesaid sheet size, font types, data format, printable resolution and presence of middle binding and middle folding can be specified by printer client 40. When they are specified by the printer client 40, communication capacity necessary for adjustment can be reduced.

Inputting section 403 is equipped with operation keys for conducting various operations, and setting an image formation condition by a user, inputting information for conducting authentication for an estimated amount, and operating, setting and inputting by a user are conducted.

The image formation conditions represent an option that can be selected by a user who operates printer client 40, and they are specifications specified by the user. For example, there are options relating to such as, a recording sheet size selection (a first size recording sheet/a second size recording sheet different from the first size), and a selection of monochromatic image formation and color image formation (selection of the number of colors in the color image formation), options relating to the grade of image, formation such as selection of resolution, options relating to binding such as selection of magnification (enlargement/reduction), selection of double-sided image formation and single-sided image formation, selection of a cover and a back cover, presence of middle folding, presence of middle binding, pasting bookbinding, and selection of presence of stapling and punching, and options relating to image formation range whether to output all pages of book data or to output specified pages.

Display section 404 is a display means that displays various information, and is composed of a liquid crystal panel, for example, and various information to be displayed includes input results inputted by a user by the use of inputting section 403, selectable options and book information, a copy charge and a estimated charge for accounting received from master server 30. These inputting section 403 and display section 404 may also be formed solidly by means of a touch panel, for example.

Communication section 45 executes communication between printer client 40 and data server 10 and communication between printer client 40 and master server 30, by the know protocol through internet INet.

Cryptograph processing section 406 executes encryption and decryption in public key system, as will be described later. The cryptograph processing section 406 adds digital signature encrypted by its own secret key to the data submitted by printer client 40, and submits them after encrypting with a public key of the transmitting destination. Further, the cryptograph processing section 406 decrypts the digital signature of the data which it has received to specify the transmitting source, and when it receives data encrypted by its own public key, it decrypts the data with its own secret key.

Printer section 407 executes image formation on recording materials in succession based on image data decrypted by the cryptograph processing section 406. Any of an electrophotographic system, an ink jet system and a silver halide photographic system is acceptable, provided that an image is formed based on digital data.

For recording materials printed based on image data, finisher section 408 conducts well-known finishing processing such as sorting of recording materials, stapling, pasting bookbinding that sometimes includes a cover, middle folding and middle binding.

Faulty image formation detection section 409 detects faulty image formation caused by abnormality such as a jam generated in the course of operations of printer section 407 and finisher section 408, running short of paste and stapling needles and others, and makes detection signals. For a jam detection technology employing various sensors such as an optical sensor and an actuator, a detection technology for running short of paste and stapling needles and for a detection technology for other abnormality, there are employed well-known technologies.

Printer client 40 notifies results of image formation to data server 10 in accordance with the detection signals made by the faulty image formation detection section 409. Namely, when there is made any detection signal showing failure in image formation, printer client 40 notifies the failure of image formation to data server 10, while, when there is not made such detection signal, printer client 40 notifies a success of image formation to data server 10.

Without being limited to the hardware structure, cryptograph processing section 406 may also be of the structure wherein there are conducted decryption of image data to be printed by printer section 407 as a software executed by main control section 301 and preparation of a digital signature to be added to data transmitted through communication section 45.

Incidentally, printer client 40 may also be equipped with a data conversion section (not shown) similar to data conversion section 13 equipped on data server 10. In this case, the data conversion processing stated above that is to be conducted on image data can be carried out on the printer side, and it is possible for data server 10 to encrypt for transmission without conducting conversion processing at all on image data stored in image data storage section 12, for example, and to encrypt for transmission after conducting only rearrangement in the order of pages as conversion processing, both in cryptograph processing section 15. With regard to processing which is not conducted in data conversion section 13 and is necessary, it is naturally subjected to conversion processing that is carried out by the data conversion section equipped on printer client 40.

Figure 13:
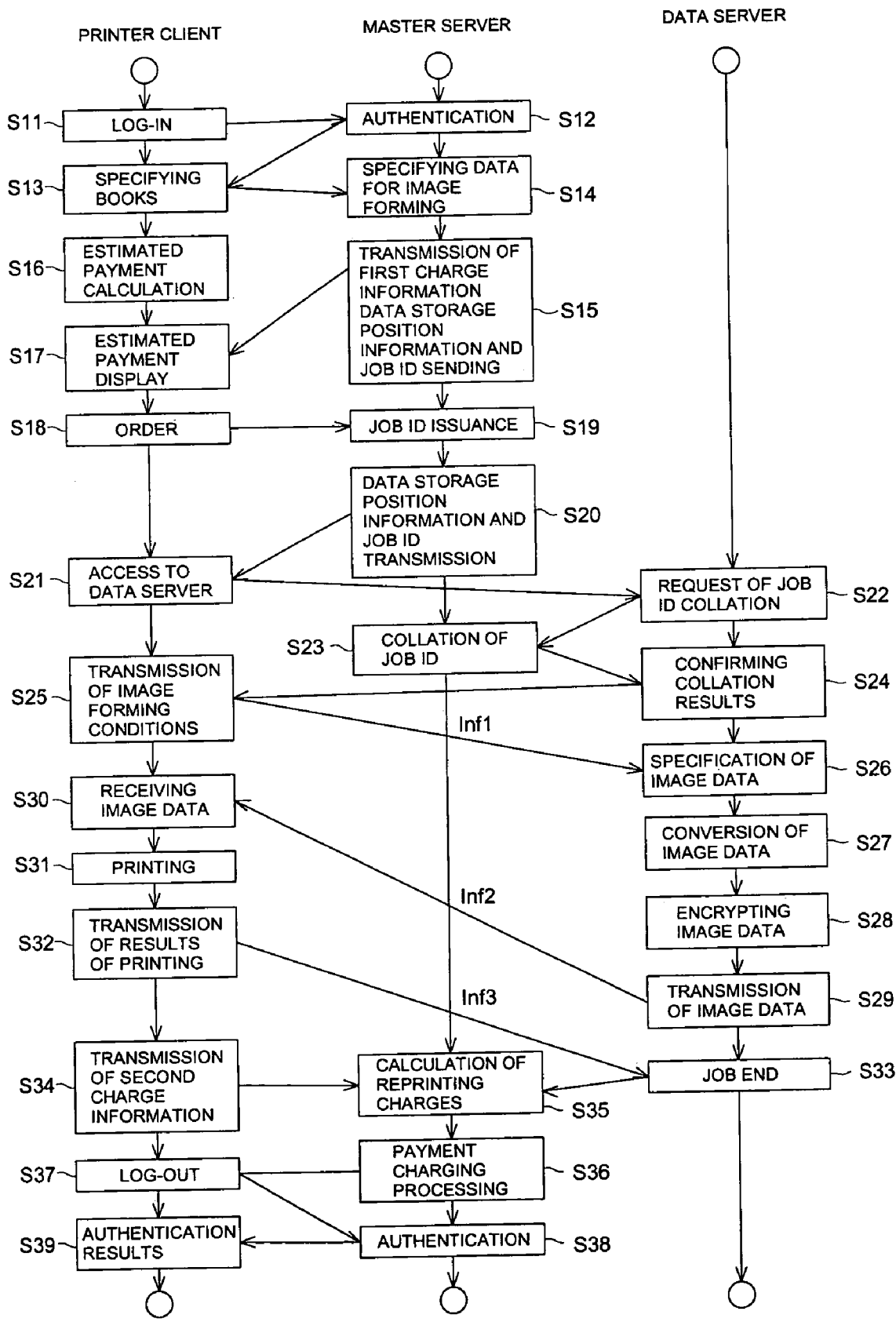
FIG. 13 is a flow chart explaining operations of the print system in the present embodiment.

On the basis of the flow chart shown in FIG. 13, operations of a print system in the present embodiment will be explained next, by the use of flow charts. Incidentally, decrypting and adding of a digital signature executed in each step will be described later.

A user who wishes image formation of image data operates printer client 40, and gives log-in request to master server 30 constituting service system 1 (S11). Due to the log-in, a logical communication channel between master server 30 and printer client 40 is secured.

Upon receipt of the log-in request, master server 30 checks correctness of the log-in request, and if it is correct, the master server 30 authenticates printer client 40 (S12), thus, the following procedures to be conducted by printer client 40 become feasible. The log-in request from a user registered in master server 30 as a utilizer of a print system or from the printer client is judged to be correct. Results of authentication are notified to printer client 40.

After the authentication, the printer client 40 specifies the book to be copied, and transmits the result of the specification (book code) to master server 30 (S13). Each of image data is given a peculiar book code for each case, and when the image data are specified at the user side, this book code is used. With regard to the book code, it may either be maintained in printer client 40 (for example, information to specify image data are inputted in a removable storage such as CD-ROM (a portable storage section) and the printer client searches the CD-ROM, thereby specifying the book code), or a user may refer to image-formed matters, or a book code equipped in master server 30 may be procured.

For example, when the book code is procured from master server 30, the master server 30 transmits a collation list between the requested book information (thumbnail or abstract) and the book code to printer client 40. The collation list may be either a list with which all image data stored in plural data servers can be inspected, or the results of retrieval based on retrieval conditions specified on the printer client 40 side. Since a name of a book, a name of a writer (a name of an author), a name of a publishing company, and Japanese Decimal Classification can be specified as retrieval conditions, and a name of concerning book, a name of a writer (a name of an author) and a name of a publishing company are listed in the collation list for each of text data, it is possible for printer client 40 to specify text data to be printed based on the list procured.

Master server 30 searches a book code stored in book information storage section 308 based on the received book code and confirms that the book code is present, to specify the target of image forming (S14). Then, the master server transmits the first charge information (information relating to image data stored in the first charge information storage section 312 and a charge relating to image data corresponding to the book code specified in S14, as stated above) stored together with the book code to printer client 40 (S15). At this time, pieces of book information (a book name, a name of a copyright holder, an expiration date of copyright, a name of a publishing company, a form of image data, volume of image data, the number of colors, the number of pages and a date to start offering service) stored in the book information storage section 308 are also transmitted. Main control section 401 of the printer client 40 sums up the first charge information transmitted from master server 30 and the second charge information stored in the second charge information storage section 410 to calculate an estimated charge (S16), and displays that amount of money on display section 404 (S17).

At the time, the second charge information is changed and the estimated charge is calculated each time to be displayed on display section 404 in accordance with the image forming conditions (such as, for example, first size recording sheet/second size recording sheet that is different from the first size (selection of recording sheet size), color image forming/monochromatic image forming (selection of color/monochrome and selection the number of colors in the case of color image forming), an option relating to the grade of image forming such as selection of resolution, an option relating to bookbinding such as enlargement/reduction (selection of magnification), single-sided image forming/two-sided image forming (selection of single-sided and two-sided), image forming of one page of a book on one page of a recording sheet/monochromatic image forming of plural pages of a book on one page of a recording sheet, selection of a cover and a back cover, presence of middle folding, presence of middle binding, pasting bookbinding and presence of selection of stapling and punching and an option relating to an image forming range whether to output all pages of book data or to output specified pages, as state above) established from input section 403 by a user. Incidentally, for example, when the second charge information stored in the second charge information storage section 410 is established as a unit cost per one recording sheet, the number of pages in book information transmitted from master server 30 is multiplied by the unit cost to calculate the second charge information.

On the display section 404, there are displayed information based on book information transmitted from master server 30, a book name, a name of a copyright holder, an expiration date of copyright, a name of a publishing company, a form of image data, volume of image data, the number of colors, the number of pages and a date to start offering service, in addition to an estimated charge, and there are further displayed a name of a user who operates printer client 40 and a name (a full name or a name of a corporation) and where to contact of a person who requests charges. These items can be printed by printer section 407 of printer client 40.

A user who operates printer client 40 confirms contents displayed on display section 404, and if the user can approve the contents, the user orders (S18) by pressing an order button provided on input section 403, for example. After the ordering, order data are transmitted from printer client 40 to master server 30. The order data include the calculated estimated charge, then established image forming conditions and the book code. On the other hand, also in the printer client 40 with which the order was placed, image forming conditions and estimated charges are stored together with the book code in printer information storage section 402.

After receiving the order data, the master server 30 issues specific job ID in job ID issuance section 305 for each print job relating to order request from printer client 40 that has approved the estimation (S19). Then, the job ID issued by the job ID issuance section 305 is stored in storage section 309 together with ID, the user's name sent in the case of the order request, the book code, the estimated amount of money and image forming conditions, for a period of the term of validity established in advance. Further, with regard to image data corresponding to the book code transmitted from printer client 40, the position information of the image data stored in image data storage section 12 of data server 10 is specified by image forming target specifying section 303 of the master server, and the data storage position information corresponding to the image data is determined. Then, the data storage position information and job ID are transmitted to printer client 40 (S20).

Data storage location information is a value with which the printer client 40 specifies image data stored in data server 10. For example, when data server 10 controls and employs individual image data as one file in a file system that supports directory structure, it is possible to specify image data by means of IP address specifying data server 10 and of a path to the file corresponding to the image data, from many nodes existing on an internet. In the present embodiment, in this case, a code based on IP address and path is generated to be data storage location information.

After receiving data storage location information and job ID, the printer client 40 accesses data server 10 based on the data storage location information (S21), and requests image formation. Since the printer client 40 obtains IP address of data server 10 to access from data storage location information, it is possible for the printer client 40 to specify and access data server 10 that keeps desired image data in custody from plural data servers 10, 20 connected to internet INet (see FIG. 1)

After receiving the request for image formation from printer client 40, the data server 10 requests master server 30 to collate job ID (S22), and master server 30 collates job ID relating to the request for collation (S23). Collation in step S23 is one to check whether job ID in (1) and that in (2) shown below agree with each other or not.

(1) Job ID issued by master server 30, transmitted to printer client 40 and kept in the master server 30 (see Step 19, Step 20).

(2) Job ID received by data server 10 from printer client 40 together with the request for image formation and transmitted to master server 30 in the case of request for collation (see Step 22).

Incidentally, job ID that is once issued is locked so that it may not be eliminated or changed accidentally before a termination, and the locking is released in Step 33 or Step 37 described later.

Data server 10 receives results of collation from master server 30 and confirms them (S24). Upon receiving the results of collation showing that (1) and (2) agree with each other, the data server 10 trusts that printer client 40 accessed in step 21 has passed through step 11–step 21, and an order in step 17 has been placed after agreement with quoted amount of money displayed in step 16. Therefore, if the results of collation for agreement are received in step 24, this is notified to printer client 40 so that the following procedures made by the printer client 40 may be made feasible.

Printer client 40 transmits to data server 10 image forming condition information Inf1 composed of image forming conditions established in the course of estimation (stored in printer information storage section 402) and of information relating to hardware-like capacity (S25). Incidentally, image forming conditions may be provided to be capable of being changed, in this step. Namely, prior to transmission of image forming condition information Inf1, image forming conditions established again and a name of a book including contents displayed in S17 are displayed on display section 404 in S25, so that a user is made to confirm whether the displayed contents are acceptable or not. If the contents are acceptable, the image forming condition information Inf1 can be transmitted, while when they are unacceptable, a change in image forming conditions is accepted, and image forming condition information Inf1 including the changed image forming information can be transmitted.

After receiving image forming condition information from printer client 40, data server 10 specifies image data kept in image data storage section 12 (S26) from a book code (the book code may either be sent in S21 or in S25, or be transmitted from master server 30 after collation of job ID conducted by master server 30 in S23), and conducts conversion of image data (S27) and encryption of image data (S28) in accordance with image forming conditions and hardware-like capacity (printer capacity).

After conversion and encryption of image data have been completed (image data Inf2 in a communication type are obtained), the data server 10 transmits these to printer client 40 (S29), and printer client 40 receives them (S30).

The printer client 40 decrypts the encrypted image data, then, executes image formation (S31), and after the image formation is completed, the printer client 40 transmits the results of image formation to data server 10 as image formation result information Inf3 (S32). The image formation result is notification of success or failure of image formation from printer client 40 to service system 1. In the course of image formation, image formation is executed in printer section 407 in conformity with image formation conditions, and bookbinding is conducted in finisher section 408. In these execution, when faulty sheet feeding is caused, faulty image formation detection section 409 makes error signals and therefore, printer client 40 transmits results of image formation showing the status of image formation failure, while, when faulty sheet feeding is not caused, results of image formation showing the status of image formation success are transmitted.

After receiving the results of image formation, data server 10 terminates the print job specified by the job ID stated above, and transmits the notification of job end showing successful image formation to master server 30 (S33).

On the other hand, in the course of image forming in S31, printer client 40 detects each usage concerning a charge of materials used and a rental fee of the machine by the use of an unillustrated detection means, thereby, obtains the second charge information considering those actually used (for example, the number of sheets of recording materials used is detected in advance, and a unit cost per one sheet of recording material established by including a charge for usage of one sheet is multiplied by the number of sheets of recording materials to obtain the second charge information, and it is a matter of course to add a charge of stapling, if any, to the second charge information) and transmits this second charge information relating to this actual image forming to master server 30 together with job ID (S34).

Master server 30 retrieves ID storage section 309 from job ID received from data server 10 together with a job termination notice showing the success of image forming, and obtains the first charge information stored together with the corresponding job ID (it is naturally possible to obtain even from the first charge information storage section 312). Then, charge calculation section 304 sums up the first charge information and the second charge information transmitted from printer client 40 to calculate a reprinting charge (S35). Then, the calculated reprinting charge is subjected to the payment charging process (S36) for printer client 40 that is a target for accounting, based on the job ID, and the print job is terminated.

A user operates printer client 40 to transmit the request of log-out to master server 30 (S37), and the master server 30 conducts authentication (S38) after receiving the request of log-out, thus, results of the authentication are notified to the printer client 40 (539). The communication channel secured between the master server 30 and the printer client 40 is disconnected by the log-out.

In the present embodiment, even when the request for image formation is made again by job ID relating to the print job that is once terminated successfully, this request is ignored by data server 10 and master server 30.

Since the master server 30 can judge success or failure of image formation from the results of image formation in the course of executing the payment charging process in step 36, it is possible to establish the condition for the payment charging process for the print job wherein image formation has been failed in a way that the amount of money presented by quotation data is reduced for accounting, or the failure is made to be free of charge independently of the presented amount of money. It is preferable to show clearly the condition of the payment charging process for the failed image formation to a user by indicating the condition on display section 404 of printer client 40 together with the amount of money presented by quotation data. In the above embodiment, the copy charge is calculated from the first charge information and the second charge information based on the rental fee used actually and charged for accounting. However, in the case that the image formation condition is not changed from that at the estimation is made, the estimated amount of charge may be charged without conducting the calculation after the image formation.

When forming images of plural image data, it is also possible to make processing steps from step 21 to step 30 to be a loop, and thereby to conduct a sequence of processing for image data for each loop. For example, when processing three image data (corresponding to three books), three image data are specified in a period up to step 20 (issuance of each job ID is received), then, a loop to receive each image data is repeated three times in a period from step 21 to step 30, and image formation operations for three image data are conducted in step 31 and thereafter.

In this case, the start of the loop is not restricted to step 21, and it may also be any of step 13–step 21, and an end of the loop may be any of step 30–step 32. By selecting the step to start the loop, it is possible to select the structure wherein printer client 40 receives quotation data for each image data, the structure to receive one quotation data presenting an estimated amount of money relating to three image data, and the structure to receive job ID for each image data.

By selecting the step where the loop is terminated, it is possible to select the structure wherein printer client 40 receives image data one by one, and transmission of image formation and results of image formation for three image data is conducted once, the structure wherein printer client 40 prints image data one by one and transmits image formation results relating to three image data, and the structure wherein printer client 40 prints image data one by one and transmits image formation result one by one.

When forming images of image data for each page, it is also possible to make processing steps from step 25 to step 30 to be a loop, and thereby to conduct processing for one page of image data for each loop. For example, when processing 3-page image data, there is conducted processing wherein a loop for processing establishment and transmission of image formation specifications for each page up to receipt of image data for each page in a period from step 25 to step 30 is repeated three times, following the processing up to step 24, and then, image formation for 3-page image data is conducted in step 31 and thereafter.

In this case, the start of the loop is not restricted to step 25, and it may also be any of step 25–step 28, and an end of the loop may be any of step 30–step 32. By selecting the step to start the loop, it is possible to select the structure wherein printer client 40 conducts establishment and transmission of image formation specifications for each page and the structure wherein printer client 40 conducts establishment and transmission of image formation specifications for all pages in common.

By selecting the step where the loop is terminated, it is possible to select the structure wherein printer client 40 receives image data one page by one page, and transmission of image formation and results of image formation for 3-page image data is conducted once, the structure wherein printer client 40 prints image data one page by one page and transmits image formation results relating to 3-page image data once, and the structure wherein printer client 40 prints image data one page by one page and transmits image formation result one page by one page.

If the results of image formation are notified to service system 1 as stated above, it is possible to take actions for changing conditions of the payment charging process based on the results of image formation. Therefore, not only protection of the copyright is realized but also the service that satisfies a user can be provided.

If the conditions for the payment charging process are changed based on the results of image formation, not only protection of the copyright is realized but also the service with accounting conditions satisfying a user can be provided.

Incidentally, the calculation of charge in Step 16 and Step 35 may be conducted by the master server 30 or the printer client 40.

Next, there will be explained encryption that is conducted when sending and receiving (communication) of information in the aforesaid flow are conducted mutually in data servers 10 and 20, master server 30 and printer client 40.

In the present embodiment, all data to be transmitted through internet Inet are encrypted, but it is enough that at least one of image data to be transmitted, the first charge information and the second charge information is encrypted (it is further preferable that encryption is conducted even when transmitting information relating to accounting). It is preferable that a digital signature encrypted by encryption key is added to information to be transmitted. Namely, the data servers 10 and 20, the master server 30 and the printer client 40 are arranged to be capable of conducting communication encrypted by the public key system, and each of them decrypts the digital signature relating to its received data by a public key of the transmitting source to specify the transmitting source, and Prevents illegal copying by other nodes by encrypting data to be delivered by its own secret key.

In the detailed explanation of encryption, data to be delivered by the transmitting source is provided with digital signature encrypted by the transmitting source with its own secret key, and then, is delivered after being given encryption by the public key of a target for transmission. The target for transmission decrypts the digital signature of the data received with a public key of the transmitting source to specify the transmitting source, and when it receives data encrypted by its own public key, it decrypts the data with its own secret key.

Here, digital signatures means a code obtained by encrypting characteristic values of the data to be transmitted with a secret key of the transmitting source. A transmitting destination (data server 10) decrypts this portion with a public key of the transmitting source, and confirms whether that value agrees with a characteristic value of the request data stated above or not. Due to this, it is possible to confirm that the transmitting source is a correct target (no other person is pretending to be printer client 40) and that contents of the request are not altered. For calculation of the characteristic value, there is used a hash value by MD5 and other methods.

As concrete contents of a digital signature, for example, there may be used a structure wherein random data (random value of 8 byte or more), date and/or time, signer's name and characteristic value of data to be transmitted are encrypted with a secret key of a signer (usually, the transmitting source).

In some cases, a signature may also be put by another signer that is different from the requesting source. For example, this is an occasion wherein a new printer client is registered by putting a signature of the specific signer who is already trusted by service system 1, when requesting the system for the first time.

Further, it is possible to increase the probability of a proof for validity of the signature by confirming that the date and time are later than the time of generation of the image request data stated above and are within a prescribed period of time.

The transmitting destination decrypts the thus encrypted data provided with the digital signature by own secret key and the confirmation of the transmitting destination is conducted by decrypting (decrypting the characteristic value) the digital signature.

In the embodiment explained above, there has been illustrated a network structure wherein data servers 10 and 20, master server 30 and printer client 40 can distinguish and communicate each other through internet Inet, as shown in FIG. 3. However, the print system of the invention can employ any network structure without being limited to internet Inet, provided that data server 10, master server 30 and printer client 40 can communicate each other. For example, each node can be connected with a private line or with a public line. Further, the print system of the invention can employ another structure wherein data server 10 and master server 30 are on the same LAN and printer client 40 is connected to the LAN through a private line or a public line.

Further, data server 10 and master server 30 can be on the same LAN and printer client 40 can be connected to the LAN through internet Inet. In addition, it is possible to make data server 10 and master server 30 to operate on one server computer.

Though data server 10 in FIG. 10 has been explained by the example wherein main control section 11, data conversion section 13, compression section 14, cryptograph processing section 15, communication section 17, collation section 16 and image data storage section 12 are provided on one server, it is also possible to disperse these sections to plural servers so that processing of each section may be conducted by each server. For example, if there is employed the structure wherein each of plural servers is made to be provided with a hard disk representing image data storage section 12, and each hard disk is made to be mounted on a file system of one unit of server, these plural servers constitute data server 10. In addition to the server provided with image data storage section 12, if there is employed the structure wherein servers each being provided with one or plural items of data conversion section 13, compression section 14 and cryptograph processing section 15 are provided, these plural servers constitute data server 10.

Though master server 30 in FIG. 11 has been explained by the example wherein main control section 301, authentication section 302, image formation target specifying section 303, charge calculating section 304, job ID issuing section 305, collating section 306, the payment charging process section 307, book information storage section 308, ID storage section 309, cryptograph processing section 310, communication section 311 and first charge storage section are provided on one server, it is also possible to disperse these sections to be processed by plural servers.

Further, there may also be present plural master servers 30 each being provided with main control section 301, authentication section 302, image formation target specifying section 303, charge calculating section 304, job ID issuing section 305, collating section 306, the payment charging process section 307, book information storage section 308, ID storage section 309, cryptograph processing section 310, communication section 311 and first charge storage section 312. When there are present plural master servers 30, it is also possible to operate printer client 40 so that arbitrary master server 30 may be selected freely.

Though printer client 40 in FIG. 12 has been explained by the example wherein main control section 41, inputting section 403, display section 404, communication section 45, printer information storage section 402, cryptograph processing section 406, faulty image formation detection section 409, printer section 407, finisher section 408 and the second charge information storage section 410 are provided, it is also possible to constitute the aforesaid various sections with a personal computer representing an example of an information processing apparatus of the invention and with a printer connected to the personal computer, and in this structure, printer client 40 is composed of a personal computer and a printer. Connection between the personal computer and the printer may be either local connection or network connection, and plural personal computers may be connected with plural printers on a network connection basis through LAN. In this structure, printer client 40 is composed of plural personal computers and plural printers.

When printer client 40 is composed of personal computers and printers, it is preferable that cryptograph processing section 406 is provided on a printer. If the hardware-like or software-like module that executes decryption is provided on the printer side, it is not necessary that the total cryptograph processing sections 64 are provided on the printer side. If aforesaid module that executes decryption is provided on the personal computer side, there is possibility that copying of image data received is made possible, but if the module is provided on the printer side, there hardly is possibility that the received image data are copied.

With regard to charge for accounting, the charge for accounting is conducted by confirming the result of image formation at the printer client 40, in other words, in accordance with success/failure of copy production (the result of image formation). It may be preferable that the charge for accounting can be conducted properly. However, it may be not always necessary to confirm the result of image formation. For example, after an order is received at Step 18, the charge for accounting is conducted. Then, after the completion in processing the charge for accounting is confirmed, it may be arranged that the printing can be conducted. Of course, in the course of the printing, the printing is suspended. After the processing in the charge for accounting is finished, the printing may be resumed.

Though there has been explained that even image data are encrypted by a public key to be transmitted, in the example stated above, it is also possible to transmit a common secret key for a common key encrypting system from data base prior to transmission of image and thereby to encrypt with common key cryptographs.

In this case, it is preferable that a different secret key is generated for each transmission of image information from data base. When an amount of image data is large, processing speed is higher for the common key encryption system because an amount of processing caused by encryption is reduced.

Though a public key encrypting system is an assumption in the example stated above, it is possible to execute between each printer client 40 and service system 1 (data servers 10 and 20 and master server 30) even in the case of different common secret key encryption system. As a concrete encryption system, it is possible to use DES, AES, triple DES and RSA as is well known. In this case, it is also possible to use ANSIX9.30 for signatures.

In the case of signature, SHA-1 and MD5 can be used for obtaining the characteristic value stated earlier.

Figure 14:
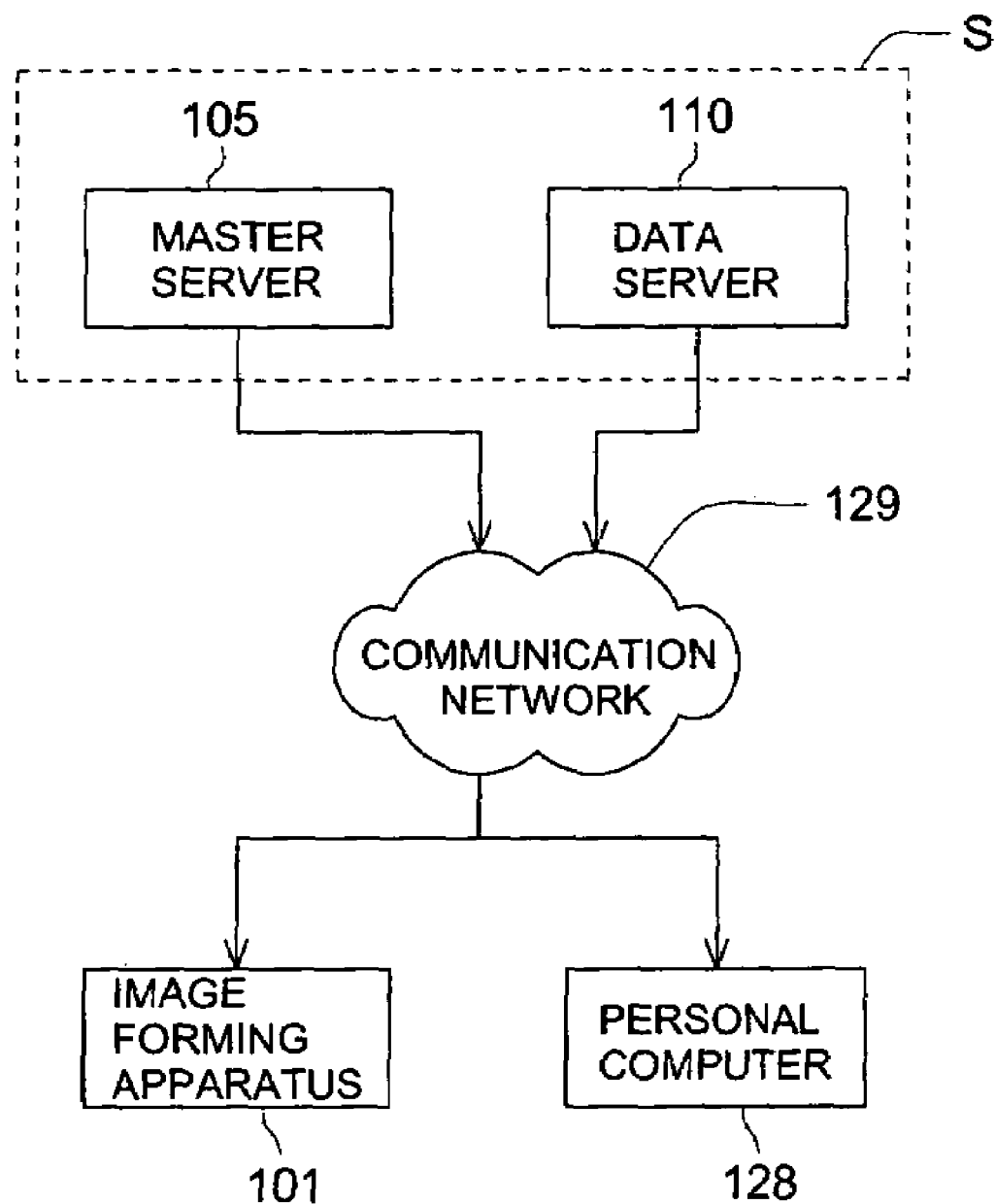
FIG. 14 is an outlined view of the image forming apparatus in the communication network.

Next, an image forming apparatus employed in the present system shown in FIG. 14 and a detailed control will be explained. Here, the image forming apparatus shown hereinafter has DOD mode in which printing is conducted by connecting the image forming apparatus with a service system to provide data of books and print mode in which printing is conducted based on image data received in accordance with the request from an external apparatus.

In a BOD mode, image forming apparatus 101 requests service system S that provides image data of a book to send image data, and prints based on image data received by the image forming apparatus for its request for sending, to transmits information of the results of printing to the service system S. Since the transmission of the information of the results of printing makes it possible to judge whether the printing was carried out normally by the service system S or not, no complaints for failure of transmission of image data and for failure of printing by image forming apparatus 101 are received, and thereby, printing in a BOD mode can be conducted efficiently.

An image forming apparatus in the present embodiment will be explained as follows.

First, there will be explained a basic structure of a BOD mode wherein printing is conducted based on image data received by image forming apparatus 101 for its request for sending. Image forming apparatus 101 installed in a library, for example, transmits to service system S the request for sending image data of a book desired by a user. Then, master server 105 of the service system S conducts prescribed procedures and selects the requested image data from image data of books stored in a storage unit such as a hard disk of data server 110 of a publishing company. The image forming apparatus 101 receives the selected image data from service system S and conducts printing on a recording material such as a sheet based on the received image data. The receiving conducted by the image forming apparatus 101 is used in a sense that the image forming apparatus 101 obtains information such as image data stored in service system S. There may also be employed a structure wherein image data received by the image forming apparatus 101 are temporarily stored in personal computer 128 of a server that controls printing conducted by the image forming apparatus 101, and are received from the personal computer 128 in accordance with the state of printing conducted by the image forming apparatus 101.

The recording material in this case is a material on which characters and graphics are copied substantially, and it is practically a sheet such as sheet paper and sheet cloth cut to a prescribed size, and a sheet such as roll paper and roll cloth before being cut. The printing is to copy on a recording material substantially by forming images thereon based on image data, and an electrophotographic system is preferable in terms of printing speed, while, an ink jet system is preferable in terms of printing cost. Incidentally, an image printed by image forming apparatus 101 is allowed to be slightly different from the book because of image processing and marking conducted in the course of image forming.

Figure 15:
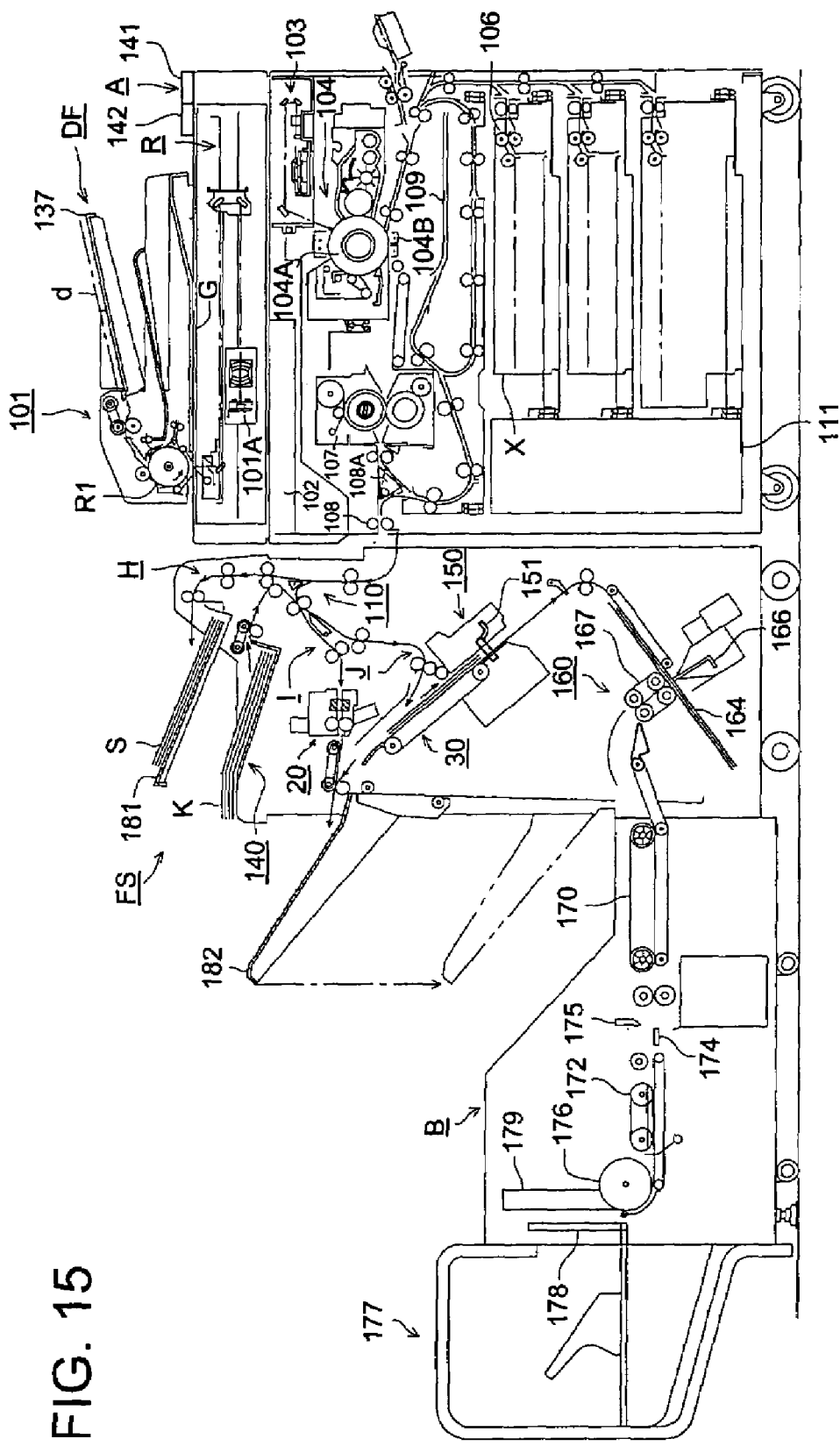
FIG. 15 is an illustrative diagram of image forming apparatus 101.

FIG. 15 is an illustrative diagram of image forming apparatus 101. The image forming apparatus 101 is equipped with main body A, sheet cutting unit B, sheet finishing unit FS and automatic document feeding unit DF.

On the top of the main body A, there is mounted the automatic document feeding unit DF, and on the side of the main body A closer to sheet ejection section 108, the sheet finishing unit FS and sheet cutting unit B are connected.

The main body A has image reading section R equipped with a scanner that reads images of a document conveyed by automatic document feeding unit DF, image processing section 102 that marks images of the document which have been read and conducts data processing, writing section 103, image carrier 104A composed of a photoreceptor drum, image forming section 104 that is equipped with at least a charging unit, a developing unit and a cleaning member for the image carrier 104A and forms a toner image on the image carrier 104A, sheet feeding unit X that contains sheet P for image forming, reversing path 109 that reverses a sheet from its surface to the back, circuit section 111, display section 141 and inputting section 142.

The automatic document feeding unit DF has therein, a roller group including roller R1, and a switching means that switches a moving path for a document properly. A scanner of the document image reading section R is located under top plate glass G and is composed of a mirror unit, a fixed image forming lens and an image-pickup element. The writing section 103 is composed of a laser light transmitting source and a polygon mirror. The circuit section 111 has therein control section 143 that will be explained later, sheet feeding failure detection section 144, sheet feeding detection section 145, communication section 146, cryptograph section 147, storage section 148 and charge calculating section 149.

Next, a process to print based on image data will be explained as follows.

One of documents (not shown) placed on the document placing stand 137 is conveyed by a roller group of the automatic document feeding unit DF, and passes under the roller R1, thereby an image is formed on image pickup element 101A to be read through a mirror unit and a lens located at a fixed position. Image information of a document obtained through reading is marked by signal processing conducted by image processing section 102 to become image data that is stored in storage section 148. Image data stored in the storage section 148 are subjected to correction of image forming conditions by image processing section 102, then, writing section 103 drives a laser light source based on image data to apply a laser beam on rotating image carrier 104A for exposure. Prior to the exposure, image carrier 104A rotating in the direction of an arrow mark (counterclockwise direction) is given prescribed surface voltage by corona discharge action of a charging unit. However, due to the exposure by a laser beam, voltage on the exposed area is lowered in accordance with an amount of the exposure, resulting in an electrostatic latent image formed on image carrier 104A in accordance with image data. The electrostatic latent image is subjected to reversal development conducted by a developing unit to become a toner image representing a visible image.

On the other hand, uppermost sheet P contained in sheet feeding unit X is fed out of the sheet feeding unit X by feeding section 106. After that, the sheet P is conveyed to image carrier 104A in synchronization with the toner image formed on the image carrier 104A. Then, the toner image on the image carrier 104A is superposed on the sheet P conveyed in synchronization with the image carrier 104A, thus, the toner image is urged by transfer unit 104B to be transferred onto the sheet P. After being separated from the image carrier 104A, the sheet P is conveyed to fixing section 107 where toner powder forming the toner image is pressed and heated to be fused and fixed on the sheet p. Though the image forming apparatus 101 is of an electrophotographic type in terms of printing in the present embodiment, the invention is not limited to this type, and other types including an ink jet type may also be employed.

In addition to the copy mode wherein a toner image is fixed for printing on a sheet based on image data obtained by marking image information of a document read by a scanner of document image reading section R as stated above, the image forming apparatus 101 has a BOD mode and a print mode.

The print mode is a mode to print based on image data received in terms of request for printing from an outer equipment such as a personal computer through communication network. The request for printing received from an outer equipment in the print mode is to transmit image data owned by the outer equipment itself to image forming apparatus 101 representing a target for transmission on communication network 129 or to personal computer 128 that controls the image forming apparatus 101 and thereby to request printing of image data.

The BOD mode and the print mode conduct correction of image forming conditions for image data received through communication network 129, with image processing section 102, and then, print on a sheet through the steps of exposure, development, transfer and fixing, based on image data.

Sheet P on which toner is fixed and printed is fed into sheet finishing unit FS from main body A through sheet ejection section 108. When conducting printing on both sides of sheet P, sheet P having on its first surface a toner image transferred is conveyed to reversing path 109 so that the surface of the sheet P is reversed to the back. The reversed sheet P is conveyed again to image carrier 104A. On the other hand, a second toner image is formed on the image carrier 104A, and the toner image on the image carrier 104A is superposed on the second surface of sheet P conveyed in synchronization with the image carrier 104A, thus, the toner image is transferred onto the sheet P. After that, fixing processing is conducted and the sheet P is fed into sheet finishing unit FS from main body A through sheet ejection section 108.

Next, how to bind printed sheets and a method of bookbinding will be explained as follows.

Sheets P fed into sheet finishing unit FS from sheet ejection section 108 are topped with a cover, then, are subjected to binding processing and folding processing, and their edges are trued up and are cut in sheet cutting unit B to be bound into a book.

On the sheet finishing unit FS, there are arranged cover feeding section 140, shift processing conveyance section 120, first stacking section 130, binding section 150, folding section 160, entrance conveyance section 110, fixed sheet ejection tray 181 and elevating sheet ejection tray 182 on which sheets which have been subjected to edge binding and shift processing are stacked.

A conveyance path for sheet P connected to the entrance conveyance section 110 is divided into three systems including first conveyance path H on the upper step, second conveyance path I on the medium step and third conveyance path j on the lower step.

The first conveyance path H1 is a route for the selection to conduct no binding processing, wherein sheet P is conveyed by rollers to be ejected on fixed sheet ejection tray 181.

The second conveyance path I is a route for the selection in which binding processing is not conducted and shift processing is conducted, wherein sheet P is conveyed by rollers, and each group of sheets P in prescribed quantity is shifted in the lateral direction in shift section 120 to be ejected to elevating sheet ejection tray 182 which can contain a large number of sheets (for example, about 2000 sheets) and can go up and down.

The third conveyance path J is a route for the selection of binding processing, wherein sheet P is conveyed by rollers and is placed on the first stacking section 130 with the edge portion of the sheet P being in contact with edge-binding movable stopper member 151 of binding section 150. When the cover is selected, after completion of printing in a book unit for image data, cover K is fed from cover feeding section 140 and is conveyed by rollers to be placed on a bundle of sheets on the first stacking section 130. After that, the side edges in the lateral direction of the bundle of sheets are tapped on the first stacking section 130 to be trued up, and the movable binding section 150 conducts edge binding to bind with staples inserted in the edge portion of sheets, or middle binding to bind with staples inserted in the middle portion of sheets, depending on the selection. When the edge binding is conducted, an edge portion of the bundle of sheets composed of cover K and sheets P is held by a belt of the first stacking section 130, and is pushed upward obliquely to be ejected on elevating sheet ejection tray 182.

When the middle binding is conducted, the edge-binding movable stopper member 151 retreats, the middle-bound bundle of sheets composed of cover K and sheets P is conveyed to second stacking section 164 of folding section 160 by the curved path and rollers. Under the central portion of the bundle of sheets, namely, under the middle binding position, there is provided sheet-thrusting section 166, and above the middle binding position, there is provided folding paired rollers 167. The sheet-thrusting section 166 protrudes upward to push up the central portion of the bundle of sheets so that the bundle of sheets is thrust in a nip portion of the folding paired rollers 167, thus, a fold is formed at the central portion to be folded double. The position of this fold agrees with the position where staples for binding the bundle of sheets for the middle binding are inserted. The bundle of sheets which are folded double and bound to be a booklet after the sheet-thrusting section 166 retreated is nipped and held by the folding paired rollers 167 to be conveyed, and is sent to sheet cutting unit B.

Further, though a booklet was made by the bookbinding method of binding processing in the embodiment, there may be employed a bookbinding method wherein sheets are punched to be subjected to binder, a bookbinding method wherein edges of sheets are pasted, and a bookbinding method wherein plural bound booklets are pasted.

The bundle of sheets which is made to be a booklet and conveyed to the sheet cutting unit B is nipped and held by conveyance belt 170, and edge portions of the bundle of sheets are cut to be trued up by falling upper blade 175 in the cutting section and by lower blade 174 in the fixed position. The bundle of sheets subjected to cutting processing is nipped and held by conveyance belt 172, then, is guided by rotating large diameter roller 176, and is conveyed vertically, with its cut edge portion facing downward, to be thrust by movable wall 179 against booklet placing stand 178 to be placed thereon. The movable wall 179 conveys the bundle of sheets to booklet housing section 177 while thrusting the bundle of sheets.

Figure 16:
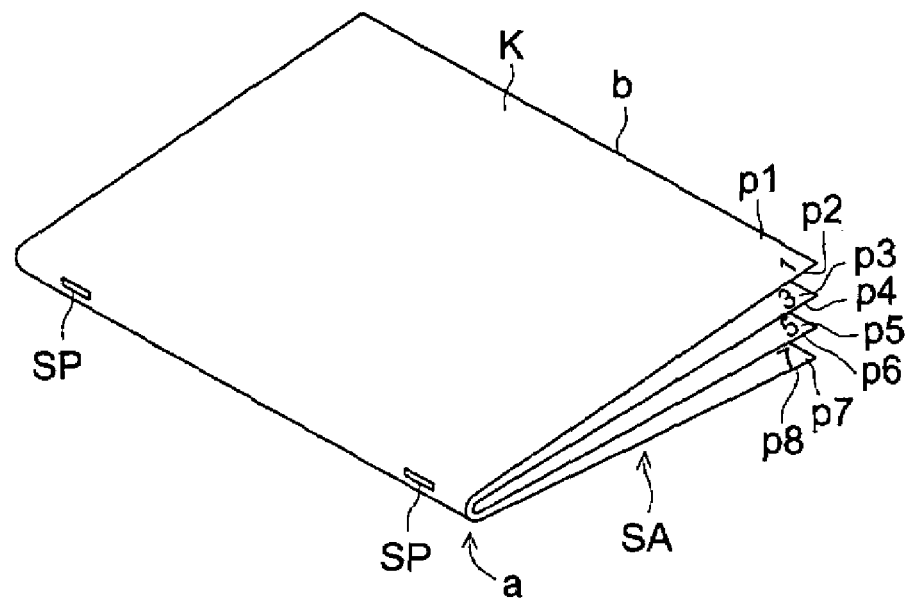
FIGS. 16(*a*) and 16(*b*) are illustrations of a booklet bound through middle binding processing.
Figure 16:
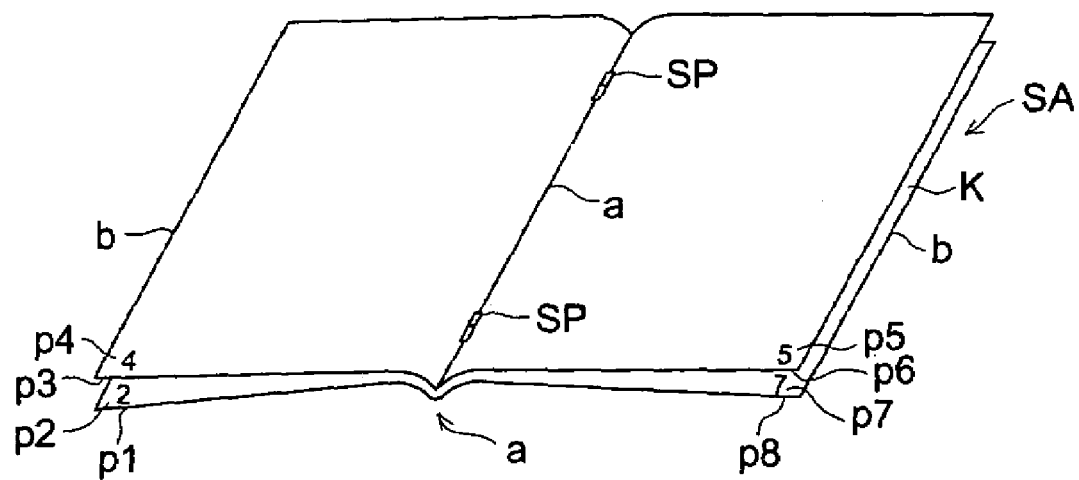

FIG. 16 is an illustration of a booklet bound through middle binding processing, wherein FIG. 16 (*a*) shows the state wherein a page of the booklet is closed, and FIG. 16 (*b*) shows the state wherein a page of the booklet is opened. In the diagram, booklet a is one bound through middle binding processing, wherein sheets P and cover K are bound by staples at SP position. Booklet a is of the structure of 8 pages in total covering from p1 surface of cover K to p8 surface on an opening-from-the-left basis. Printing is conducted in the order from page 3 on p3 surface to page 6 on p6 surface in sheet P, so that the order may be the same as original printing order of image data preserved in data server 105. Though there is shown a printing example, in the embodiment, wherein booklet a has pages on an opening-from-the-left basis on which writing is vertical, a booklet having pages on an opening-from-the-left basis and a booklet with horizontal writing may also be acceptable, depending on selection of the bookbinding method and printing conditions.

Figure 17:
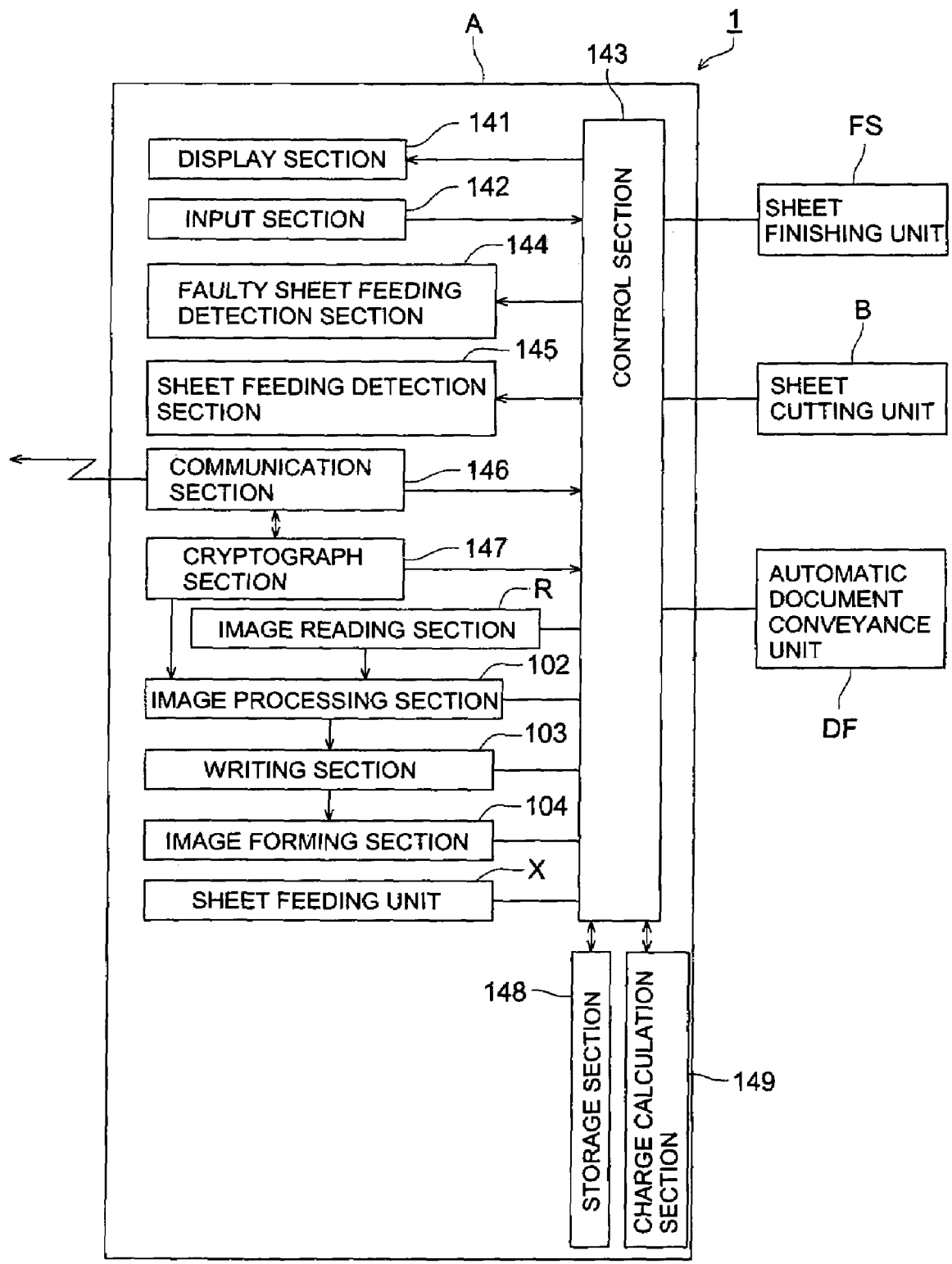
FIG. 17 is a block diagram of an image forming apparatus.

FIG. 17 is a block diagram of an image forming apparatus.

Based on image data received by communication section 146, or on image data of a document read by image reading section R, control section 143 controls the aforesaid image processing section 102, writing section 103, image forming section 104 and sheet feeding unit X for printing on a sheet, and controls sheet finishing unit FS and sheet cutting image forming apparatus B for binding of printed sheets and for bookbinding.

Inputting section 142 is provided with a key board and operation keys, and specification of operations of image forming apparatus 101, input of a book printing of which is desired, input of retrieval information for retrieving a book, registration number of a credit card, input of a code number, printing modes, printing conditions, a method of paying printing charges, a method of binding and a bookbinding method, are selected when input section 142 is operated by a user.

Display section 141 is equipped with a liquid crystal display plate, and it displays results of retrieval of books, quotation of printing charges for image data, results of printing of image data and printing errors.

Sheet detection section 145 detects an amount of remaining sheets P contained in sheet feeding unit X, types of sheets and sizes of sheets, by means of an optical sensor.

Sheet feeding failure detection section 144 detects faulty conveyance of sheets caused by a jam (sheet jam) and bookbinding failure caused by shortage of paste for printed sheets and by shortage of staples, by means of plural optical sensors installed in a conveyance path through which sheet P fed out of sheet feeding unit X is conveyed.

Communication section 146 conducts transmission and receiving of information in communication network 129, and encryption of information to be transmitted and decryption of encrypted information received are conducted by cryptograph section 147.

In BOD mode, charge calculation section 149 calculates, before printing, quotation of printing charges which may concern printing of image data, and corrects the quotation of printing charges, after printing, from the results of actual printing.

Switching of a copy mode, a BOD mode and a print mode in image forming apparatus 101 is conducted by control section 143 through input of operation keys of input section 142 conducted by a user. Further, switching between the BOD mode and the print mode can also be conducted by control section 143 with switching information sent from an outer equipment such as a personal computer and received by communication section 146.

Interruption printing which is given priority to printing in other modes in the course of printing is controlled by control section 143 to be conducted, through input of operation keys of input section 142 conducted by a user.

For interruption printing, a print mode is given priority to a BOD mode, and a copy mode is given priority to a print mode. Therefore, when there is request of interruption printing in a copy mode in the course of printing in a BOD mode or a print mode, the copy mode takes precedence, while when there is request of interruption printing in a print mode in the course of printing in a BOD mode, the print mode takes precedence.

Therefore, for example, even when the number of pages of a book is large and printing time is long in a BOD mode accordingly, it is possible, by requesting interruption printing, to conduct printing in a copy mode that conducts copying of a document without waiting until termination of printing in the BOD mode. After termination of the interruption printing, the mode automatically returns to one preceding the interruption printing and printing is resumed. Therefore, there is caused no failure to return the mode.

Further, image forming apparatus 101 is provided, to reduce power consumption in standby for printing, with an energy conservation mode wherein standby power of image forming section 104 is lowered if image data are not inputted for a prescribed period of time, and printing is not executed immediately even when image data are inputted. However, in the BOD mode, the energy conservation mode which takes a long printing time does not take preference, because priority is given to printing time.

Next, there will be explained a BOD mode to print based on image data received from service system S in accordance with request for transmission.

FIG. 18 shows information to be transmitted to the service system from image forming apparatus 101 in a BOD mode, wherein 18(A) shows a first transmission request for image data, 18(B) shows a second transmission request for image data, 18(C) shows information of payment of charges, and (D) shows information of results of printing.

The first transmission request for image data (A) has information of retrieval request for retrieving the transmission time and date, types of request, names of transmitting sources, generation request ID, printing target image forming apparatus list, and names of desired books or desired books.

The transmission time and date represent information of the date and time for request of transmission. The types of transmission represent codes for distinguishing between information of (A) and that of (B) to be transmitted. The name of the transmitting source is information which can specify image forming apparatus 101 on communication network 129. The generation request ID is a code which is given so that service system S may specify image forming apparatus 101 and request of transmission. The printing target image forming apparatus list is information which makes it possible to specify each of plural image forming apparatuses on communication network 129, when printing image data of a book with plural image forming apparatuses on an allotment basis for higher printing efficiency. The name of the desired book may either be a name of the book which is desired by a user for printing, or be a code which specifies the book. The retrieval request is information with which the service system S retrieves books when a name of the desired book is not clear, and the information includes an author, a publishing company, a date of issuance, a genre of books such as a novel and initials of books. Further, as retrieval information, it is also possible to utilize information recorded in storage section 148 of image forming apparatus 101 or information obtained through reading of CD distributed from the service system S.

Second transmission request (B) for image data has therein information such as the transmission time and date, types of request, names of transmitting sources, generation request ID, names of books, payment methods, printing conditions, state of sheet feeding, and printing unit cost, and these pieces of information are those for grasping a quotation of printing charges for prints made on the side of service system S by printing the book desired by a user under printing conditions desired by the user, and the state of printing in image forming apparatus 101.

With regard to the generation request ID, there is given a card which is common to that in the first one. The payment method is information with which a payment method for printing charges to be paid by a user when image data desired by the user are printed can be specified on the service system S side. For example, when conducting a quotation of printing charges on the service system S side, if a payment method to use a cash card is selected, a prescribed amount of commission is added to the quotation.

The printing condition is one selected by a user from printing capacity of image forming apparatus 101 established from inputting section 142, and for example, it is at least one of an option relating to a grade of printing such as a second size sheet different from first size sheet/the first size (selection of sheet size), color printing/monochromatic printing (selection of color/monochrome, and further selection of the number of colors in the case of color printing), selection of resolution, character font and printing density, information relating to a printing method such as enlargement/reduction (selection of magnification), single-sided printing/two-sided printing (selection of a single side and both sides) and printing of one page of a book on a single sheet/monochromatic printing of plural pages of a book on a single sheet, an option relating to bookbinding such as selection of a cover, presence of middle folding, presence of middle binding, bookbinding with paste, and selection of staple and punching, an option relating to an image forming range such as outputting all pages of a book or outputting specified pages, and information about the number of sets of prints desired by a user (for example, the number of copies in the case of bookbinding). Further, the printing condition is information which makes it necessary to adjust transmission procedures on the side of the service side system S, because it is information selected in accordance with printing capacity of image forming apparatus 101. For example, when the character font selected on the image forming apparatus 101 is different from the font of image data to be transmitted, a character font of image data to be transmitted on the service system S side is changed. Or, the image forming apparatus 101 is requested to change a character font.

The state of sheet feeding is at least one of pieces of information including information of sheet feeding unit X such as sizes, types and remaining quantity of sheets contained in the sheet feeding unit X after detection by sheet feeding detection section 145, and information about the state of sheets in the apparatus such as faulty conveyance of sheets conveyed from the sheet feeding unit X after detection by faulty sheet feeding detection section 144 and faulty bookbinding for printed sheets.

The types of sheets detected by sheet feeding detection section 145 of sheet feeding unit X include, in addition to white sheets, a sheet having thereon logo printed in advance, or a sheet used exclusively for BOD such as a watermarked sheet. In the BOD mode, therefore, if an exclusive sheet for the BOD mode detected by the sheet feeding detection section 145 is used, the printing under the BOD mode can be verified to be one for the correct image data. The sheet feeding unit X is of a sealed structure wherein sheets can not be replenished, or it is detachable from apparatus main body A and it is provided with an electronic circuit that outputs detection by the sheet feeding detection section 145 to the image forming apparatus main body when specific electronic information is given from the outside after it is detached and sheets are replenished. Accordingly, for example, if input of the specific electronic information is controlled on the service system S side, a dealer owning image forming apparatus 101 can restrict that prints are made infinitely from the received image data of a book.

The printing unit cost is information for calculating a quotation of charges for printing image data on the service system S side, and it represents information of charges such as sheets used for printing, a unit cost of material for image forming such as toner, a unit cost of work for bookbinding, and a rental fee per hour for image forming apparatus 101. The printing unit cost is information stored in storage section 148 of image forming apparatus 101, and it can be changed by an owner of the image forming apparatus 101 in accordance with demands of printing and a purchasing cost of materials such as sheets.

Information of charge payment (C) is information with which the service system S approves a charge payment method selected by a user, for a quotation of printing charges for image data, and it has therein information such as the transmission time and date, types of request, names of transmitting sources, generation request ID, names of books, card information and quotation codes.

Card information has therein information about a debit card that is deducted from a bank account instantly, a cash card that is deducted from a bank account later and a registration number and a code number of IC card equipped with an electronic memory and cash input information. The cash input information is information to confirm whether a coin input machine equipped on image forming apparatus 101 inputs cash equivalent to quoted charges or not when a user selects a cash input as a payment method. A quotation code is a code to specify the calculated quotation based on information of charges relating to an offer of image data.

Information of printing result (D) has such as the transmission time and date, types of request, names of transmitting sources, printing errors and printing time.

The printing error is information of the number of sheets on which printing of image data is not conducted normally found through detection by sheet feeding detection section 145 and by faulty sheet feeding detection section 144, the number of image data and of locations of erroneous bookbinding.

Though first transmission request (A) for image data to be transmitted through communication network 130, second transmission request (B) for image data, charge payment information (C) and printing result information (D) are encrypted in cryptograph section 147 in the present embodiment, second transmission request (B) for image data and charge payment information (C) have only to be encrypted. It is preferable that digital signature encrypted by encryption key is added to information to be encrypted. Namely, data server 110, master server 105 and image forming apparatus 101 are structured to be capable of doing mutual communication encrypted by public key system, and each of them decrypts digital signature relating to the received data with a public key of the transmitting source and specifies the transmitting source to prevent the pretending by other nodes, and encrypts information to be delivered with its own secret key to prevent illegal copying by other nodes.

In the detail explanation of encryption, information to be transmitted by image forming apparatus 101 is given digital signature encrypted by its own secret key, and is subjected to encryption by a public key of service system S to be transmitted. The service system S decrypts digital signature of the received information with public key of image forming apparatus 101 to specify the transmitting source, and when it receives information decrypted by its own public key, it decrypts the information with its own secret key.

The digital signature in this case is a code obtained by encrypting a characteristic value of information to be transmitted by a secret key of the transmitting source, and a target for transmission decrypts this portion with a public key of the transmitting source, and it confirms whether its value agrees with a characteristic value of the transmitted information or not. Due to this, it is possible to confirm that the transmitting source is surely the correct target (other someone is not pretending to be the transmitting source), and further, it is possible to confirm that contents of the information have not been altered. For the calculation of the characteristic value, a hash value obtained by MD 5 or other methods is used.

As concrete contents of the digital signature, there may be used, for example, random data (random values of 8 byte or more), date and/or the time, signer's names, and structure wherein a characteristic value of information to be transmitted is encrypted with a secret key of a signer (usually, the transmitting source).

In some cases, signature may also be conducted by a signer which is different from the transmitting source. For example, it is an occasion wherein new image forming apparatus 101 is registered by conducting signature of the specific signer who is already trusted by service system S, when transmitting to the service system S for the first time.

It is possible to increase probability of a proof of validity of the signature by confirming that the time and date are later than the generation time for information to be transmitted and are within a prescribed period of time.

The service system S decrypts, with its own secret key, the information from image forming apparatus 101 encrypted as stated above and added with digital signature, and confirms a target for transmission by decrypting the digital signature (decryption of a characteristic value).

Figure 19:
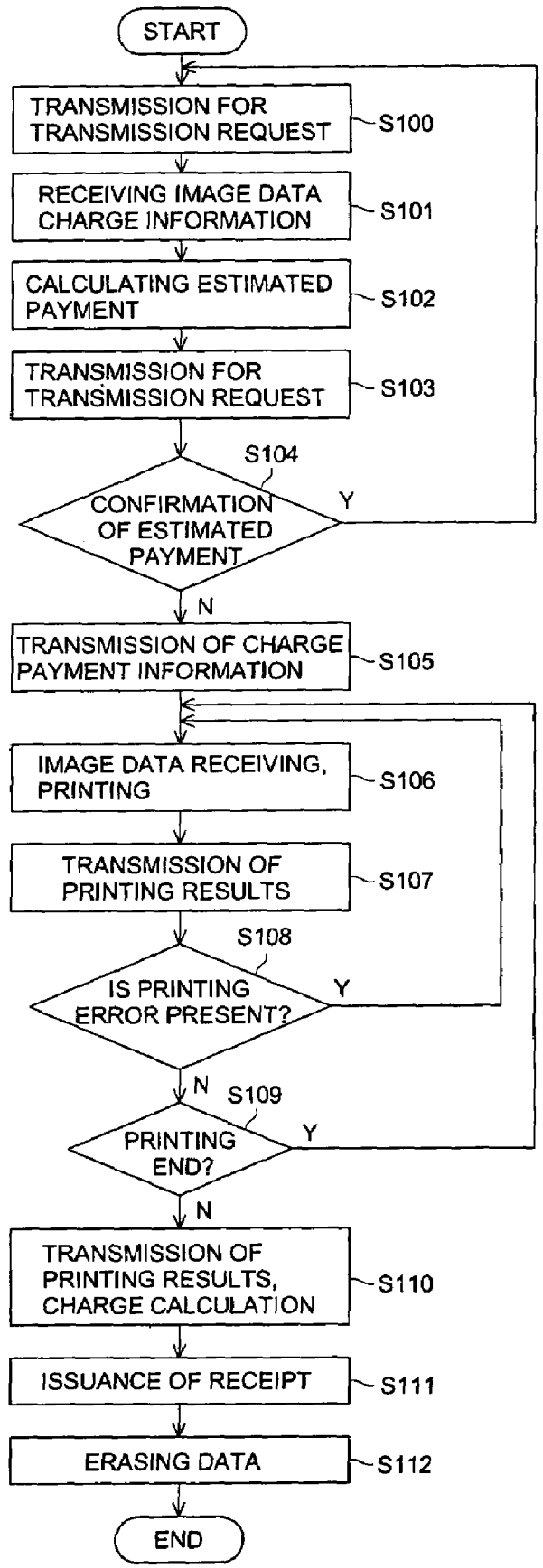
FIG. 19 is a flow chart of BOD mode.

FIG. 19 is a flow chart of BOD mode. The explanation will be given as follows, referring to the flow chart.

Step 100 transmits to the service system S the first transmission request (A) of image data of a book inputted by a user. Step 101 receives information of image data complying with the transmission request and information of charges relating to an offer of image data. Or, it receives retrieval results for retrieval information transmitted when the name of a book was not clear, then, the sequence returns to step 100 wherein the first transmission request of image data of a book selected by a user based on retrieval results is transmitted to service system S.

The information of charges relating to an offer of image data in this case is information including at least one of a charge for royalty of image data, a charge for making image data and a charge for delivering image data conducted by service system S. Information of image data is information about a name of a book, a name of a person having copyright, an expiration date of copyright, a name of a publishing company, an image data form, volume of image data, the number of colors, and the number of pages in printing on sheets in a prescribed size.

In step 102, charge calculation section 149 calculates a quotation of printing charges for image data, based on information of charges relating to an offer of received image data, information of image data and printing conditions inputted by a user. Step 103 transmits the second transmission request (B) for image data of a book to service system S. The second transmission request (B) represents information for calculation of a quotation conducted on the service system S side, and it may be transmitted in succession to the first transmission request. Further, even when operations are discontinued in this case, it is possible to store the quotation in storage section 148 together with a quotation code, and thereby to read the quotation stored in storage section 148 by inputting the quotation code later within the term of validity for the quotation, to start from step 104 again.

In step 104, a calculated quotation or a quotation received from service system S is displayed on display section 141 or is printed by image forming section 104 so that a user confirms the quotation. When changing the quotation, the sequence returns to step 100, and transmission request is conducted again. In step 105, a user who has confirmed the quotation inputs charge payment information for the quotation, and the inputted charge payment information (C) is transmitted to service system S. After the transmitted charge payment information is approved by service system S, the service system S permits transmission of image data of the book requested to be transmitted.

In step 106, printing is started under the inputted printing conditions, based on image data received after permission of transmission. When the order of image data to be printed is different from the received order due to the selected printing conditions and a bookbinding method, the received image data are stored temporarily in storage section 148, then, image data stored in accordance with printing conditions and bookbinding methods are read to be printed.

In step 107, information of printing results (D) is transmitted to service system S when printing for each sheet or printing of image data is completed. In the case of occurrence of a printing error cleared by detection of jam carried out by faulty sheet feeding detection section 144, or when a user is displeased with a print grade which was not detected by a detector and wishes reprinting, step 108 returns to step 106. When conducting reprinting, it is necessary that service system S approves reprinting by prescribed procedures.

When printing of image data is terminated in step 109, printing result information (D) is transmitted to service system S, and charge calculation section 149 calculates printing charges for image data based on charges relating to an offer of image data and on printing results. Calculation of printing charges for image data can also be conducted on the service system S side from the transmitted printing result information (D). In step 111, printing charges for image data are printed to be issued as a receipt, and further, when a dealer owning image forming apparatus 101 conducts account-deduction for charges, printing charges are deducted from a bank account through communication network 129 for the payment charging process, based on charge payment information (C), when a debit card, for example, is used as a payment method.

In step 112, when calculation of printing charges and the payment charging process are completed, image data and quotation received and stored in storage section 148 are erased, and a BOD mode is terminated.

Since printing charges in a BOD mode are calculated based on information of charges relating to an offer of image data, charges relating to image data of copyright are calculated for certain. Further, when occurrence of printing error such as a sheet jam is detected, the charges are discounted for calculation, because printing charges are calculated based on the results of printing. Therefore, printing charges relating to image data such as copyright are surely collected, and wrong charges caused by printing error are not requested to a user, thus, efficient calculation of printing charges can be made. Further, image forming apparatus 101 can not always detect all printing errors. It H is therefore preferable that where to make contact such as an address and telephone numbers of service system S are printed on the corner of a sheet on which image data are printed, because a user can confirm where to make contact for complaints.

What is claimed is:

1. A book copying system for copying a book based on electronic image data obtained through a network, comprising:
    a data service system connected to the network to supply electronic image data of a book through the network, the data service system comprising:
        a data storage section in which image data of a plurality of different books are stored, and a data managing section to manage the stored image data; and an image forming apparatus remote from the data service system, being connected to the data service system through the network and having a copy mode and a book publishing mode, the image forming apparatus comprising:

an input section to select one of the copy mode and the book publishing mode, an image reading section to read an image of a document, an image forming section apparatus internal to the image forming apparatus, and a control section, wherein in the copy mode, the control section controls the image reading section to read an image of a document so as to generate image data of the document and the image forming section makes a copy of the document based on the generated image data, and when in the book publishing mode, the control section controls the input section so as to input a print order to print a copy of an ordered book, the control section communicates with the data service system so as to obtain image data of the ordered book from the data storage section through the network and the image forming section prints a copy of the ordered book based on the obtained image data through the network.

2. The book copying system of claim 1 further comprising a calculating section, wherein the image forming apparatus reports a print result of the copy to the calculating section and the calculating section reduces the copy charge in accordance with the printing result of the copy.

3. The book copying system of claim 2, wherein the image forming apparatus comprises a copy result detecting section which reports the printing result.

4. The book copying system of claim 2, wherein the printing result includes a notice to indicate successful printing.

5. The book copying system of claim 2, wherein the calculating section is provided in the image forming apparatus, and the data service system transmits a data service charge through the network to the image forming apparatus so that the calculating section calculates the copy charge.

6. The book copying system of claim 2, wherein the calculating section is provided in the data service system, and the image forming apparatus transmits a print service charge through the network to the data service system so that the calculating section calculates the copy charge.

7. The book copying system of claim 6, wherein after the image forming apparatus prints the copy, the image forming apparatus transmits the print service charge through the network to the data service system so that the calculating section calculates the copy charge.

8. The book copying system of claim 1, wherein a data service system sets a data service charge based on at least one of a royalty of a copyright on the book, a data conversion fee to convert an original book into electronic image data and a service charge to transmit the image data.

9. The book copying system of claim 8, wherein when the copyright on the ordered book is terminated, the data service system excludes the royalty of the copyright from the data service charge.

10. The book copying system of claim 1, wherein the image forming apparatus sets a print service charge based on at least one of a rental fee for materials and a rental fee for a printer which is used for printing the image data.

11. The book copying system of claim 10, wherein before the image forming apparatus prints the image data, the image forming apparatus estimates a copy service charge based on at least one of the rental fee for the materials and the rental fee for the printer which are expected to be used for printing the image data.

12. The book copying system of claim 10, wherein after the image forming apparatus prints the image data, the image forming apparatus sets a copy service charge based on at least one of a rental fee for the materials and a rental fee for the image forming section which were used for printing the image data.

13. The book copying system of claim 10, wherein the image forming section comprises a plurality of printers and sets the print service charge for each of the plurality of printers.

14. The book copying system of claim 13, wherein at least one of a data service charge and the print service charge is encrypted.

15. The book copying system of claim 14, wherein at least one of the data service charge and the print service charge is provided with a digital signature encrypted with a cryptography key.

16. The book copying system of claim 1, wherein at least one of the data service system and the image forming apparatus comprises a data processing section to compile the image data in accordance with a print specification of the user, the image forming apparatus controls a printing condition to print the compiled image data with an image forming section in accordance with the print specification, wherein the image forming apparatus sets an estimated copy charge in accordance with the print specification and indicates the estimated copy charge for the user, and wherein when the user agrees to the estimated copy charge, the image forming apparatus sends an order signal to the data service system.

17. The book copying system of claim 16, wherein the data service system transmits an estimated data service charge for the image data of the ordered book to the image forming apparatus and the image forming apparatus sets the estimated copy charge based on the estimated data service charge.

18. The book copying system of claim 17, wherein the data service system transmits the estimated data service charge together with a period of validity and when the period of validity has expired, the data service system makes the estimated data service charge invalid.

19. The book copying system of claim 16, wherein the data managing section of the data service system transmits job ID information to the image forming apparatus and the data storage section.

20. The book copying system of claim 19, wherein when the user agrees to an estimated copy charge and sends an order signal, the data service system transmits job ID information to the image forming apparatus.

21. The book copying system of claim 19, wherein the data storage section specifies image data and the image forming apparatus to be sent the image data on the basis of the job ID information.

22. The book copying system of claim 21, wherein the data storage section collates the job ID information sent to the image forming apparatus with the job ID information sent from the data managing section, specifies the image forming apparatus having the same job ID information with the job ID information sent from the data managing section, and sends the image data to the image forming apparatus having the same job ID information.

23. The book copying system of claim 21, wherein the data storage section forwards the job ID information sent to the image forming apparatus to the data managing section and the data managing section collates the job ID information with the job ID information forwarded from the data storage section and specifies the image forming apparatus to which the image data will be sent.

24. The book copying system of claim 23, wherein the data managing section transmits a data storing location to the image forming apparatus in response to the order signal.

25. The book copying system of claim 24, wherein the image forming apparatus accesses the data storage section on the basis of the obtained data storing location and sends the print specification to the data storage section.

26. The book copying system of claim 25, wherein the data storage section includes a data processing section which compiles the image data on the basis of the print specification.

27. The book copying system of claim 25, wherein the print specification includes a print mode and the data processing section compiles a page arrangement in accordance with the print mode.

28. The book copying system of claim 27, wherein the print mode includes a page-unit print and a book-unit print.

29. The book copying system of claim 25, wherein the data storage section encrypts the image data and the image forming apparatus decrypts the encrypted data and conducts the printing on the basis of the decrypted data.

30. The book copying system of claim 29, wherein the image forming apparatus conducts a trial printing before the printing.

31. The book copying system of claim 25, wherein the control section of the image forming apparatus requests the image forming section to conduct the printing after obtaining the image data from the data storing location.

32. The book copying system of claim 31, wherein the image forming apparatus reports a print result of the copy and the book copying system adjusts a copy charge in accordance with the printing result of the copy.

33. The book copying system of claim 32, wherein the book copying system conducts a payment charging processing on the basis of the printing result.

34. The book copying system of claim 32, wherein at least one of the copy charge and the printing result is provided with a digital signature by a public key cryptograph method.

35. The book copying system of claim 16, wherein when the image forming apparatus requests a log-in for the data service system, the data service system certifies the request of log-in of the image forming apparatus.

36. The book copying system of claim 35, wherein the image forming apparatus is provided with a cryptograph key for each client and when the image forming apparatus accesses the data service system, the image forming apparatus makes a digital signature encrypted by the cryptograph key.

37. The book copying system of claim 35, wherein when the image forming apparatus accesses the data service system, the image forming apparatus makes a digital signature by a public key cryptograph method.

38. The book copying system of claim 16, wherein the calculating section is provided in the image forming apparatus, and the data service system transmits the data service charge through the network to the image forming apparatus so that the calculating section calculates the copy charge.

39. The book copying system of claim 16, wherein the calculating section is provided in the data service system, the image forming apparatus transmits the print service charge through the network to the data service system so that the calculating section calculates the copy charge.

40. The book copying system of claim 1, wherein the image forming apparatus selectively sets a printing condition in accordance with the print order and sets a print service charge in accordance with the selected printing condition.

41. The book copying system of claim 1, wherein after the image forming apparatus prints the image data, the image forming apparatus determines a print service charge in accordance with the print result of the copy of the ordered book.

42. The book copying system of claim 1, wherein the data service system sets a data service charge for the image data of the ordered book.

43. The book copying system of claim 1, further comprising:
    a calculating section connected to the network to receive a data service charge and a print service charge and to calculate a copy charge based on the data service charge and the print service charge and to conduct a payment charging process for the user in accordance with the calculated copy charge.

44. The book copying system of claim 1, wherein the image forming apparatus is installed at a place where the image forming apparatus provides a copy service for a user as a print service station.

45. The book copying system of claim 1, wherein the control section has an interruption mode with which when the input section selects a copy mode while the image forming apparatus prints a copy of the ordered cook in the book publishing mode, the control section interrupts the book publishing mode, conducts the copy mode and resumes the book publishing mode after the image forming apparatus has completed making a copy of a document in the copy mode.

* * * * *